(12) United States Patent
Andreev

(10) Patent No.: US 12,617,530 B2
(45) Date of Patent: May 5, 2026

(54) VEHICLE, TRANSPORT SYSTEM (VARIANTS) AND METHOD OF MOVING VEHICLE

(71) Applicant: Pavel Ruslanovich Andreev, Saint-Petersburg (RU)

(72) Inventor: Pavel Ruslanovich Andreev, Saint-Petersburg (RU)

(73) Assignee: Pavel Ruslanovich Andreev, Saint-Petersburg (RU)

( * ) Notice: Subject to any disclaimer, the term of this patent is extended or adjusted under 35 U.S.C. 154(b) by 71 days.

(21) Appl. No.: 18/221,009

(22) Filed: Jul. 12, 2023

(65) Prior Publication Data

US 2024/0109676 A1 Apr. 4, 2024

(30) Foreign Application Priority Data

Sep. 22, 2022 (RU) ........................... RU2022124960

(51) Int. Cl.
| | |
|---|---|
| *B64D 1/22* | (2006.01) |
| *B64C 37/02* | (2006.01) |
| *B64D 9/00* | (2006.01) |
| *B64U 70/20* | (2023.01) |
| *B64U 80/40* | (2023.01) |

(Continued)

(52) U.S. Cl.
CPC ............... *B64D 1/22* (2013.01); *B64C 37/02* (2013.01); *B64D 9/00* (2013.01); *B64U 70/20* (2023.01); *B64U 80/40* (2023.01); *G05D 1/661* (2024.01); *B64C 2211/00* (2013.01); *B64U 2101/60* (2023.01); *B64U 2201/20* (2023.01)

(58) Field of Classification Search
CPC . B64D 1/22; B64D 9/00; B64U 80/40; B64U 70/20; B64U 2201/20; B64U 2101/60; G05D 1/661; B64C 37/02; B64C 2211/00
See application file for complete search history.

(56) References Cited

U.S. PATENT DOCUMENTS

| | | | |
|---|---|---|---|
| 9,845,150 B2 | 12/2017 | Kroo | |
| 10,286,925 B2 | 5/2019 | Evans | |

(Continued)

FOREIGN PATENT DOCUMENTS

| | | |
|---|---|---|
| FR | 3107253 B1 | 5/2022 |
| JP | 2020078949 A | 5/2020 |

(Continued)

*Primary Examiner* — Navid Z. Mehdizadeh
*Assistant Examiner* — Oliver Tan
(74) *Attorney, Agent, or Firm* — Taft Stettinius & Hollister LLP

(57) ABSTRACT

Provided is a vehicle comprising a fuselage provided with at least one storage module each configured to accommodate therein unmanned aerial systems and at least one docking module each configured to detachably interact with at least one of the unmanned aerial systems so as to enable connection thereof to the fuselage for movement of the vehicle, and a control module configured to present control commands to at least one of the unmanned aerial systems so as to enable release thereof from the storage module for interaction with one of the docking modules. Furthermore, provided are variants of the transport system, each of which variants includes the subject vehicle, and a method of moving the subject vehicle.

69 Claims, 7 Drawing Sheets

100-1

(51) Int. Cl.
  *B64U 101/60*   (2023.01)
  *G05D 1/661*   (2024.01)

(56)      References Cited

U.S. PATENT DOCUMENTS

| | | | |
|---|---|---|---|
| 10,538,323 B2 | 1/2020 | Rancourt et al. | |
| 10,759,286 B2 | 9/2020 | Evans | |
| 2005/0051666 A1* | 3/2005 | Lee | B64C 17/10 |
| | | | 244/10 |
| 2016/0031564 A1* | 2/2016 | Yates | B64U 10/25 |
| | | | 307/9.1 |
| 2016/0272314 A1 | 9/2016 | Radu | |
| 2017/0116814 A1 | 4/2017 | Storch et al. | |
| 2017/0144761 A1* | 5/2017 | Bluvband | B64C 3/46 |
| 2017/0316701 A1* | 11/2017 | Gil | B60P 3/11 |
| 2019/0016583 A1* | 1/2019 | Dudar | G06Q 10/06311 |
| 2019/0248488 A1 | 8/2019 | Yakimenko et al. | |
| 2021/0171214 A1 | 6/2021 | Schonfelder | |
| 2022/0340371 A1* | 10/2022 | X | G05B 19/416 |
| 2022/0402530 A1* | 12/2022 | Beckman | G06Q 30/0202 |

FOREIGN PATENT DOCUMENTS

| | | | |
|---|---|---|---|
| JP | 2022063524 A | 4/2022 | |
| WO | WO-2020181329 A1 * | 9/2020 | |

* cited by examiner 100-1

700

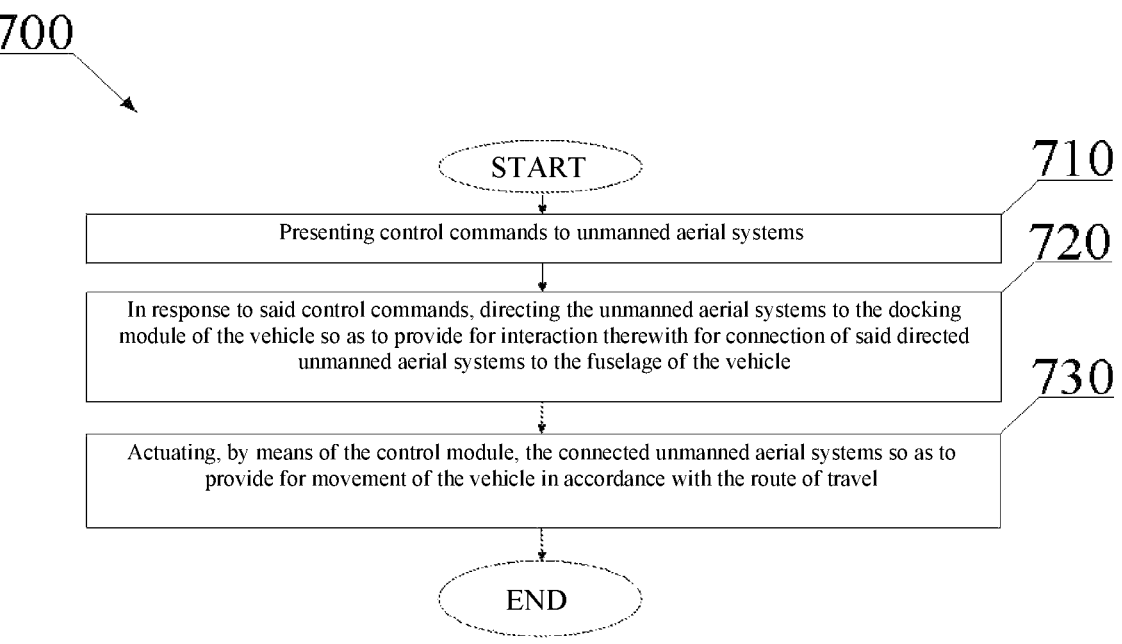

710

START

Presenting control commands to unmanned aerial systems

720

In response to said control commands, directing the unmanned aerial systems to the docking module of the vehicle so as to provide for interaction therewith for connection of said directed unmanned aerial systems to the fuselage of the vehicle

730

Actuating, by means of the control module, the connected unmanned aerial systems so as to provide for movement of the vehicle in accordance with the route of travel

END

Fig. 6

VEHICLE, TRANSPORT SYSTEM (VARIANTS) AND METHOD OF MOVING VEHICLE

CROSS REFERENCE TO RELATED APPLICATIONS

This application claims priority to Russian Patent Application No. RU2022124960 filed Sep. 22, 2022, the contents of which are hereby incorporated by reference in their entirety.

FIELD OF THE INVENTION

The present invention relates to aviation equipment, in particular to means and methods for moving cargos and/or passengers by air, water and/or land, and more specifically to a vehicle, a transport system comprising such vehicle and a method for moving such vehicle.

BACKGROUND OF THE INVENTION

To date, manned and unmanned aerial systems with various designs and propulsion units used in the prior art for transporting cargos and/or passengers by air, water and/or land have become widely popular. In particular, known are airplanes, helicopters, gliders, aerostats, passenger cars, trucks, motorcycles, ships, ferries, barges, steamships and other types of aircraft, landcraft or watercraft that are capable of performing transportation of cargos and/or passengers.

The advantages of air transport over ground and water modes of transport are relatively higher speeds and the absence of the need for taking into account physical barriers (rivers, mountains, forests, land-based buildings and structures, ground vehicle traffic, pedestrian traffic, etc.) when making the route of travel of such vehicle. However, the widespread use of aircraft has considerable limitations in urban conditions. In particular, airplanes and helicopters require the construction of airplane take-off and landing areas and helicopter take-off and landing areas, respectively, which occupy a considerable area. Furthermore, the overall dimensions of the take-off and landing areas for aircraft significantly exceed that of the parking spaces used for parking of landcraft capable of transporting cargo having a commensurate weight and volume and/or a commensurate quantity of passengers. For example, the landing area for the Mi-8 helicopter, which is able to carry up to 24 passengers, must be 400 m² or more, and the parking area of a typical passenger bus with a capacity of 50 to 100 people is less than 30 m². The Robinson R-44 helicopter with a capacity of up to 4 people (1 pilot and 3 passengers) requires a landing area of at least 225 m², whereas the area of a typical parking space for a passenger car with a capacity of up to 9 people is less than 14 m².

Accordingly, there is a need to improve the designs of aircraft for mass adoption of air transport in the urban environment.

US patent application no. 20160272314 (hereinafter US 20160272314), published on Sep. 22, 2016, discloses a vehicle in the form of a flying car comprising a fuselage, folding movable aircraft electric motors that enable vertical takeoff, and folding wings. The vehicle according to US 20160272314 in a parked state may have dimensions comparable to a conventional car. However, the vehicle according to US 20160272314 has a limited load capacity and a limited range, and therefore the design thereof is not versatile and safe for use of said vehicle in urban conditions. In case of failure of one of the aircraft engines in the vehicle according to US 20160272314, there is no possibility envisaged for performing a safe landing operation. Despite the fact that US 20160272314 provides that the vehicle according to US 20160272314 may be provided with an emergency parachute, the possibility of timely deployment of the parachute and the possibility of providing a safe controlled landing operation in such vehicle are questionable, in particular within the bounds of city limits or under conditions of congested areas.

U.S. Pat. No. 9,845,150 (hereinafter U.S. Pat. No. 9,845,150) published on Dec. 19, 2017 provides a vehicle comprising a fuselage on which there are installed horizontally oriented lift rotors, vertically oriented lift rotors and folding wings. The vehicle according to U.S. Pat. No. 9,845,150 is configured to accomplish vertical takeoff similar to a helicopter, followed by the unfolding of the wings and transformation into a hybrid of an airplane and a helicopter. The quantity of lift rotors in the vehicle according to U.S. Pat. No. 9,845,150 may be selected with a safety margin for providing for safe landing in case of failure or breakdown of one or more of said lift rotors. The horizontally oriented lift rotors installed in the vehicle according to U.S. Pat. No. 9,845,150 along the fuselage in multiple rows reduce the overall dimensions and increase the reliability of such vehicle when compared, for example, to a helicopter which typically comprises only a single horizontally oriented lift rotor with a disc area significantly exceeding the overall dimensions of the fuselage. The disadvantages of the vehicle according to U.S. Pat. No. 9,845,150 are a limited range, as well as a limited and non-scalable load capacity.

U.S. patent Ser. No. 10/759,286 (hereinafter U.S. Ser. No. 10/759,286), published on Sep. 1, 2020, which should be considered the closest analogue (prototype) of the present invention, discloses a vehicle being part of a passenger transportation system and comprising a fuselage provided with a docking module enabling detachable docking of an unmanned aerial system (carrier drone) to the fuselage, the unmanned aerial system allowing to move said vehicle by air. Furthermore, the passenger transport system disclosed in U.S. Ser. No. 10/759,286 comprises dedicated air terminals adapted for landing of the vehicles according to U.S. Ser. No. 10/759,286, charging of the carrier drones, exchange (replacement) of carrying drones, boarding/disembarking of passengers, and the like. The docking module in the vehicle according to U.S. Ser. No. 10/759,286 allows scaling the load capacity of that vehicle, in particular due to the possibility of detachable docking of carrier drones with different power and load capacities to the fuselage of that vehicle. However, the vehicle according to U.S. Ser. No. 10/759,286 has a limited range, which fact requires stops along the route of travel, which are at least necessary for performance of undocking of the carrier drones from the fuselage for subsequent charging and connection of charged drones to the fuselage, thus ultimately resulting in an increased duration of flight of such vehicle in accordance with said route of travel and, consequently, delaying the moment of arrival of such vehicle to the destination in accordance with said route of travel. Furthermore, the failure, breakdown or premature discharge of one or more carrier drones while movement of the vehicle according to U.S. Ser. No. 10/759,286 along the route of travel may cause that vehicle to fall to the ground; accordingly, the vehicle according to U.S. Ser. No. 10/759, 286 has an increased accident incidence rate.

Thus, the main disadvantage of known vehicles, including the vehicle according to U.S. Ser. No. 10/759,286, is an increased accident incidence rate and excessive duration of movement to the destination, especially in the case of a long route of travel of such vehicle.

Thus, there is an obvious need for further improvement of known vehicles, in particular to reduce the accident incidence rate of such vehicles and accelerate arrival thereof to the destination.

Accordingly, the technical problem solved by the present invention is to create a vehicle overcoming at least one of the above disadvantages of the known vehicle, which are an increased level of accident incidence rate and excessive duration of movement to the destination, limited load capacity and considerable overall dimensions.

DISCLOSURE

The object of the present invention is to create a vehicle that addresses at least one of the above problems of the prior art, and also to expand the range of means for transporting passengers and/or cargos.

The task at hand is solved in a first aspect of the present invention by the fact that the subject vehicle comprises a fuselage provided with one or more storage modules, at least in one of which there are accommodated unmanned aerial systems, and at least one docking module configured each to detachably interact with at least one of said unmanned aerial systems so as to enable connection thereof to the fuselage for moving said vehicle, and a control module configured to present control commands at least to one of said unmanned aerial systems so as to enable release thereof from the storage module for interacting with one of said docking modules.

Furthermore, the task at hand is solved in a second aspect of the present invention by the fact that the subject transport system comprises: (i) the vehicle according to the first aspect of the present invention; (ii) unmanned aerial systems used by said vehicle; (iii) parking stations configured to store additional unmanned aerial systems; and (iv) a server configured to control the operation of said additional unmanned aerial systems on said parking stations and communicatively coupled to the control module of the vehicle so as to enable receipt of data therefrom relating to the route of travel of the vehicle; wherein the control module is further configured to direct a request to at least one of said parking stations corresponding to said route of travel for provision of at least one additional aerial system in a predetermined geographic region corresponding to said route of travel, and the server is further configured to receive coordinates of the vehicle from the control module in real time so as to enable directing at least one additional aerial system from said parking station in response to said request at a time when the proximity of the vehicle to said geographic region in accordance with said route of travel corresponds to a threshold value, for interaction of said additional aerial system with the docking module. Furthermore, the task at hand is solved in a third aspect of the present invention by the fact that the subject transport system comprises: (i) the vehicles according to the first aspect of the present invention; (ii) groups of unmanned aerial systems, the groups are used each by one of said vehicles; (iii) a server communicatively coupled to the control module of each of said vehicles so as to enable receipt of data therefrom relating to the route of travel of the vehicle and to enable receipt therefrom of coordinates of the vehicle in real time; wherein (a) each of the unmanned aerial systems in each of said vehicles is further configured to present data relating to the range to the control module in response to a request of the control module, the request corresponds to said unmanned aerial system; (b) the control module in each of said vehicles is further configured to determine the quantity of free charging spots in the storage module of said vehicle which enable replenishment of the range of unmanned aerial systems so as to enable provision of data relating to free charging spots of the storage module to the server, identify the quantity of discharged unmanned aerial systems of said vehicle, the range of which discharged unmanned aerial systems is less than the threshold value, based on said data relating to the range, and present a request to the server for provision of additional unmanned aerial systems in a quantity corresponding to at least a portion of said identified quantity of discharged unmanned aerial systems, and (c) the server in response to said request for provision of additional unmanned aerial systems is further configured to identify other vehicle of said vehicles, the location of which other vehicle corresponds to the coordinates of said vehicle and in the storage module of which other vehicle the quantity of free charging spots corresponds to the quantity of discharged unmanned aerial systems of said vehicle, or identify at least two other vehicles of said vehicles, the location of each of which two other vehicles corresponds to the coordinates of said vehicle and in the storage modules of which two other vehicles the quantity of free charging spots corresponds to the quantity of discharged unmanned aerial systems of said vehicle, and is further configured to present control instructions to the control module of said vehicle so as to enable direction of said discharged unmanned aerial systems under control of the control module of said vehicle to said free charging spots of each identified other vehicle, or taking-over of the control of said discharged unmanned aerial systems so as to enable direction thereof to said free charging spots of each identified other vehicle.

Furthermore, the task at hand is solved in a fourth aspect of the present invention by the fact that the subject transport system comprises: (i) the vehicles according to the first aspect of the present invention; (ii) groups of unmanned aerial systems, the groups are used each by one of said vehicles; (iii) a server communicatively coupled to the control module of each of said vehicles in a manner to enable receipt of data therefrom relating to the route of travel of the vehicle, coordinates of the vehicle in real time and data relating to the quantity of idle unmanned aerial systems of the vehicle in the storage module, the idle unmanned aerial systems will not be required by said vehicle while movement in accordance with the route of travel thereof; wherein (a) each of unmanned aerial systems in each of said vehicles is further configured to present data relating to the range to the control module in real time; (b) the control module in each of said vehicles is further configured to identify the quantity of lacking charged unmanned aerial systems of the group of unmanned aerial systems of the vehicle, the group corresponding to said vehicle, for providing for a range for said vehicle, the range allowing to continue movement of said vehicle to the next stop in accordance with the route of travel of the vehicle, based on data relating to the range, the data corresponding to said vehicle, and data relating to the target quantity of charged unmanned aerial systems which allows moving said vehicle between stops in accordance with the route of travel thereof, identify the presence of free docking spots in the docking module of said vehicle, in which docking spots there is enabled the connection of the unmanned aerial systems to the fuselage, in a quantity corresponding to said identified quantity of lacking charged unmanned aerial systems so as to enable presenting data relating to free docking spots of the docking module to the server, present to the server a request for provision of additional unmanned aerial systems in a quantity corresponding to at least a portion of said identified quantity of lacking charged unmanned aerial systems; and (c) the server in response to said request for provision of additional aerial systems is further configured to identify other vehicle of said vehicles, the location of which other vehicle corresponds to the coordinates of said vehicle and the quantity of idle unmanned aerial systems of which other vehicle corresponds to said quantity of lacking charged unmanned aerial systems, or identify at least two other vehicles of said vehicles, the location of each of which two other vehicles corresponds to the coordinates of said vehicle and the total quantity of idle unmanned aerial systems of which two other vehicles corresponds to said quantity of lacking charged unmanned aerial systems, and is further configured to present control instructions to the control module of each identified other vehicle so as to enable direction of each of the idle unmanned aerial systems under control of the control module of said other vehicle to one of said free docking spots in the docking module, or taking-over of the control of the idle unmanned aerial systems so as to enable direction of each of same to one of said free docking spots in the docking module.

Furthermore, the task at hand is solved in a fifth aspect of the present invention by the fact that the subject transport system comprises: (i) a vehicle according to a first aspect of the present invention further provided with a location determination module configured to determine the geographic coordinates of the vehicle in real time; (ii) unmanned aerial systems used by said vehicle; and (iii) parking stations, each of which parking stations is configured to store additional unmanned aerial systems and to control the operation of said additional unmanned aerial systems, said parking stations being further configured to communicate with the control module of the vehicle so as to enable receipt therefrom of data relating to the route of travel of the vehicle; wherein the control module is further configured to direct a request to at least one of said parking stations for provision of at least one additional unmanned aerial system in a geographic region corresponding to said route of travel, and said at least one parking station in response to said request enables direction of said at least one additional aerial system at a moment of time at which the proximity of the vehicle to said geographic region in accordance with said route of travel corresponds a threshold value, for interaction of each of said additional aerial systems with the docking module of the vehicle.

Furthermore, the task at hand is solved in a sixth aspect of the present invention by the fact that the subject transport system comprises: (i) the vehicle according to the first aspect of the present invention; (ii) unmanned aerial systems used by said vehicle; (iii) parking stations configured to store additional unmanned aerial systems; and (iv) a server configured to control the operation of said additional unmanned aerial systems on said parking stations and communicatively coupled to the control module of the vehicle; wherein the control module is further configured to direct a request to the server for provision of at least one additional aerial system, and the server is further configured to identify at least one of said parking stations corresponding to said request so as to enable direction of at least one additional aerial system from said identified parking stations at a moment of time at which the proximity of the vehicle to said identified parking stations corresponds to a threshold value, for interaction of each of said additional aerial systems with the docking module of the vehicle.

Furthermore, the task at hand is solved in a seventh aspect of the present invention by the fact that the subject transport system comprises: (i) the vehicle according to the first aspect of the present invention; (ii) unmanned aerial systems used by said vehicle; and (iii) parking stations, each of which parking stations is configured to store additional unmanned aerial systems and to control the operation of said additional unmanned aerial systems, said parking stations being further configured to communicate with the control module of the vehicle; wherein the control module is further configured to direct a request to at least one of said parking stations for provision of at least one additional unmanned aerial system, and said at least one parking station in response to said request further enables direction of said at least one additional aerial system at a moment of time at which the proximity of the vehicle to that parking station corresponds to a threshold value, for interaction of each of said additional aerial systems with the docking module of the vehicle.

Furthermore, the task at hand is solved in the eighth aspect of the present invention due to the fact that the subject method of moving a vehicle according to the first aspect of the present invention comprises the steps of: (i) presenting control commands to unmanned aerial systems; (ii) directing said unmanned aerial systems to the docking module of the vehicle in a manner to provide for interaction therewith for connecting said directed unmanned aerial systems to the fuselage of the vehicle; and (iii) actuating, by means of the control module of the vehicle, said connected unmanned aerial systems in a manner to provide for movement of the vehicle.

The vehicle according to the first aspect of the present invention, the transport system according to the second aspect of the present invention, the transport system according to the third aspect of the present invention, the transport system according to the fourth aspect of the present invention, and the method of moving a vehicle according to the fifth aspect of the present invention provide each a technical result consisting in improving the safety of operation of the vehicle.

The vehicle according to the first aspect of the present invention, the transport system according to the second aspect of the present invention, the transport system according to the third aspect of the present invention, the transport system according to the fourth aspect of the present invention, the transport system according to the fifth aspect of the present invention, the transport system according to the sixth aspect of the present invention, the transport system according to the seventh aspect of the present invention and the method of moving a vehicle according to the eighth aspect of the present invention provide each a further technical result consisting in increasing the use of the vehicle for delivery of cargo and/or passenger to a destination, in particular by way of enabling non-stop movement of the vehicle to the destination.

The vehicle according to the first aspect of the present invention, the transport system according to the second aspect of the present invention, the transport system according to the third aspect of the present invention, the transport system according to the fourth aspect of the present invention, the transport system according to the fifth aspect of the present invention, the transport system according to the sixth aspect of the present invention, the transport system according to the seventh aspect of the present invention and the method of moving a vehicle according to the eighth aspect of the present invention provide each a one more further technical result consisting in expanding the range of means for transporting useful load (for example, cargos and/or passengers).

BRIEF DESCRIPTION OF DRAWINGS

The accompanying drawings which are included to provide a further understanding of the principles of the present invention constitute a part hereof and are incorporated herein to illustrate the below embodiments and aspects of the present invention. The accompanying drawings, together with the description below, serve to explain the principles of the present invention. In the drawings:

FIG. 6 is one of the embodiments of the method of moving a vehicle.

DETAILED DESCRIPTION

Figure 1:
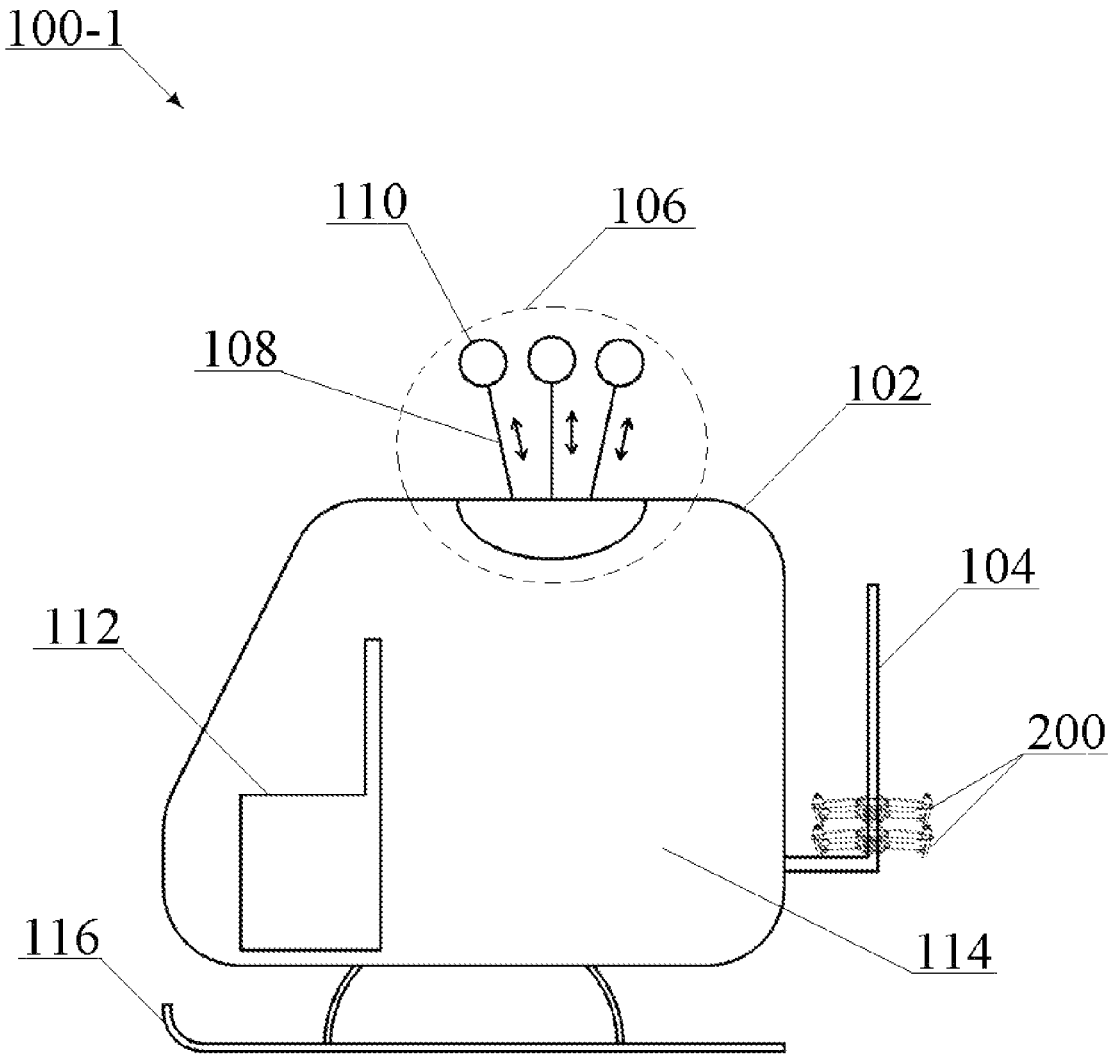
FIG. 1 is a schematic side view of a first illustrative embodiment of the vehicle according to the present invention.

Hereinafter, various exemplary embodiments of the present invention are described with reference to the accompanying drawings; however, it should be understood that the description below does not define or limit the scope of the present invention.

In the following description, a detailed description of known functions and designs will be omitted as this unimportant information may obscure the concept of the present invention.

It is to be understood that in the following description the terms such as "first", "second", "upper", "lower", "lateral", "front", "rear", etc. are used solely for convenience, and they should not be interpreted as limiting terms. In particular, as used in the present invention, unless explicitly stated otherwise in the description herein, the terms "first", "second", "third" or the like are used to distinguish elements, components, parts, assemblies, modules, blocks, embodiments, or the like, to which they pertain, from one another and not meant to describe any particular relationship therebetween. Thus, for example, it should be understood that the use of the terms "first group" of unmanned aerial systems and "second group" of unmanned aerial systems is not intended to imply any particular order, type, chronology, hierarchy or ranking (for example) of/between groups of unmanned aerial systems in a plurality of unmanned aerial systems, nor is their use (by itself) intended to imply that "third group" of unmanned aerial systems, "fourth group" of unmanned aerial systems, etc. may further exist. Further, as is discussed herein in other contexts, reference to a "first group" and a "second group" does not preclude herein the two groups from being the groups of the same elements. Thus, for example, in some instances, unmanned aerial systems in a "first group" of unmanned aerial systems and in a "second group" of unmanned aerial systems may coincide in terms of design, and in other cases they may be different in terms of design.

References to an item in the singular should be understood to include items in the plural, and vice versa, unless explicitly stated otherwise or clear from the context.

Grammatical conjunctions are intended to express any and all disjunctive and conjunctive combinations of conjoined clauses, sentences, words, and the like, unless otherwise stated or clear from the context. Thus the term "or" should be understood to generally mean "and/or" and so forth.

Recitation of ranges of values herein is not intended to be limiting, referring instead individually to any and all values falling within the range, unless otherwise indicated herein, and each separate value within such a range is incorporated into the description as if it was individually recited herein.

Words "about," "approximately" or the like, when accompanying a numerical value, are to be construed as including any deviation as would be understood by one of ordinary skill in the art to operate satisfactorily for an intended purpose. Ranges of values and/or numeric values are provided herein as examples only, and do not constitute a limitation on the scope of the described embodiments.

Any and all examples provided herein, or at least a portion thereof, as well as corresponding phrases ("for example", "such as", "in particular" or the like), are used merely to facilitate understanding of the principles of the present invention and to provide for sufficient disclosure of the present invention; however, these phrases do not pose any limitations on the embodiments of the present invention, for description of which embodiments they are utilized herein, in particular they do not limit practical implementations of elements, components, parts, assemblies, modules, blocks, devices, means and/or the like utilized to disclose the principles of design and operation of the present invention.

The description herein employs the following terms and definitions.

The term "illustrative" means a non-limiting example, instance or illustration. In a similar manner, the terms "for example" and "by way of example" used herein set off lists of one or more non-limiting examples, instances or illustrations. As used herein, circuitry is "configured" to perform a function whenever the circuitry comprises the necessary hardware and code (if any is necessary) to perform the function, regardless of whether performance of the function is blocked or forbidden (for example, by an operator-configurable setting, factory trim, etc.).

As used in the present invention, the term "correspondence" and derivatives thereof (i.e. adjective, verb, adverb) does not necessarily mean exact conformity or exact equality in/to/between whatsoever in any respect but may imply a departure or deviation from said equality within specified limits. For example, the term "corresponding coordinates", unless the description herein clearly dictates otherwise, means not only that these coordinates may be exactly equal to one another or may exactly coincide one another but also implies that said equality or coincidence of coordinates may be established with some error (for example, with the error of operation of a GPS system) or within the bounds of a predetermined geographic region surrounding an exact geographic point or region to which these coordinates belong, or an exact geographic location to which these coordinates belong.

As used in the present invention, the term "unmanned aerial system" (UAS), unless the description herein clearly dictates otherwise, refers to an unmanned car or an unmanned vehicle that is configured to fly or that is capable of moving through the air in automatic mode, i.e. without involving a human or external control sources, or is capable of moving through the air in semi-automatic mode, i.e. with receipt of at least a portion of control commands from a human (for example, a pilot, an operator, etc.) or an external source (for example, a control server) via predetermined communication channels. Unlimited examples of UASs are various multi-rotor UASs, for example, multicopter drones; single-rotor UASs, for example, unmanned helicopter; hybrid UASs, for example, rotary wing drones, and the like.

As used in the present invention, the term "fuselage", unless the description herein clearly dictates otherwise, refers to the body of a vehicle, where the type, shape, overall dimensions, design features and material of such a body are not specifically limited in any way.

As used in the present invention, the term "module", unless the description herein clearly dictates otherwise, refers to a functional element or a combination of functional elements of a device in the form of a part, node, block or other assembly unit that performs certain technical functions that provide for the functioning of the device. A module generally may be implemented in practice using a combination of known structural elements, a combination of known structural elements and known hardware, a combination of known structural elements and known software and hardware, or a combination of known hardware and known software. Accordingly, by way of example, the docking module is configured to detachably interact with at least one unmanned aerial system, wherein the docking module may be implemented using a combination of known structural elements, a combination of known structural elements and hardware, a combination of structural elements and software and hardware, or a combination of hardware and software. The control module may be implemented using hardware and software. The storage module for storing unmanned aerial systems enables accommodation of unmanned aerial systems in the interior thereof and/or on the fuselage and may be implemented using a combination of known structural elements, a combination of known structural elements and hardware, a combination of structural elements and hardware and software, or a combination of hardware and software. As used in the present invention, the module of integrated control may be a physical device, an apparatus, or a plurality of modules implemented using hardware, for example, using an application-specific integrated circuit (ASIC) or a field-programmable gate array (FPGA), or a combination of hardware and software, for example, using a microprocessor system and a set of instructions implementing the functionality of the control module, which (when executed) transform the microprocessor system into an application-specific device or system (for example, automatic pilot system). Furthermore, each of the modules, or at least one of them, may also be implemented in the form of a combination of hardware and software, wherein some of the functionality described herein with respect to one of the modules may be implemented by means of hardware only, whereas other functionality described herein in relation to the same module or other module may be implemented by way of hardware in combination with software.

As used in the present invention, the term "navigation command", unless the description herein clearly dictates otherwise, refers to instructions for directing a vehicle. Navigation commands may be presented, or provided, by a flight-control system as digital or analog instruction data or signals. Navigation commands may be originated by, without limitation, an automatic pilot system, a pilot (whether locally or remotely situated), and/or an obstacle-avoidance system. Navigation commands may be communicated to, for example, a control module or a steering system.

As used in the present invention, the term "manual control", unless the description herein clearly dictates otherwise, refers not only to control solely using human hands but also using human feet, fingers, voice, pupils or any suitable combination thereof. Thus, as used in the present invention, the term "manual control" refers to at least one of the following: buttons, levers, joysticks, toggle switches, pedals, touch screen, gesture control sensors, pupil-tracking scanners, microphone, etc.

As used in the present invention, the term "charging device", unless the description herein clearly dictates otherwise, refers to a device for replenishing the range of a vehicle or unmanned aerial system by way of recharging the battery thereof and/or by replenishing the fuel capacity thereof.

As used in the present invention, the term "database", unless the description herein clearly dictates otherwise, refers to any structured data set that does not depend on a specific structure, database management software, hardware of the computer that stores the data, uses the data or otherwise makes the data available for use. The database may be present on the same hardware running the process that stores or uses the information stored in the database, or it may be present on separate hardware, for example, a dedicated server or plurality of servers.

As used in the present invention, the term "stack", unless the description herein clearly dictates otherwise, refers to multiple objects disposed on top of one another. In particular, the term "stack of unmanned aerial systems" refers to a plurality of unmanned aerial systems of different or identical size disposed vertically on top of one another one by one or in batches.

As used in the present invention, the term "docking spot", unless the description herein clearly dictates otherwise, refers to a section of the surface or an area of space where there is performed the coupling of an unmanned aerial system to a tractive coupling element.

As used in the present invention, the term "parking station", unless the description herein clearly dictates otherwise, means a fixed or movable structure adapted to accommodate therein unmanned aerial systems and/or vehicles.

As used in the present invention, the term "server" refers to computing equipment executing a computer program for enabling receipt of requests (for example, from other computing devices) over a communication network, execution or processing of such requests and/or transmission of such requests over a communication network (for example, to other computing devices). The computing equipment executing a computer program may be, without limitation, a single physical computer or a single physical computer system. As used in the present invention, the use of the term "server" does not mean that each computational task (for example, received instructions or commands) or any other specific task will be received, executed, or cause performance by one and the same server (i.e. one and the same software and/or hardware), which means that any quantity of pieces of software or hardware may be involved in receiving/transmitting, executing, or may cause performance of any task or request, or the consequences of any task or request, where all that software and hardware may be implemented in the form of one or more servers.

Transport Device

FIG. 1-4 are schematic side views of illustrative embodiments of the vehicle according to the present invention. It should be noted that the vehicle 100-1 shown in FIG. 1, the vehicle 100-2 shown in FIG. 2, the vehicle 100-3 shown in FIGS. 3a and 3b, and the vehicle 100-4 shown in FIG. 4 generally have a similar or even identical structural design, and therefore, similar or identical structural/functional elements included in said vehicles 100-1, 100-2, 100-3, 100-4 are denominated in FIGS. 1, 2, 3a and 3b, 4, respectively, using the same reference numbers. For the convenience of description, vehicles 100-1, 100-2, 100-3, 100-4, shown in FIGS. 1, 2, 3a and 3b, 4, respectively, are denoted below using a reference number (100).

As shown in FIGS. 1-4, the vehicle 100 comprises a housing, body or fuselage 102 of any type which may have any suitable shape and dimensions that are imparted in the prior art to any known vehicle, and which may be made of any suitable material known in the prior art and used for manufacture of the housing of a vehicle. Thus, the type, shape, overall dimensions and material of the fuselage 102 in the vehicle 100 are not specifically limited in any manner within the scope of the present invention. The fuselage 102 shown in FIGS. 1-4 has a shape similar to that of the body of a helicopter, however those skilled in the art will readily appreciate that the fuselage 102 may have any other shape similar to that of any other vehicle, for example, an airplane, a shuttle, a passenger car, a truck, a bus, a motorcycle, a boat, a ship, a railway wagon, a locomotive, or any other vehicle known in the prior art.

The fuselage 102 may comprise a framework or a bearing frame, on which there is attached panelling, wherein there may be provided various doorways, portholes, etc., and which may be further provided with a fin, wing, wings, propeller, power plant, and/or the like, depending on a specific embodiment of the fuselage 102.

The fuselage 102 shown in FIGS. 1-4 may be made of metal, plastic, composite material (for example, composite sandwich panels), aluminum material (for example, aluminum sandwich panels), titanium material (for example, titanium sandwich panels) or any other suitable prior art material, including using any suitable combination of the above materials (for example, titanium sandwich panel with aluminum honeycomb core). The material of manufacture of the fuselage 102 in the vehicle 100 is not specifically limited in any manner in the present invention.

In one of the embodiments of the present invention, the fuselage 102 may be an exoskeleton or other load-carrying structure that may be attached at least to one of a pilot, passenger and cargo item or worn by at least one of them.

As shown in FIGS. 1-4, the fuselage 102 is also provided with a landing gear 116 which is substantially a support system necessary at least for takeoff, landing and parking of the vehicle on the ground, deck, water or surface of another physical object. The landing gear 116 may be of a skid type (see FIGS. 1, 4), a wheel type (see FIG. 2) or float type (see FIGS. 3a-3b). Furthermore, the landing gear 116 may be of a boat type or any other type known in the prior art. The type, shape, overall dimensions and material of the landing gear 116 in the vehicle 100 are not specifically limited in any manner within the scope of the present invention.

It should be noted that the landing gear 116, depending on specific embodiment thereof, may substantially provide for (i) controllability of the vehicle 100 while takeoff roll, landing roll, taxiing, turning around, towing, maneuvering on the take-off and landing strip; (ii) bearing of static loading from the weight while parking of the vehicle 100; (iii) shock absorption of dynamic loads arising while landing of the vehicle 100 (including emergency landing), taxiing and takeoff roll; (iv) absorption of translational braking energy of the vehicle 100 while maneuvering and braking while parking; and/or (v) retraction, extension and fixation of the extended or retracted position in flight.

In one of the embodiments of the present invention, the vehicle 100 may not be provided with landing gear 116 at all. In one of the variations of such embodiment of the present invention, the bottom of the fuselage 102 may be provided with a shock-absorbing pad (not shown) made of an elastic material (for example, rubber), which may be secured to said bottom on the exterior side thereof.

In another embodiment of the present invention, the fuselage 102 in the vehicle 100 may be further provided with at least one wing (not shown) which may be configured integral to the fuselage 102, may be attached to the fuselage 102 from the exterior side thereof or be at least partially embedded or integrated into the fuselage 102, wherein said wing may initially be in a folded state or retracted state (initial position) and may be configured to deploy into an unfolded or extended state (operational position), respectively, under control of the below-described control module of the vehicle 100. It should be noted that the quantity of wings with which the fuselage 102 may be provided may be selected taking into account the mass-dimensional characteristics and structural features of the fuselage 102 to create additional lift in flight and reduce the load on the below-described unmanned aerial systems 200 used to move the vehicle 100 by air, land and/or water. It should further be noted that at least one of the wings with which the fuselage 102 may be provided may be configured folding, telescopic, extendable, etc. to reduce the overall dimensions of the vehicle 100 in the parking position, wherein the deployment of said wing may be performed under control of the below-described control module of the vehicle 100 while takeoff of the vehicle 100 or during movement of the vehicle 100.

In another embodiment of the present invention, the fuselage 102 in the vehicle 100 may be further provided with wings to create additional lift in flight and at least one aircraft engine (not shown), and preferably two aircraft engines, to enable the movement of the vehicle 100 through the air (including in an emergency, for example in the event of damage, failure and/or complete discharge of most of the below-described unmanned aerial systems used to move the vehicle 100 through the air) or increase the speed of movement of the vehicle 100 through the air (i.e. enabling the operation of aircraft engines in addition to the below-described unmanned aerial systems used to move the vehicle 100 through the air in a standard situation). It should be noted that each such aircraft engine may be, for example, a propeller engine, jet engine, combined aircraft engine or any other suitable aircraft engine known in the prior art. It should also be noted that in case of using two aircraft engines in the vehicle 100 the designs and/or types thereof may coincide or be different from one another. Each such aircraft engine, with which the fuselage 102 in the vehicle 100 may be further provided, may operate under control of the below-described control module which may present control commands to the engine control driver so as to enable starting, stopping or altering the operating mode of said engine (changing the operating parameters of the engine).

In some other embodiment of the present invention, the fuselage 102 in the vehicle 100 may be further provided with a lift rotor (not shown) or a rotor propulsion unit of any other type known in the prior art to enable movement of the vehicle 100 through the air (including in an emergency, for example in the event of damage, failure and/or complete discharge of most of the below-described unmanned aerial systems used to move the vehicle 100 through the air) or increase the speed of movement of the vehicle 100 through the air (i.e. enabling the operation of the lift rotor or the rotor propulsion unit in addition to the below-described unmanned aerial systems used to move the vehicle 100 through the air in a standard situation). Furthermore, in the given embodiment of the present invention, the fuselage 102 in the vehicle 100 may further comprise a power plant (not shown) which may be defined, for example, by one or two turboshaft engines and which may be operably connected to each of the lift rotors of the vehicle 100, thus enabling supplying power to said lift rotors for actuating same. Each such power plant of the vehicle 100 operably connected to the lift rotors, with which the fuselage 102 may be further provided, in a manner to enable transfer of driving force thereto may be operated under control of the below-described control module which may present control commands to the power plant control driver so as to enable starting, stopping or altering the operating mode of said power plant (altering of the operating parameters of the power plant) so as to enable altering the state of those lift rotors.

In some other embodiment of the present invention, the fuselage 102 in the vehicle 100 may be further provided with at least one propulsion unit of any type known in the prior art to enable the movement of the vehicle 100 by air, land and/or water, depending on a specific embodiment of the vehicle 100. In particular, the fuselage 102 in the vehicle 100 may be further provided with an active propulsion unit (for example, a sail for creating a propulsive force by means of wind energy), a jet propulsion unit, including a hydrojet propulsion unit for creating a propulsive force by means of the action of water masses forced backwards (for example, an automated oar, paddle wheel, a marine propeller, a cycloidal or water jet propulsion unit) or an air jet propulsion unit for creating a propulsive force by means of the action of air masses forced backwards (for example, by an air propeller), or any other suitable propulsion unit known in the prior art.

In some embodiments of the present invention, the fuselage 102 in the vehicle 100 may be further provided with wheels (not shown), which may be mounted on the side of the bottom of the fuselage 102, and a power plant defined by one or more engines and operably connected to at least one of said wheels so as to enable driving thereof for moving the vehicle 100 over the surface of the earth or the surface of another ground object (for example, over a road, take-off and landing strip, etc.), wherein each of said engines forming a power plant may be, for example, an internal combustion engine or an electrical motor powered by a power source (for example, a battery) disposed in the fuselage 102. In such embodiments of the present invention, the power plant of the vehicle 100 operably connected to the wheels, with which the fuselage 102 may be further provided, in a manner to enable transfer of driving force thereto may be operated under control of the below-described control module which may present control commands to the power plant control driver so as to enable starting, stopping or altering the operating mode of said power plant (altering of the operating parameters of the power plant) so as to enable altering the state of those wheels.

In other embodiments of the present invention, the fuselage 102 in the vehicle 100 may be further provided with sensors (not shown) for measuring the flight parameters of the vehicle 100, and the control module (not shown) may be communicatively coupled to said measurement sensors and to an external source of control (for example, to a server 300) so as to enable presenting said measured parameters of flight of the vehicle to an external source of control, and further configured to receive, from the external source of control, control instructions in response to said parameters of flight of the vehicle so as to enable generation and presenting of control commands thereof taking into account said control instructions from the external source of control. It should be noted that the sensors for measuring the flight parameters of the vehicle 100 may be, for example, barometric altimeters, airspeed and Mach indicators, variometers, pitot tubes, central air data systems, pressure gauges, tachometers, thermometers, propulsion unit control systems, artificial horizons, heading instruments, and angle of attack/overload warning systems.

In other embodiments of the present invention, the fuselage 102 in the vehicle 100 may be further provided with sensors for measuring the parameters of state of the fuselage of the vehicle 100, and the control module may be communicatively coupled to said measurement sensors and to an external source of control (for example, to a server 300) so as to enable presenting said measured parameters of state of the fuselage of the vehicle to an external source of control, and further configured to receive, from the external source of control, control instructions in response to said parameters of state of the fuselage of the vehicle so as to enable generation and presenting of control commands thereof taking into account said control instructions from the external source of control. It should be noted that the sensors for measuring the parameters of state of the fuselage 102 in the vehicle 100 may be, for example, vibration sensors, force-sensing resistors, force sensors, and the like.

As shown in FIGS. 1-4, the fuselage 102 in the vehicle 100 restricts or defines the internal space 114, in which, in the portion corresponding to the cabin of the vehicle 100, there is installed a pilot seat 112 which may accommodate a pilot (not shown) capable of controlling the vehicle 100 using the instrument panel (not shown) and control elements (not shown) which may also be disposed in said cabin. Furthermore, in the internal space 114 restricted by the fuselage 102, in addition to a pilot, there may be accommodated at least one passenger, at least one luggage item of a passenger and/or at least one cargo item, wherein said pilot, passengers, cargo items and luggage items of passengers may be accommodated in corresponding spots in the common internal space 114 or may be accommodated each in a distinct zone defined by one or more partitions, or a distinct compartment defined by one or more partitions.

In one of the embodiments of the present invention, the pilot seat 112 may be disposed in the pilot cabin (not shown) in the vehicle 100 separated by a partition from the remainder of the internal space 114 which in turn may be divided by another partition into a passenger compartmnent in which there may be installed one or more passenger seats for accommodating passengers therein, and a luggage compartment or cargo compartment in which there may be accommodated cargo (in particular, one or more cargo items) and/or passenger luggage (in particular, one or more passenger luggage items), wherein said cargo items, passenger luggage items and/or passenger seats may be disposed on or attached to the bottom or floor of the fuselage 102. In one of the variations of the given embodiment of the present invention, the passenger compartment, instead of passenger seats, may provide the following: (i) rails installed on the lateral walls and/or the floor of the fuselage 102 for accommodating passengers while sitting or standing on the floor of the fuselage 102; (ii) couches, beds or benches secured to the floor of the fuselage 102 for accommodating thereon passengers in a sitting or lying position; (iii) specialized areas for accommodating disabled people in a sitting or lying position; (iv) specialized areas for wheelchairs used by disabled people; (v) specialized areas for accommodating baby cots used by infants; and (if necessary) accompanying persons thereof; and/or (vi) specialized areas for accommodating gurneys for transporting patients used by bedridden patients. It should be noted that the quantity of passengers in the passenger compartment may be from one person to several tens or even hundreds of people without making any limitations, wherein said quantity of passengers is substantially limited only by the area of the passenger compartment within the internal space 114. In another variation of the given embodiment of the present invention, in the cargo compartment there may be envisaged not only the possibility of accommodation of cargo and/or passenger luggage on the floor of the fuselage 102 and the possibility of securing same thereon using conventional fastening means known in the prior art but further may be provided shelves, hangers, boxes and other carrying means secured to the floor and/or lateral walls of the fuselage 102 and allowing additional cargo items and/or passenger luggage items to be accommodated in the cargo compartment. In another variation of the given embodiment of the present invention, the areas for passenger luggage, including shelves, hangers, boxes and other carrying means for accommodating passenger luggage items, may only be provided in the passenger compartment in addition to the above-described implementations of means for accommodating passengers in said passenger compartment. One skilled in the art would readily appreciate that cargo items and/or passenger luggage items may be at least partially secured or fixed also from the exterior side of the fuselage 102 using suitable fastening means known in the prior art (for example, using a dedicated enclosed-type attached equipment used in airplanes, cars, motorcycles, helicopters, bicycles, and the like). It should be noted that the above-described pilot cabin, passenger compartment and cargo compartment in the vehicle 100 may be made in general similar to the corresponding compartments of airplanes, helicopters, buses, cars, ships, power boats, etc.

In another embodiment of the present invention, the pilot seat 112 may be disposed in the pilot cabin (not shown) in the vehicle 100, the pilot cabin is separated by a partition from the remainder of the internal space 114, in which in turn on the bottom or floor of the fuselage 102 there may be accommodated or secured passengers (for example, in passenger seats), cargo items and passenger luggage items. Furthermore, an embodiment of the present invention is possible in which in the internal space 114 there may be accommodated only a pilot and passengers; an embodiment of the present invention is possible in which in the internal space 114 there may be accommodated only a pilot and cargo; an embodiment of the present invention is possible in which in the interior space 114 there may be accommodated only passengers and cargo; an embodiment of the present invention is possible in which in the internal space 114 there may be accommodated only passengers; an embodiment of the present invention is possible in which in the internal space 114 there may be accommodated only a pilot in the pilot seat 112; and an embodiment of the present invention is possible in which in the internal space 114 there may be accommodated only cargo.

It should be noted that the control elements (not shown) which may be installed in the internal space 114 defined by the fuselage 102 in the vehicle shown in FIGS. 1-4 substantially allow to control the vehicle 100 in semi-automatic mode (i.e. a combination of manual control by a pilot and automatic control using autopilot system) and enable manual input, by the pilot present in the pilot seat 112 and monitoring the instrument readings on the instrument panel (not shown), of at least one control command. The control elements (not shown) are communicatively coupled to the control module described below (not shown) so as to enable presenting each of said pilot's control commands to said control module, wherein some of said pilot's control commands may substantially replace the corresponding control commands of the control module generated by the control module (not shown) while controlling the vehicle 100 in automatic mode (i.e. in autopilot mode). In one of the embodiments of the present invention, there may not be provided participation of a pilot in the process of control of the vehicle 100, for which reason the above instrument panel (not shown), control elements (not shown) and the pilot seat 112 may be absent in the internal space 114, and the control of the vehicle 100 may be implemented practically completely in automatic mode (i.e. autopilot mode) using the below-described control module (not shown). In another embodiment of the present invention, the above control elements (not shown) and/or the above instrument panel (not shown) may be part of the below control module, thus allowing this control module to simultaneously enable manual control of the vehicle 100 by a pilot and enable automatic control of the vehicle 100 in autopilot mode.

As shown in FIGS. 1-4, the fuselage 102 in the vehicle 100 is further provided with a storage module 104 configured to removably accommodate (store or park) therein the below-described unmanned aerial systems 200 in a quantity corresponding to the predetermined capacity of said storage module 104, and a docking module 106 configured to detachably interact with at least with one of the unmanned aerial systems 200 accommodated in the storage module 104 so as to enable docking thereof to the fuselage 102 or to enable connection thereof to the fuselage 102, thus enabling movement of the vehicle 100 by air, water and/or land upon actuating or turning on said unmanned aerial systems 200 docked to the fuselage 102 or connected to the fuselage 102.

In one of the embodiments of the present invention, the fuselage 102 in the vehicle 100 may be provided with two or more identical or different storage modules 104 configured each to accommodate therein the below-described unmanned aerial systems 200 and two or more docking modules 106 configured each to detachably interact with at least one of the unmanned aerial systems 200 accommodated in any one of said storage modules 104 so as to enable docking or connection thereof to the fuselage 102, thus enabling movement of the vehicle 100 by air, water and/or land upon actuating or turning on said unmanned aerial systems 200 docked or connected to the fuselage 102.

Figure 2:
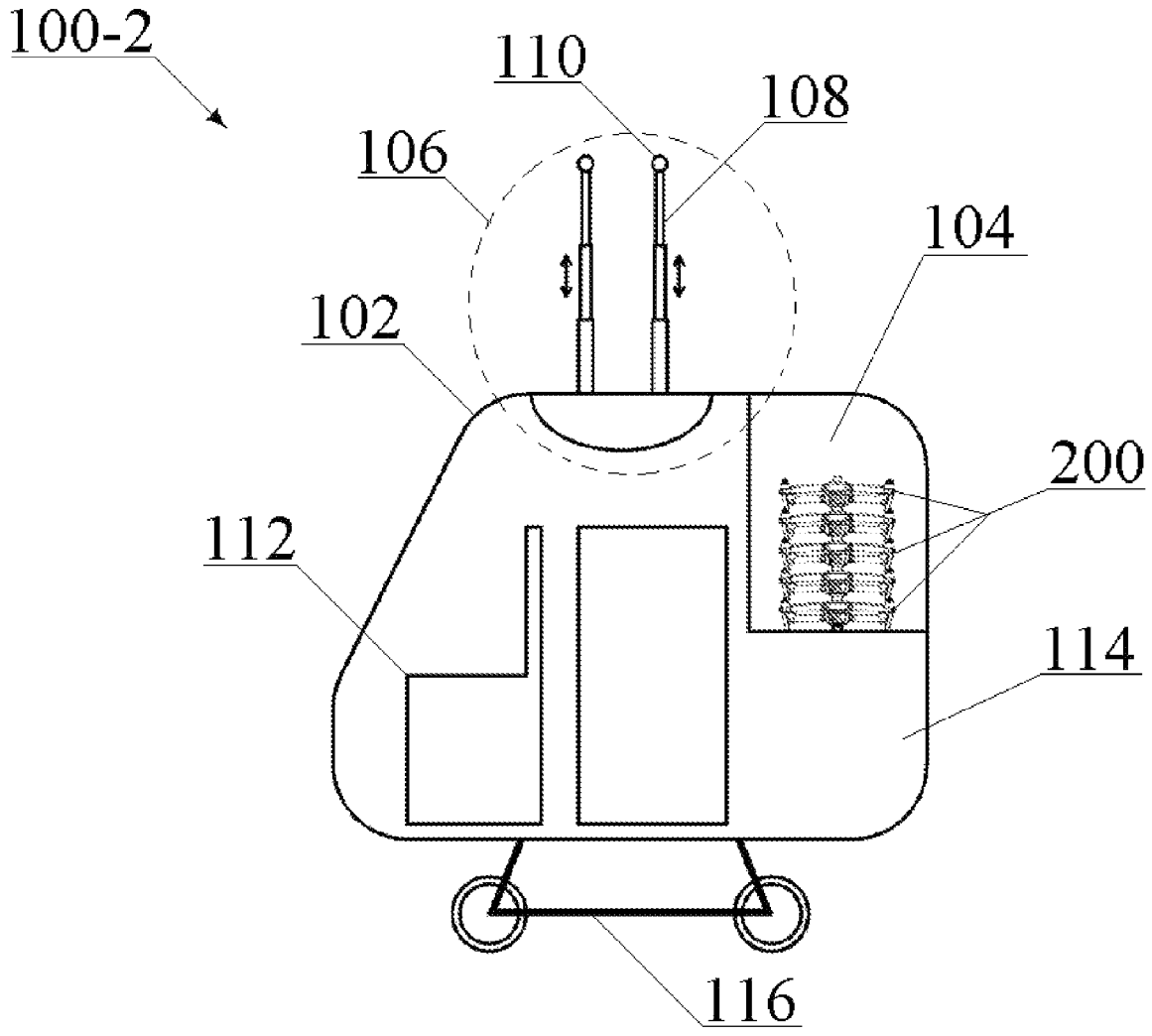
FIG. 2 is a schematic side view of a second illustrative embodiment of the vehicle according to the present invention.

Furthermore, the fuselage 102 in the vehicle 100 shown in FIGS. 1-2 comprises a control module (not shown) which is configured to present control commands to at least one of the unmanned aerial systems 200 stored in the storage module 104, thus enabling setting free or release of said unmanned aerial system 200 from the storage module 104 so as to enable directing same to the docking module 106 under control of the control module (not shown) for interaction with the docking module 106, as a result of which interaction that unmanned aerial system 200 is caused to be connected to the fuselage 102, wherein said control commands to release the unmanned aerial system 200 from the storage module 104 may be generated by the control module (not shown) before takeoff of the vehicle 100, after landing of the vehicle 100, while presence of the vehicle 100 in a parking space or stop (for example, on the parking station 400), or in the course of movement of the vehicle 100 by air, water and/or land. Furthermore, the control module (not shown) is further configured to present control navigation commands to at least one of the unmanned aerial systems 200 connected to the fuselage 102, thus enabling said unmanned aerial system 200 to be withdrawn from interaction with the docking module 106 so as to enable undocking thereof from the fuselage 102 so as to enable direction thereof to the storage module 104 under control of the control module (not shown) for accommodation in the storage module 104 in a free accommodation spot.

It should be noted that the storage module 104 for storing unmanned aerial systems may be configured in the form of a single storage module configured to accommodate the below-described unmanned aerial systems 200 therein, or a group of multiple storage modules coinciding or being different in terms of design and configured each to accommodate therein the below-described unmanned aerial systems 200.

In one of the embodiments of the present invention, the fuselage 102 may be provided with one or more storage modules 104, at least in one of which there may be pre-accommodated the unmanned aerial systems 200, and the remaining storage modules 104 of said storage modules 104 may remain free and available for accommodation therein of the unmanned aerial systems 200. In one of the variations of the given embodiment of the present invention, at least one of the storage modules 104 with which the fuselage 102 is provided and in which there are pre-accommodated unmanned aerial systems 200 may be completely filled with the unmanned aerial systems 200 (i.e. there are no free slots or spots for accommodation of additional unmanned aerial systems 200), and at least one other of said storage modules 104 in which there are pre-accommodated the unmanned aerial systems 200 may be partially filled with the unmanned aerial systems 200 (i.e. there are free slots or spots for accommodation therein of the unmanned aerial systems 200). Thus, within the framework of the given embodiment of the present invention, an instance is possible where the fuselage 102 in the vehicle 100 may be provided with only two storage modules 104, one of which may be fully or partially filled with the unmanned aerial systems 200 and the other one of which may not be filled at all or be partially filled with the unmanned aerial systems 200.

In another embodiment of the present invention, the fuselage 102 may be provided with one or more storage modules 104, however, in none of said storage modules 104 there are pre-accommodated unmanned aerial systems 200, wherein the unmanned aerial systems 200 required for the movement of the vehicle 100 may be automatically directed to one or more docking modules 106 being part of said vehicle 100 such that they may be connected to the fuselage 102 of said vehicle 100 in response to the corresponding request generated by the control module of said vehicle 100, and/or by a pilot controlling said vehicle 100 using the below-described control elements and input of control commands, and/or by the below-described server 300, and/or by one of the below-described parking stations 400, and/or by a control module of other vehicle 100 and/or by a pilot of other vehicle 100.

In another embodiment of the present invention, the docking module 106 in the vehicle 100 may be preliminarily brought into interaction with at least one unmanned aerial system 200, i.e. to the fuselage 102 there may be preliminarily connected at least one unmanned aerial system 200.

In another embodiment of the present invention, the docking module 106 may be permanently provided with at least one unmanned aerial system 200 brought into interaction with the docking module 106 without enabling withdrawing from interaction therewith while movement of the vehicle 100, wherein such unmanned aerial system 200 may be electrically connected to one of the below-described charging devices with which the storage module 104 may be provided, or may be electrically connected to the below-described power source (not shown) with which the fuselage 102 may be provided.

In some embodiments of the present invention, the fuselage 102 may be a framework (i.e. a skeleton of secured to one another load-bearing structural elements which is not provided with neither a roof, nor walls, nor floor) on which there are mounted or installed the above control module (not shown), docking module 106, UAS storage module 104, passenger seats or chairs, pilot seats or chairs, and/or spaces for luggage.

It should also be noted that the below-described unmanned aerial systems 200 may be part of the vehicle 200 as well as may not be part of said vehicle, wherein the storage module 104 in the vehicle 100 may be adapted or conditioned to accommodate the unmanned aerial systems 200 of various modifications and dimensions known in the prior art, and the docking module 106 in the vehicle 100 may also be adapted or conditioned to interact with the unmanned aerial systems 200 of various modifications and dimensions known in the prior art.

Non-limiting examples of means for providing detachable interaction between the unmanned aerial system 200 and the docking module 106 are the following connecting elements with which the docking module 106 must be provided at the appropriate docking spots: various suitable mechanical connecting or fastening means (brackets, grips, fasteners, mounting slots, cams, hooks, latches, etc.), electromechanical means under control of the control module (for example, electromechanical means of docking for docking to a mating element to be docked, electromechanical means of gripping for gripping a mating element to be gripped, or the like), electromagnetic means under control of the control module, magnetic means, vacuum grips under control of the control module, and/or the like. It should be noted that if the storage module 104 is provided with any connecting element from the above mechanical connecting or fastening means, electromechanical means, electromagnetic means, magnetic means and vacuum grips for detachable interaction with the unmanned aerial system 200, the unmanned aerial system 200 itself must be provided with mating connecting means of a suitable type which enable forming of a detachable connection with the appropriate connecting means used in said docking module 106.

The control module (not shown) being part of each of the vehicles 100 shown in FIGS. 1-4 may be a combination of hardware and software that enable performance of predetermined functionality described herein. In particular, the control module (not shown) in the vehicle 100 may be a processor device or computing device that acquires access to control program instructions in a manner to provide for execution thereof for implementing the relevant functionality described herein.

Furthermore, the control module (not shown) in the vehicle 100 may acquire access to control program instructions so as to enable execution thereof for (i) remote control of the below-described unmanned aerial systems 200 in fully automatic mode (autopilot), (ii) performing control of the unmanned aerial systems 200 in semi-automatic mode comprising receipt of at least a portion of control commands from a pilot who inputs same by means of at least one of the command input devices being part of the control elements in the pilot cabin, or (iii) performing control of the unmanned aerial systems 200 in automatic mode with receipt of at least a portion of the control commands from an external source of control (for example, from the below-described server 300, one of the below-described parking stations 400, the control module of other vehicle 100, satellite, control tower, and/or the like) via a wireless data transfer channel established between the control module of the vehicle 100 and said external source of control.

Thus, the vehicle 100 may be directed or moved by means of the control module of said vehicle 100 to a specific geographic location in automatic mode (autopilot without pilot intervention) in response to the control commands of said control module or one of the above external sources of control, as well as in semi-automatic mode (autopilot with pilot intervention) in response to the pilot control commands input by the pilot using the below-described control elements of the vehicle 100. In other words, an instance is possible where a decision relating to directing or moving the vehicle 100 to a specific geographic location may be made by the pilot of said vehicle 100 who may input an appropriate control command into the control module of the vehicle 100 using the below-described control elements of the vehicle 100, wherein said geographic location may be present in a vicinity of one or more below-described parking stations 400 and/or in a vicinity of one or more other vehicles 100.

The control module (not shown) in the vehicle 100 may comprise one or more data transfer interfaces for transmitting and/or receiving signals/commands/requests/instructions. It should be noted that the data transfer interfaces themselves, databases and other hardware may either be part of the control module, or may be implemented in the form of distinct modules or blocks communicatively coupled to the control module.

In one of the embodiments of the present invention, the control module (not shown) in the vehicle 100 may be communicatively connected via a communication network to an external source of control. In particular, the control module (not shown) in the vehicle 100 may be configured to obtain or receive control commands or instructions at least from one external source of control which may be each, by way of example, the below-described unmanned aerial systems 200, the below-described server 300 (see FIG. 5), parking stations 400 (see FIG. 5), an independent remote control device operably, communicatively coupled to the control module or the like such that the communication module may present the control commands thereof described herein in response to control instructions received by said control module at least from one external source of control with which the control module is pre-programmed to exchange data or with which the control module is pre-programmed to establish communication.

Furthermore, the control module (not shown) in the vehicle 100 may have access to one or more local or remote databases (not shown), measurement devices or sensors (not shown) installed from the exterior and interior sides of the fuselage 102, unmanned aerial systems 200 and/or external sources of control (for example, to the server 300 or parking stations 400).

To the control module (not shown) there may be initially communicated at least the following data used by the control module while performing the functions thereof: (a) the route of travel of the vehicle 100 with all target intermediate stops before the destination, including the geographic coordinates of each of said stops and destination, as well as the duration or time length of each of said intermediate stops; (b) the initial curb weight or initial curb mass of the vehicle 100, which weight is substantially the sum of weights or masses of at least the following components of the vehicle 100: fuselage 200 and other structural elements of the vehicle 100, landing gear 116, power plant (not shown) and associated therewith functional elements and systems, various on-board equipment (not shown), various equipage (including a pilot, pilot luggage, liquids and gases, domestic equipment, service equipage, luggage and cargo equipage, and the like); and (c) the initial weight of useful load, which weight is substantially the sum of the weights of at least the following objects in the vehicle 100: passengers, passenger luggage, cargos (including cargo containers and pallets), additional elements of equipment (including special rescue equipment in the form of boats, raft, life jackets, emergency rations, shotguns, and/or the like), and fuel (if any); (d) planned altered weight of useful load at each of target intermediate stops in accordance with the route of travel. It should be noted that the above data may be communicated to the control module by way of inputting same manually by the pilot so as to enable recording same into a local database by way of transferring same in the form of a data packet from an external source of control via a wireless data transfer channel established between the control module and said external source of communication, or may be received by the communication module from a remote data store, to which the communication module has access, in response to a request of the communication module, or the like.

It should be noted that in one of the embodiments of the present invention, the storage module 104 may be an unmovable structure which is configured to accommodate thereon or therein the below-described unmanned aerial systems 200 and which may be (i) secured to the fuselage 102 from the exterior side thereof, (ii) fully installed or secured in the fuselage 102 in the internal space 114 and is configured at least partially open to the external environment surrounding the fuselage 102 (for example, using a suitable opening provided in the fuselage 102 in a spot corresponding to the open portion of such a structure), or (iii) partially embedded or integrated into the body of the fuselage 102 in a manner to provide for access thereto from the exterior side of the fuselage 102. In another embodiment of the present invention, the storage module 104 may be a movable structure which is under control of the control module (not shown) and configured to accommodate thereon or therein the below-described unmanned aerial systems 200 and may be (i) secured on the fuselage 102 from the exterior side thereof in a manner to enable at least partial deployment, unfolding or expanding thereof under control of the control module so as to enable return thereof to the initial state thereof under control of the control module after accommodation of unmanned aerial systems 200, (ii) fully installed or secured in the fuselage 102 in the internal space 114 in a manner to enable extension thereof from the fuselage 102 and/or to enable deployment thereof beyond the limits of the fuselage 102 under control of the control module so as to enable return thereof to the initial state thereof under control of the control module after accommodation of unmanned aerial systems 200, or (iii) partially embedded or integrated into the body of the fuselage 102 in a manner to enable at least partial deployment, unfolding, expanding or extending thereof under control of the control module so as to enable return thereof to the initial state under control of the control module after accommodation of unmanned aerial systems 200. In another embodiment of the present invention, the storage module 104 may be an unmovable structure which may be secured on the fuselage 102 from the exterior side thereof, secured in the fuselage 102 or partially embedded/ integrated into the body of the fuselage 102, wherein access to free spots for accommodation of unmanned aerial systems 200 or to the unmanned aerial systems 200 themselves may be provided under control of the control module by way of, for example, opening a barrier structure or covering structure which prevents accessibility to the storage module 104 from the exterior side of the fuselage 102 and which may be, for example, (i) a hatch, door or flaps provided in the body of the fuselage 102, or (ii) a hatch, a door or flaps provided in the housing surrounding or enclosing the storage module 104, or (iii) a combination of the above (i.e. a combination of (i) and (ii)). In some other embodiment of the present invention, the storage module 104 may be a movable structure which may be secured on the fuselage 102 from the exterior side thereof, secured in the fuselage 102 or partially embedded or integrated into the body of the fuselage 102, wherein the possibility of actuating the storage module 104 in a manner to provide for deployment, expanding, unfolding or extending thereof followed by return to the initial position may be provided under control of the control module by way of, for example, opening a barrier structure or covering structure which prevents the possibility of moving the storage module 104 away from the fuselage 102 and which may be, for example, (i) a hatch, door or flaps provided in the body of the fuselage 102, or (ii) a hatch, door or flaps provided in a protective housing surrounding or enclosing the storage module 104, or (iii) an element or plate secured on the fuselage 102 and preventing the possibility of performing the deployment, expansion, unfolding or extension operation of the storage module 104, or (iv) a combination of the above (i.e. a combination of (i), (ii) and (iii)). In some other embodiment of the present invention, the storage module 104 may be an unmovable structure which may be rigidly secured on the fuselage 102 from the exterior side thereof or partially embedded/integrated into the body of the fuselage 102 and which may be closed by a barrier structure or covering structure (for example, an outer cover, casing or protective housing) preventing access from the exterior side of the fuselage 102 to the free spots of the storage module 104 for accommodation of unmanned aerial systems 200 or to the unmanned aerial systems 200 themselves in the storage module 104 and being under control of the control module, wherein access to such storage module 104 may be provided by way of, for example, opening, opening-out, opening-wide, displacing, shifting or removing said barrier structure or covering structure under control of the control module so as to enable subsequent return thereof to the initial position under control of the control module following accommodation of unmanned aerial systems 200.

It should also be noted that in one of the embodiments of the present invention, the docking module 106 may be an unmovable structure which is configured to interact with the below-described unmanned aerial systems 200 and which may be (i) secured on the fuselage 102 from the exterior side thereof, or (ii) partially embedded or integrated into the body of the fuselage 102 in a manner to provide for access thereto from the exterior side of the fuselage 102. In another embodiment of the present invention, the docking module 106 may be a movable structure which is under control of the control module (not shown) and which is configured to interact with the below-described unmanned aerial systems 200 and which may be (i) secured on the fuselage 102 from the exterior side thereof in a manner to enable at least partial deployment, unfolding or expanding thereof under control of the control module so as to enable return thereof to the initial state thereof under control of the control module, (ii) fully installed or secured in the fuselage 102 in the internal space 114 in a manner to enable at least partial extension thereof from the fuselage 102 and/or to enable deployment thereof beyond the limits of the fuselage 102 under control of the control module so as to enable return thereof to the initial state thereof under control of the control module, or (iii) partially embedded or integrated into the body of the fuselage 102 in a manner to enable at least partial deployment, unfolding, expanding or extending thereof under control of the control module so as to enable return thereof to the initial state under control of the control module. In another embodiment of the present invention, the docking module 106 may be an unmovable structure which may be secured on the fuselage 102 from the exterior side thereof, secured in the fuselage 102 or partially embedded/integrated into the body of the fuselage 102, wherein access to free docking spots for interaction therewith by the unmanned aerial systems 200 in a manner to provide for connection thereof to the fuselage may be provided under control of the control module by way of, for example, opening a barrier structure or covering structure which prevents accessibility to the docking module 106 from the exterior side of the fuselage 102 and which may be, for example, (i) a hatch, door or flaps provided in the body of the fuselage 102, or (ii) a hatch, a door or flaps provided in the housing surrounding or enclosing the docking module 106, or (iii) a combination of the above (i.e. a combination of (i) and (ii)). In some other embodiment of the present invention, the storage module 104 may be a movable structure which may be secured on the fuselage 102 from the exterior side thereof, secured in the fuselage 102 or partially embedded/integrated into the body of the fuselage 102, wherein the possibility of actuating the docking module 106 in a manner to provide for deployment, expanding, unfolding or extending thereof may be provided under control of the control module by way of, for example, opening a barrier structure or covering structure which prevents the possibility of moving the docking module 106 away from the fuselage 102 and which may be, for example, (i) a hatch, door or flaps provided in the body of the fuselage 102, or (ii) a hatch, door or flaps provided in a protective housing surrounding or enclosing the docking module 106, or (iii) an element or plate secured on the fuselage 102 and preventing the possibility of performing the deployment, expansion, unfolding or extension operation of the docking module 106, or (iv) a combination of the above (i.e. a combination of (i), (ii) and (iii)). In some other embodiment of the present invention, the docking module 106 may be an unmovable structure which may be rigidly secured on the fuselage 102 from the exterior side thereof or partially embedded/integrated into the body of the fuselage 102 and which may be closed by a barrier structure or covering structure (for example, an outer cover, casing or protective housing) preventing access from the exterior side of the fuselage 102 to the free docking spots in the docking module 106 for interaction of unmanned aerial systems 200 therewith in a manner to provide for connection thereof to the fuselage 102 and being under control of the control module, wherein access to such docking module 106 may be provided by way of, for example, opening, opening-out, opening-wide, displacing, shifting or removing said barrier structure or covering structure under control of the control module so as to enable subsequent return thereof to the initial position under control of the control module (as necessary).

Furthermore, the fuselage 102 in the vehicle 100 shown in FIGS. 1-4 is provided with a power source (not shown) which is one or more batteries and which may be installed on the fuselage 102 or in the interior thereof, and the storage module 104 is provided with one or more charging devices (not shown) electrically connected each to said power source and each enabling connection thereto of at least one of the unmanned aerial systems 200 accommodated in the storage module 104 so as to enable recharging or charging-up thereof. It should be noted that each of the charging devices (not shown) in the storage module 104 is a wireless charging device, a wired charging device, or a charging dock. In one of the embodiments of the present invention, the fuselage 102 in the vehicle 100 may comprise two or more distinct or electrically coupled to one another power sources, each of which comprises one or more batteries. In another embodiment of the present invention, each power source (not shown) may be at least one of a group comprising: a generator based on an internal combustion engine, a generator based on a hydrogen engine, a solar panel and any other suitable energy source known in the prior art disposed in the interior or on the fuselage 102. In another embodiment of the present invention, the power source (not shown) may be configured to connect to an external power source (not shown), for example, to an electrical network. Thus, when accommodating the unmanned aerial systems 200 in the storage module 104, each of them may be electrically connected to one of the power sources of the vehicle 100 by means of an appropriate charging device (not shown) electrically connected to said power source in a manner to provide for charging of said unmanned aerial system 200. Furthermore, any one of the power sources being part of the vehicle 100 may be further utilised to supply power to the control module, various sensors and measurement devices used in the vehicle 100 and described herein, and to other movable and/or electronic components used in the vehicle 100 and described herein; however, one skilled in the art would readily appreciate that these components may each have their own power source installed in the interior of the housing thereof.

In one of the embodiments of the present invention, at least one of the charging devices (not shown), with which the storage module 104 in the vehicle 100 may be provided, may be hydraulically connected by means of a pump connected by a hydraulic line to a reservoir or container with fuel in a manner to enable intake of fuel from said container so as to enable supply of said amount of intaken fuel to the fuel tank of an unmanned aerial system 200, the fuel tank is hydraulically connected to the fuel-powered engine of the unmanned aerial system 200, to replenish the range thereof (in particular, due to at least partial replenishment of fuel volume in the fuel tank of the unmanned aerial system 200).

The unmanned aerial systems 200 being brought into a detachable interaction each with one of the docking modules 106 so as to enable connection to the fuselage 102 are each a distinct unmanned vehicle capable of moving through the air under control of the control module of the vehicle 100 or under control of an external source of control (for example, the server 300 or parking station 400) which may present control navigation commands or instructions to the flight control module to control the flight of said unmanned vehicle 200. Each of the unmanned aerial systems 200 comprises one or more on-board power sources, each of which may be a battery, solar panel, hydrogen fuel cell, fuel cell of any other suitable type known in the prior art, generator based on an internal combustion engine, generator based on an airbreathing jet engine, generator based on a hydrogen engine, or the like.

Flight control of each of the unmanned aerial systems 200 may be performed, for example, using standard software and hardware used in the prior art to control similar unmanned aerial systems 200 and supplied together with such unmanned aerial systems 200. In particular, the unmanned aerial systems 200 may be commercially available unmanned aerial systems 200 of any type and any modification provided with a built-in autopilot function and/or a built-in remote manual, or automatic, control function. In one of the embodiments, each of the unmanned aerial systems 200 may be controlled by an operator who may be present immediately in the interior of the fuselage 102 or who may perform remote control from another location, for example from a mobile or stationary center for flight control of unmanned aerial systems.

Furthermore, each of the unmanned aerial systems 200 also comprises a frame/framework/housing, at least one rotor propulsion unit electrically connected to a power source for actuating same so as to move the unmanned aerial system 200 through the air, and at least one of the following means of wireless communication: an SW band radio antenna, USW radio antenna, UHF radio antenna, optical communication module, half-duplex/simplex satellite communication module, 2G/3G/4G/LTE/5G communication cellular module, wireless network communication between multiple unmanned aerial systems and/or radio repeaters, and the like.

Furthermore, each of the unmanned aerial systems 200 may further comprise at least one of the following sensors: an obstacle detection sensor (LiDAR, ultrasonic sensor, IR sensor, radar, video sensor, and the like), a positioning sensor (gyroscope sensor, GPS, GLONASS, radar, and the like). Furthermore, each of the unmanned aerial systems 200 may further comprise a battery charge level sensor configured to measure the battery charge capacity of the unmanned aerial system 200. Furthermore, the module of unmanned vehicle flight control installed in each unmanned aerial system 200 comprises a processor which is electrically connected to an on-board power source and communicatively coupled to the sensors of the unmanned aerial system 200 and communicatively coupled with wireless communication means of the unmanned aerial system 200 and connected to the rotor propulsion unit of the unmanned aerial system 200 in a manner to enable control of operation thereof, wherein said processor is configured to execute machine-readable control commands or navigation commands in automatic mode or at least partially based on commands received from the operator or other external source of control via at least one wireless communication channel.

Furthermore, each of the unmanned aerial systems 200 may further comprise at least one means of detachable interaction with the docking module 106, at least one means of detachable mechanical connection of said unmanned aerial system 200 to at least one other unmanned aerial system 200, a means of providing for serial or parallel electrical connection of said unmanned aerial system 200 to at least one other unmanned aerial system 200 in a manner to enable disconnection therefrom and/or a means of providing for a detachable electrical connection of the battery of said unmanned aerial system 200 to the charging device of the storage module 104, depending on a specific embodiment of the present invention.

Non-limiting examples of means for providing detachable interaction between the unmanned aerial system 200 and the docking module 106 are the following connecting elements provided on the body of the unmanned aerial system 200: various suitable mechanical connecting or fastening means (brackets, grips, fasteners, mounting slots, cams, hooks, latches, etc.), electromechanical means under control of the control module (for example, electromechanical means of docking for docking to a mating element to be docked, electromechanical means of gripping for gripping a mating element to be docked, or the like), electromagnetic means under control of the control module, vacuum grips under control of the control module, and/or the like. It should be noted that if the unmanned aerial system 200 is provided with any connecting element from the above mechanical connecting or fastening means, electromechanical means, electromagnetic means, magnetic means and vacuum grips for detachable interaction with the docking module 106, then the docking module 106 itself in an appropriate docking spot must be provided with mating connecting means of a suitable type enabling formation of a detachable connection with the corresponding connecting means used in said unmanned aerial system 200.

As shown in FIGS. 1-4, the docking module 106, with which the fuselage 102 is provided, is a docking structure partially embedded or integrated into the fuselage 102 and comprises tractive coupling elements 108, each of which is configured to detachably couple to at least one of the unmanned aerial systems 200 or to grip at least one of the unmanned aerial systems 200, wherein the unmanned aerial system 200 which may be coupled to the corresponding tractive coupling element 108 may be (i) an unmanned aerial system 200 released from the storage module 104 in which storage module it was accommodated in the vehicle 100, (ii) an unmanned aerial system 200 directed from the parking station 400 to said docking module 106, or (iii) an unmanned aerial system 200 released from the storage module 104 of other vehicle 100. To provide for the coupling of the unmanned aerial system 200 to the tractive coupling element 108, this unmanned aerial system 200 must fly to a free docking spot which may be (a) a specific section of surface of the docking module 106, (b) a specific region of space around the docking module 106 or above same, (c) a region of space around the tractive coupling element 108, or (d) a region of space above the tractive coupling element 108 or in the vicinity of same. The unmanned aerial system 200 present in the target docking spot is brought into interaction with the docking module 106 by coupling same to the tractive coupling element 108 corresponding to said docking spot. Before performing takeoff of the vehicle 100, sequentially performed are at least the following operations: (1) releasing a first group of unmanned aerial systems 200 from the storage module 104; (2) directing said first group of unmanned aerial systems 200 released from the storage module 104 to free docking spots of the docking module 106, each of which docking spots corresponds to one of unmanned aerial systems 200 in said first group; (3) while said unmanned aerial systems 200 are present in the corresponding docking spots of the docking module 106, bringing each of said unmanned aerial systems 200 into coupling with the corresponding one of the tractive coupling elements 108 in a manner to provide for connection to the fuselage 102; and (4-1) providing for takeoff or lift into the air of the fuselage 102 connected by the tractive coupling elements 108 to the corresponding unmanned aerial systems 200 in a manner to provide for movement of the vehicle 100 through the air at a predetermined flight altitude adjustable by the control module, or (4-2) providing for movement of the fuselage 102 connected by tractive coupling elements 108 to the corresponding unmanned aerial systems 200 in a manner to provide for movement of the vehicle 100 by air, water and/or land. In a similar manner, performed is the operation of bringing at least one unmanned aerial system 200 into interaction with the coupling module 106 by way of coupling same to the corresponding free tractive coupling element 108 to provide for connection of said unmanned aerial system 200 to the fuselage 102 while movement of the vehicle 100 by air, water and/or land, thus substantially resulting in obtaining a second group of unmanned aerial systems 200 connected to the fuselage 102, wherein the quantity of unmanned aerial systems 200 in said first and second groups may coincide or be different. It should be noted that the unmanned aerial systems 200 that may be brought into coupling with each tractive coupling element 108 may be unmanned aerial systems 200 released from the docking module 104, unmanned aerial systems 200 from parking stations 400, unmanned aerial systems 200 from docking modules 104 of other vehicles 100 and/or any other unmanned aerial systems that may be directed to the vehicle 100 within the framework of the subject technology described herein.

In one of the embodiments of the present invention, the control module 100 in the vehicle 100 may be connected via a wireless and/or wired data transfer network to a plurality of unmanned aerial systems 200 connected to the fuselage 102 of the vehicle 100 by means of the docking module 106, wherein in case of wired connection the corresponding tractive coupling elements 108 may be further provided with appropriate wired data transfer channels, and coupling mechanisms 110 may be further provided with appropriate connectors for connecting and exchanging data with the unmanned aerial systems 200.

For withdrawing at least one unmanned aerial system from connection to the fuselage 102 while movement of the vehicle 100 by air, water and/or land (for example, in flight) or after stopping of the vehicle 100 (for example, after touchdown or landing), performed are at least the following operations: (1) uncoupling or withdrawing from coupling of said unmanned aerial system 200 to the corresponding tractive coupling element 108 at the corresponding docking spot of the docking module 106, thus causing the withdrawal of said unmanned aerial system 200 from interaction with the docking module 106; and (2) directing the uncoupled unmanned aerial system 200 to the storage module 104 in manner to provide for accommodation thereof in a spot, being free for accommodation, in the storage module 104 for charging using a charging device corresponding to said spot being free for accommodation.

Thus, by means of the docking module 106, to the fuselage 102 there may be connected the unmanned aerial systems 200 in a quantity required to provide sufficient lift to move the vehicle 100 with useful load by air, water and/or land. To each tractive coupling element 108 there may be connected or coupled one unmanned aerial system 200 or a group of multiple unmanned aerial systems 200.

In one of the embodiments of the present invention, at least two of the unmanned aerial systems 200 to be connected to the fuselage 102 may be configured to mechanically connect to one another to form an aggregate unmanned aerial system configured to detachably interact with at least one of the docking modules 106. Thus, one of the above unmanned aerial systems 200 connected to the fuselage 102 before takeoff of the vehicle 100, while movement of the vehicle 100 by air, water and/or land (for example, during a flight thereof) or after stopping of the vehicle 100 (for example, after landing or touchdown thereof) may be an aggregate unmanned aerial system (not shown) formed by multiple unmanned aerial systems 200 mechanically connected to one another. It should be noted that the unmanned aerial systems 200 forming such an aggregate unmanned aerial system (not shown) may be mechanically connected to one another in a horizontal plane and/or vertical plane to form an aerial structure of connected to one another unmanned aerial systems 200 that has any shape and geometric dimensions suitable for the interaction of such an aggregate unmanned aerial system (not shown) with at least one of the docking modules 106 and suitable for free movement of such aggregate unmanned aerial system (not shown) by air, water and/or land. Accordingly, the aggregate unmanned aerial system may be a structure in the form of an umbrella or a parachute formed by connected to one another unmanned aerial systems 200, wherein such aggregate unmanned aerial system (not shown) may respond to control commands or instructions as integral whole, i.e. the operation of unmanned aerial systems 200 in such aggregate unmanned aerial system may be synchronized (for example, using the control module of the vehicle 100, the parking station 400, or the server 600). Furthermore, the unmanned aerial systems 200 forming such aggregate unmanned aerial system (not shown) may be electrically connected to one another to form a single power supply circuit and an aggregate power source (for example, it may be formed by batteries of connected to one another unmanned aerial systems 200) supplying power to or powering all said unmanned aerial systems 200 substantially simultaneously, thus making it possible to consider the range not of each such unmanned aerial system 200 individually but rather the range of an aggregate unmanned aerial system (not shown) as a whole. It should also be noted that the process of mutual mechanical connection of unmanned aerial systems 200 may be started or launched in response to control commands presented by the control module of the vehicle 100 or by the server 600 to said unmanned aerial systems 200. It should be noted that the mutual mechanical connection between the unmanned aerial systems 200 forming an aggregate unmanned aerial system (not shown) may be implemented immediately between the housings or bodies of the unmanned aerial systems 200 to be connected, as well as by means of a connecting structure which may be configured, for example, in the form of a stationary structure rigidly secured to the fuselage 102 (for example, using fastening means known in the prior art, or using at least one of the docking modules 106) or partially embedded thereinto, or which may be configured in the form of an expandable, extendable or deployable, by air, water and/or land, structure configured to connect to the fuselage 102 using at least one of the docking modules 106. It should also be noted that the above aggregate unmanned aerial system (not shown) may be formed from unmanned aerial systems 200 released from the storage module 104 of the same vehicle 100, unmanned aerial systems 200 released from the storage modules 104 of at least one other vehicle 100, and/or unmanned aerial systems 200 directed to the vehicle 100 from at least one parking station 400. In one of the variations of the given embodiment of the present invention, the movement of the vehicle 100 may be performed by an aggregate unmanned aerial system (not shown) connected to the fuselage 102 in this vehicle 100, wherein, when discharged, said aggregate unmanned aerial system (not shown) may be replaced with another (charged) aggregate unmanned aerial system while movement of the vehicle 100 by air, water and/or land, or while stopping of the vehicle 100 (for example, after landing or touchdown thereof, including in accordance with the route of travel thereof). In case of replacing a discharged aggregate unmanned aerial system (not shown) with a charged aggregate unmanned aerial system, the unmanned aerial systems 200 being part of an aggregate unmanned aerial system (not shown) disconnected from the fuselage 102 may be directed to the storage module 104 of the same vehicle 100, the storage module 104 of other vehicle 100 and/or at least on one of the parking stations 400.

The quantity of unmanned aerial systems 200 connected to the fuselage 102 before takeoff of the vehicle 100, while movement of the vehicle 100 by air, water and/or land (for example, while flight thereof) or after stopping of the vehicle 100 (for example, after landing or touchdown thereof) may be from two or more units; further, in some embodiments of the present invention, the quantity of unmanned aerial systems 200 connected to the fuselage 102 may be multiple units, multiple dozens of units, or even multiple hundreds of units. To provide for the required load capacity, there may be used a plurality of unmanned aerial systems 200 with identical load capacity or different load capacity; however, the total load capacity provided by these unmanned aerial systems 200 must correspond to said required load capacity. The unmanned aerial systems 200 to be connected to the fuselage 102 may coincide, as well as be different in terms of design.

In one of the embodiments of the present invention, at least one of the unmanned aerial systems 200 accommodated in the storage module 104 in the vehicle 100 may be provided with a tractive coupling element 108 configured to detachably interact with the docking module 106.

In another embodiment of the present invention, the docking module 106 may be disposed from the exterior side of the fuselage 102 so as to enable detachable coupling of a plurality of unmanned aerial systems 200 to the corresponding tractive coupling elements, thus providing for connection thereof to the fuselage 102. Distinct tractive coupling elements 108 in the vehicle 100 may at least partially be present in the interior of the fuselage 102, wherein they may be extended or drawn-out from the fuselage 102 using an extending or pulling mechanism, respectively, being under control of the control module.

In another embodiment of the present invention, the docking module 106 may have two or more docking spots enabling to substantially simultaneously accommodate therein the unmanned aerial systems 200 to be connected to the fuselage 102, followed by substantially simultaneous coupling thereof to the corresponding tractive coupling elements 108 and, consequently, followed by a substantially simultaneous takeoff together with these tractive coupling elements 108.

In some other embodiment of the present invention, the docking module 106 may have only one docking spot such that the docking module 106 may be configured to simultaneously accommodate only one unmanned aerial system 200 in a docking spot of the docking module 106 for coupling to the tractive coupling element 108 and followed by takeoff together with this tractive coupling element 108, wherein in said docking spot of the docking module 106 there may be sequentially accommodated a second and further unmanned aerial systems 200, each of which will later be coupled to a free tractive coupling element 108 followed by takeoff together with this tractive coupling element 108. In the given embodiment of the present invention, the disconnection of one or more unmanned aerial systems 200 from the fuselage 102 may be performed in reverse order by way of sequentially disposing the unmanned aerial systems 200 to be disconnected in the docking spot, as well as otherwise. In particular, one skilled in the art would readily appreciate that in order to uncouple an unmanned aerial system 200 from a tractive coupling element 108 it may not necessarily be necessary to dispose the unmanned aerial system 200 in the docking spot of the docking module 106, wherein said unmanned aerial system 200 may be uncoupled from the tractive coupling element 108 when the latter is present in a drawn-out position, and the return of the tractive coupling element 108 to the initial position may be performed by the docking module 106 following uncoupling the unmanned aerial system 200 from the tractive coupling element 108, for example, using a return spring, return electromechanical means, return electromagnetic means, and the like.

In other embodiments of the present invention, the docking module 106 may be configured to simultaneously accommodate two or more unmanned aerial systems in the docking spot for coupling all of them to one and the same free tractive coupling element 108 or coupling each to one of free tractive coupling elements 108. Thus, in these embodiments of the present invention, there is provided a possibility to simultaneously accommodate two or more unmanned aerial systems 200 in a docking spot, followed by coupling same to one tractive coupling element 108 or corresponding tractive coupling elements 108 and collective takeoff. Furthermore, in these embodiments of the present invention, in the docking spot of the docking module 106 there may be sequentially accommodated next two or more unmanned aerial systems 200 which then will be coupled all to one and the same free tractive coupling element 108 or coupled each to one of free tractive coupling elements 108 and, consequently, will perform a collective takeoff. The uncoupling of one or more unmanned aerial systems 200 may be performed in reverse order by way of sequential disposing in the docking spot, as well as otherwise. In particular, one skilled in the art would readily appreciate that in order to uncouple an unmanned aerial system 200 from a tractive coupling element 108 it may not necessarily be necessary to dispose the unmanned aerial system 200 in the docking spot of the docking module 106, since said unmanned aerial system 200 may be uncoupled from the tractive coupling element 108 when that tractive coupling element 108 is present in a drawn-out position, and the return of the tractive coupling element 108 to the initial position may be performed by the docking module 106 following uncoupling the unmanned aerial system 200 from the tractive coupling element 108, for example, using a return spring, return electromechanical means, return electromagnetic means, and the like.

Illustrative examples of non-limiting embodiments of the tractive coupling elements 108 will be described further with reference to FIGS. 1, 2, 3*a*, 3*b* and 4.

As shown in FIGS. 1-2, the tractive coupling element 108 may be configured to alter the length or degree of release/extension thereof.

As shown in FIG. 1, the docking module 106 is at least partially embedded or integrated into the fuselage 102 and comprises tractive coupling elements 108 provided each with a coupling mechanism 110 and configured each to detachably couple to at least one of the unmanned aerial systems 200 in a manner to provide for drawing-out of said tractive coupling element 108 from the fuselage 102. In other words, in the vehicle 100 shown in FIG. 1, each tractive coupling element 108 may be configured drawable.

In one of the embodiments of the present invention, the docking module 106 in the vehicle 100 shown in FIG. 1 may further comprise a device for adjusting the length of release of the tractive coupling element or a device for locking and unlocking the release of the tractive coupling element, which device may adjust or set the length of the release of the tractive coupling element 108 and which device may be under control of the control module (not shown), wherein the unmanned aerial system 200, following coupling thereof to the tractive coupling element 108, may be configured to take off and draw the tractive coupling element 108 to a predetermined length set using said device for locking and unlocking the release of the tractive coupling element. Due to the possibility of setting or altering the length of the release of the tractive coupling element 108, the unmanned aerial systems 200 brought into interaction with the coupling module 106 may be disposed at different distances from the fuselage 102, and after the uncoupling of each unmanned aerial system 200 from the tractive coupling element 108, the latter may be returned to the initial position thereof using a retracting mechanism installed in the docking module 16, and, consequently, will become available again in the docking spot for coupling thereto another unmanned aerial system 200 (i.e. it will obtain the status of a free tractive coupling element 108).

As shown in FIG. 2, the docking module 106 is at least partially embedded or integrated into the fuselage 102 and comprises tractive coupling elements 108 provided each with a coupling mechanism 110 and configured to extend from the fuselage 102 so as to enable detachable coupling to at least one of the unmanned aerial systems 200, wherein the control module may be further configured to control the extension of said tractive coupling elements 108 in the docking module 106. In other words, in the vehicle 100 shown in FIG. 1, the tractive coupling element 108 may be configured extendable.

In one of the embodiments of the present invention, the docking module 106 in the vehicle 100 shown in FIG. 2 may further comprise a device for adjusting the length of the release of the tractive coupling element or a device for locking and unlocking the release of the tractive coupling element which device may adjust or set the length of the release of the tractive coupling element 108 and which device may be under control of the control module (not shown). Thanks to the possibility of setting or altering the length of the release of the tractive coupling element 108, the unmanned aerial systems 200, after being coupled to the tractive coupling element 108 may take off in a manner to extend that tractive coupling element 108 to a predetermined length, limited by the device for locking and unlocking the release of the tractive coupling element, from the fuselage 102. In one of the embodiments in the vehicle 100 shown in FIG. 2, the extendable tractive coupling element 108 may lift, by means of a device for locking and unlocking the release of the tractive coupling element, the unmanned aerial system 200 to a predetermined position relative to the fuselage 102 (i.e. to a position remote from the fuselage 102 by a predetermined distance), and after uncoupling each unmanned aerial system 200 from the tractive coupling element 108, the latter may be returned to the initial position thereof using the very same device for locking and unlocking the release of the tractive coupling element and consequently will become available again in the docking spot for coupling thereto another unmanned aerial system 200 (i.e. it will obtain the status of a free tractive coupling element 108).

In another embodiment of the present invention, the fuselage 102 in the vehicle 100 shown in FIG. 2 may be further provided with a detection device (not shown) configured to identify or detect in the operating area at least one of the unmanned aerial systems which is to be docked to the corresponding one of the tractive coupling elements 108. In such an embodiment of the present invention, the detection device (not shown) may be further connected to the control module (not shown) in a manner to enable to present thereto data relating to detected unmanned aerial systems occurred in the operating area thereof, and the control module, in turn, may further enable actuating (for example, by means of an extending mechanism controlled by the control module) at least one of the extendable tractive coupling elements 8 in response to said data relating to detected unmanned aerial systems so as to enable extension of said actuated tractive coupling element 108 from the fuselage 102. It should be noted that in the given embodiment of the present invention, the detection device may be a photo camera, video camera, LIDAR, radar, IR sensor, ultrasonic sensor, RFID tag, and the like. It should be noted that in the given embodiment of the present invention, the unmanned aerial systems 200 which the detection device (not shown) may detect in the operating area thereof may be unmanned aerial systems 200 released from a docking module 104, unmanned aerial systems 200 from parking stations 400, unmanned aerial systems 200 from docking modules 104 of other vehicles 100 and/or any other unmanned aerial systems that may be directed to the vehicle 100 within the scope of the proposed technology described herein. In one of the variations of the given embodiment of the present invention, the detection device may be configured in the form of an image capturing device configured to capture images in the field of view in real time so as to enable identifying in said field of view at least one of the unmanned aerial systems which is to be docked to the corresponding one of the tractive coupling elements 108, and presenting, to the control module, data relating to the identified unmanned aerial systems having occurred in the field of view of said image capturing device, wherein such image capturing device may be a photo camera, video camera, video recorder, video radar, and the like.

Figure 3A:
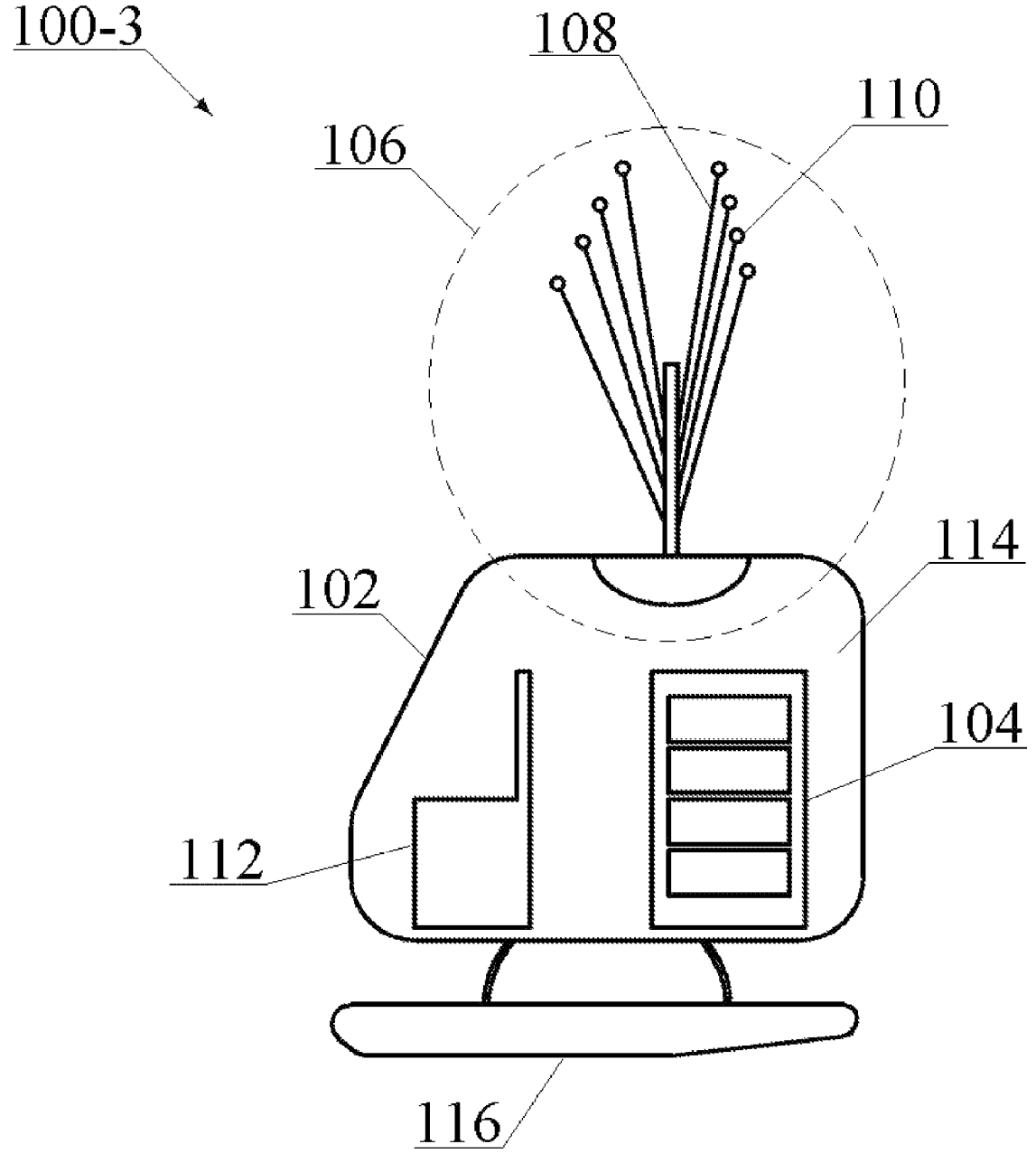
FIG. 3a is a schematic a side view of a third illustrative embodiment of the vehicle according to the present invention with the docking module in a folded state.
Figure 3B:
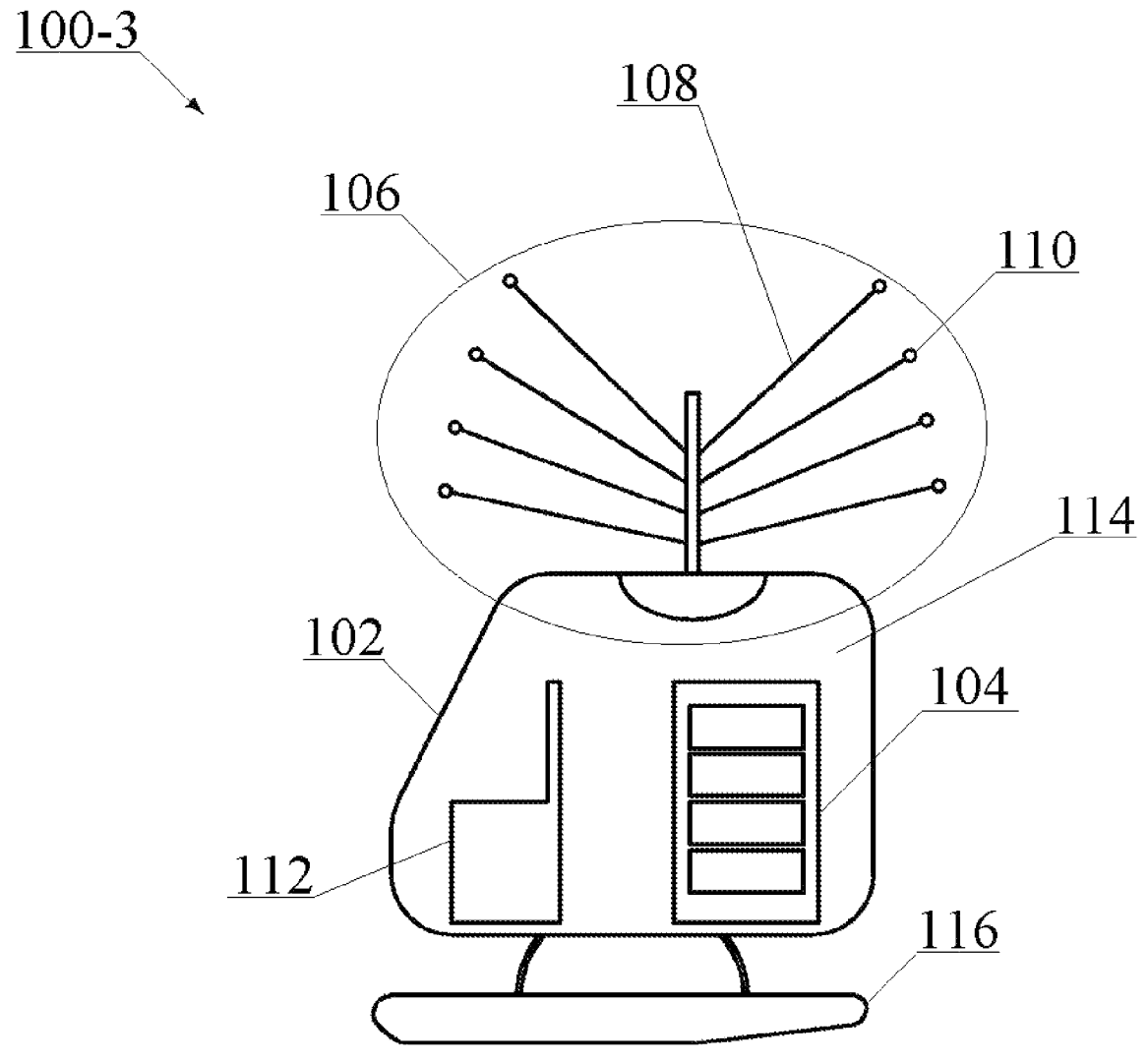
FIG. 3b is a schematic a side view of a third illustrative embodiment of the vehicle according to the present invention with the docking module in an unfolded state.

As shown in FIGS. 3*a* and 3*b*, the docking module 106 is at least partially embedded or integrated into the fuselage 102 and is an extendable coupling structure provided with tractive coupling elements 108 provided each with a coupling mechanism 110 and configured each to detachably couple same to at least one of the unmanned aerial systems 200, wherein said extendable coupling structure is configured to at least partially extend from the fuselage 102 under control of the control module so as to enable liberation of the tractive coupling elements 108 depending on the degree of extension. In other words, the greater the degree of extension of the extendable coupling structure in the vehicle 100 shown in FIGS. 3*a* and 3*b*, the greater the quantity of free tractive coupling elements 108 that become available for coupling thereto the unmanned aerial systems 200. The control module in the vehicle 100 shown in FIGS. 3*a* and 3*b* is further configured to control the operation of the extendable coupling structure by means of an extending mechanism controlled by the control module, thus enabling adjustment of degree of extension thereof.

After complete extension of the extendable coupling structure, as shown in FIG. 3*a*, this extendable coupling structure may be further configured to be at least partially deployed so as to enable removal of the released tractive coupling elements 108 from one another to a distance depending on the degree of deployment, thus improving access to said tractive coupling elements 108 for coupling thereto the unmanned aerial systems 200, wherein the control module is further configured to control the deployment of said coupling structure by means of a deploying mechanism controlled by the control module, thus making it possible for the control module to adjust the degree of deployment of the coupling structure in the range from partially deployed to fully deployed or to return this coupling structure from the deployed state back to the folded state in which it is present while it is fully or partially extended from the fuselage 102. In particular, FIG. 3*b* shows the extendable coupling structure in a fully expanded form.

In one of the embodiments of the present invention, after complete extension of the extendable coupling structure, as shown in FIG. 3*a*, this extendable coupling structure may be further configured to be at least partially expanded so as to enable removal of the released tractive coupling elements 108 from one another to a distance depending on the degree of expansion, thus improving access to said tractive coupling elements 108 for coupling thereto the unmanned aerial systems 200, wherein the control module is further configured to control the expansion of said coupling structure by means of an expanding mechanism controlled by the control module, thus making it possible for the control module to adjust the degree of expansion of the coupling structure in the range from partially expanded to fully expanded or to return this coupling structure from the expanded state back to the folded or closed state in which it is present when it is fully or partially extended from the fuselage 102. It should be noted that the design of the expanding mechanism used to expand the coupling structure is not specifically limited in any way, wherein said expanding mechanism may be, for example, a hinged structure substantially identical to a folding umbrella, said structure providing compact footprint in the folded or closed state and configured to transform into a volumetric framework structure provided with a plurality of tractive coupling elements 108 for coupling thereto the unmanned aerial systems 200, wherein the mutual disposition of the unmanned aerial systems 200 relative to one another may be provided not only by the system of positioning thereof but also by the design of the tractive coupling element 108. The docking module 106 may be configured to adjust the length and width of expansion of the tractive coupling element 108 while altering the state thereof from a folded or closed state to an unfolded or expanded state, and may also comprise one or more intermediate positions for various configurations of connection of unmanned aerial systems 200.

Figure 4:
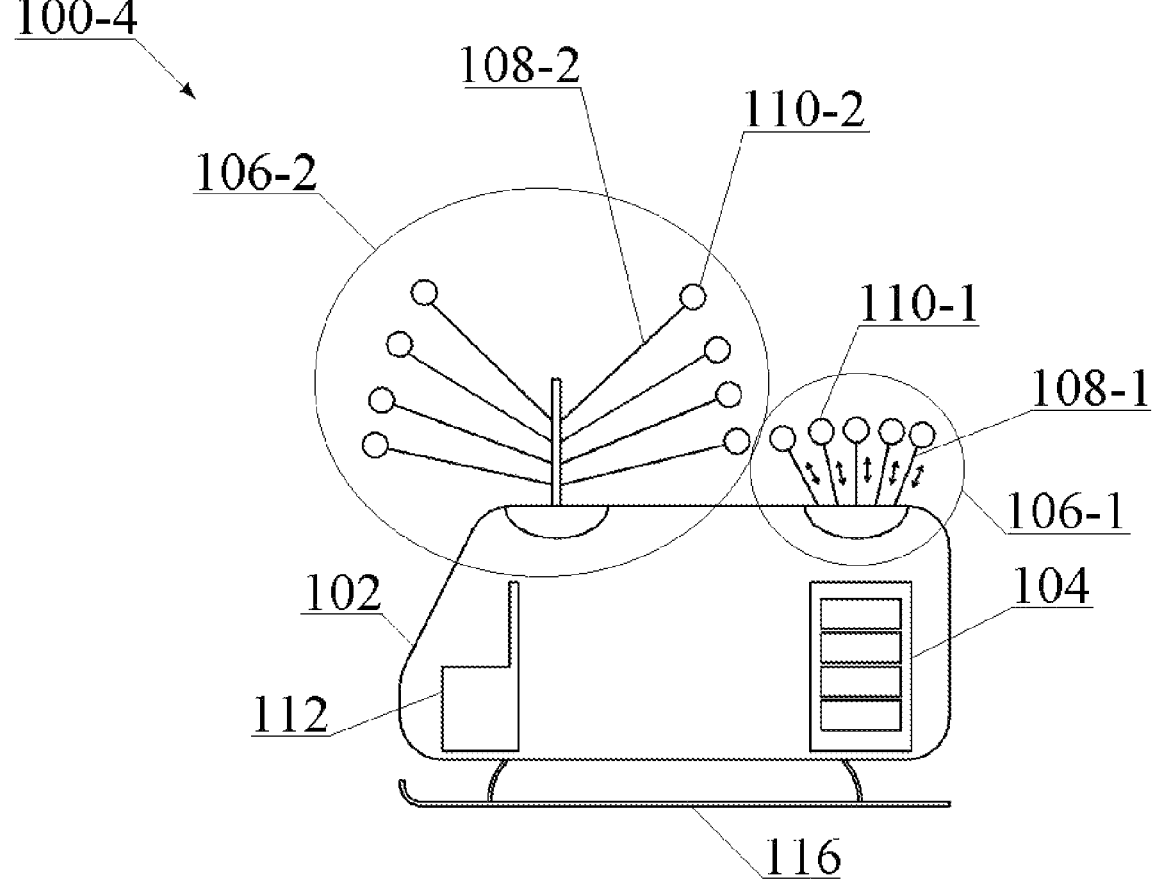
FIG. 4 is a schematic side view of a fourth illustrative embodiment of the vehicle according to the present invention.

As shown in FIG. 4, the fuselage 102 is provided with two docking modules 106 embedded or integrated into the fuselage 102. In particular, the fuselage 102 in the transport apparatus 100 shown in FIG. 4 comprises a docking module 106-1 configured similar to the docking module 106 shown in FIG. 1 and comprises a docking module 106-2 configured similar to the docking module 106 shown in FIG. 2. In particular, the fuselage 102 in the transport apparatus 100 shown in FIG. 4 comprises a plurality of tractive coupling elements 108, comprising a first group of tractive coupling elements 108-1 and a second group of tractive coupling elements 108-2 (see FIG. 4), in each of which group the tractive coupling elements 108 are provided each with a coupling mechanism 110.

In one of the embodiments of the present invention, in the transport apparatus 100 shown in FIG. 4 the length of the tractive coupling elements 108-1 from the first group in the fully released state is less than that of the tractive coupling elements 108-2 from the second group in the fully deployed or expanded state, thus substantially making it possible to connect the unmanned aerial systems 200 to the fuselage 102 such that they are present at different height levels relative to the fuselage 102 or removed from the fuselage at different distances. In one of the variations of the given embodiment of the present invention, in the transport apparatus 100 shown in FIG. 4 the quantity and/or design of tractive coupling elements 108-1 from the first group and the quantity and/or design of tractive coupling elements 108-2 may coincide with one another.

It should be noted that each tractive coupling element 108 in the docking modules 106 shown in FIGS. 1-4 may comprise one or more coupling mechanisms 110, each of which is configured to detachably connect to one or more unmanned aerial systems 200. Non-limiting examples of the coupling mechanism 110 may be various suitable mechanical connecting or fastening means (brackets, grips, fasteners, mounting slots, cams, hooks, latches, etc.), electromechanical means under control of the control module (for example, electromechanical means of docking for docking by a mating element to be docked, electromechanical means of gripping for gripping a mating element to be gripped, or the like), electromagnetic means under control of the control module, magnetic means, vacuum grips under control of the control module, and/or the like. The coupling mechanism 110 is configured to interact (i.e. connect, attach, magnetize, etc.) to the corresponding mating fastening component with which the unmanned aerial system 200 must be provided to provide for a detachable connection between the unmanned aerial system 200 and the docking module 106. As used in the present description, the coupling mechanism 110, the means of detachable connection, and the means of detachable fastening may coincide in terms of design and/or be at least partially different. In one of the embodiments of the present invention, the coupling mechanism 110 may be a universal coupling mechanism formed as a combination of one or more of mechanical fastening means, electromechanical means, electromagnetic means, magnetic means and/or vacuum means of fastening or grips, wherein such universal coupling mechanism may be configured to detachably connect to various types of means of detachable connection with which various unmanned aerial systems 200 may be provided.

It should be noted that the tractive coupling element 108 may be configured in the form of a cable (see FIG. 1), one end of which is rigidly connected to the docking module 106 on the fuselage 102, and at the other end of which there is installed a coupling mechanism 110 configured to detachably couple to an unmanned aerial system 200. Furthermore, the tractive coupling element 108 may be configured in the form of a telescopic rod (see FIG. 2), one end of which is rigidly connected to the docking module 106 on the fuselage 102, and at the other end of which there is installed a coupling mechanism 110 configured to detachably couple to an unmanned aerial system 200. In one of the embodiments of the present invention, the tractive coupling element 108 may be configured in the form of an expandable multiple-link structure configured to alter the geometric shape and size thereof.

In another embodiment of the present invention, the fuselage 102 in the vehicle 100 may be provided with two or more docking modules 106 disposed at a distance from one another, and may be provided with two or more weight sensors (not shown), and the control module (not shown) may be configured to identify distribution of useful load in the fuselage 102 based on the readings of said strain gauges and is further configured to present control instructions to unmanned aerial systems 200 so as to enable interaction with the corresponding docking modules 106, depending on the identified distribution of useful load in the fuselage 106. In one of the variations of the given embodiment of the present invention, the strain gauges (not shown) with which the fuselage 102 may be provided may be implemented, for example, on the floor, wall or other structural portion of the fuselage 102, and on a landing gear with which the fuselage 102 may be provided. In another variation of the given embodiment of the present invention, strain gauges (not shown) with which the fuselage 102 may be provided may be embedded or integrated into passenger seats, pilot seat, cargo shelves, boxes or crates for cargo, and/or the like. It should be noted that each of the weight sensors (not shown) may be any type of weight sensor, in particular a strain gauge or a force sensor configured to measure weight based on any other suitable physical principle, for example, an optical force sensor or a piezoelectric force sensor.

In another embodiment of the present invention, the docking module 106 in the vehicle 100 may be a docking structure comprising landing platforms (not shown), wherein each of the tractive coupling elements 108 may be installed on one of said landing platforms, and the control module (not shown) may be further configured to control the operation of each of said tractive coupling elements 108 so as to enable actuation thereof while accommodation of an unmanned aerial system 200 on said landing platform corresponding to said tractive coupling element 108 or in the docking zone or region corresponding to said landing platform.

In some other embodiment of the present invention, the fuselage 102 in the vehicle 100 may be further provided with a robotic manipulator (not shown) being under control of the control module (not shown) and configured to grip at least one of the unmanned aerial systems 200 so as to enable accommodation of each of said gripped unmanned aerial systems 200 on one of said landing platforms. In one of the variations of the given embodiment, the fuselage 102 in the vehicle 100 may be further provided with an image capturing device (not shown) configured to capture images in the field of view in real time so as to enable identifying at least one of the unmanned aerial systems 200 released from the storage module 104 in said field of view and further connected to the control module (not shown) so as to enable presenting thereto data relating to the identified unmanned aerial systems, and the control module may be further configured to actuate a robotic manipulator (not shown) in response to said data relating to the identified unmanned aerial systems so as to enable gripping of at least one of said identified unmanned aerial systems 200. It should be noted that in the given embodiment of the present invention, such image capturing device may be a photo camera, video camera, video recorder, video radar, and the like. It should also be noted that in the given embodiment of the present invention, the unmanned aerial systems 200 grippable by a robotic manipulator may be unmanned aerial systems 200 released from a docking module 104, unmanned aerial systems 200 from parking stations 400, unmanned aerial systems 200 from docking modules 104 of other vehicles 100 and/or any other unmanned aerial systems that may be directed to the vehicle 100 within the scope of the proposed technology described herein.

In another embodiment of the present invention, the docking module in the vehicle 100 may be a grip (not shown) being under control of the control module (not shown), wherein the fuselage 102 may be further provided with an image capturing device (not shown) configured to capture images in the field of view in real time so as to enable identifying at least one of the unmanned aerial systems 200 in said field of view and further connected to the control module so as to enable presenting thereto data relating to identified unmanned aerial systems, and the control module in turn may be further configured to actuate the grip in response to said data relating to identified unmanned aerial systems so as to enable a detachable grip of said identified unmanned aerial system 200. It should be noted that in the given embodiment of the present invention, such image capturing device may be a photo camera, video camera, video recorder, video radar, and the like. It should also be noted that in the given embodiment of the present invention, the unmanned aerial systems 200 grippable by a robotic manipulator may be unmanned aerial systems 200 released from a docking module 104, unmanned aerial systems 200 from parking stations 400, unmanned aerial systems 200 from docking modules 104 of other vehicles 100 and/or any other unmanned aerial systems that may be directed to the vehicle 100 within the scope of the proposed technology described herein.

As shown in FIG. 1, the storage module 104 for storing unmanned aerial systems is a stand secured to the fuselage 102 from the exterior side thereof and configured for a removable fitting thereon of the unmanned aerial systems 200 in sequential order (i.e. by turns or one after another), as a result of which the unmanned aerial systems 200 fitted on the stand become disposed vertically above one another to form a stack (a pack of unmanned aerial systems 200 disposed vertically on top of one another with or without mutual sequential securement thereof). It should be noted that the stand is a tube or rod with any cross-sectional shape, onto which there may be slid or fitted one after another the unmanned aerial systems 200 to be accommodated in the storage module 104, wherein in the housing or body of such unmanned aerial systems 200 to be fitted onto the stand there must be provided a through hole, the shape and the dimensions of which must correspond to the stand in the transverse size thereof, or there must be provided an annular bracket so as to enable passage of the stand through the body of each unmanned aerial system 200 while being fitted onto the stand. For example, the stand may be a profile with a circular cross section, onto which the unmanned aerial systems 200 may be sequentially slid or fitted. The unmanned aerial systems 200 may be removed or taken off from the stand by way of performing the above operations related to fitting the unmanned aerial systems 200 onto the stand in reverse order. In particular, in order to remove or take off the unmanned aerial systems 200 from the stand shown in FIG. 1 to be further directed to a target location, the unmanned aerial systems 200 may take off sequentially (i.e. one by one, starting from a vertically topmost unmanned aerial system 200, or by group of operably connected to one another unmanned aerial systems 200, starting from a vertically topmost group of such unmanned aerial systems 200) so as to enable withdrawal from interaction with the stand while reaching of a flight altitude exceeding the length of the stand, and followed by departure from the storage module 104 (i.e. beyond the bounds of the storage module 104 to a distance from same sufficient for departure from the storage module 104 of each successive unmanned aerial system).

In one of the embodiments of the present invention, the storage module 104 for storing unmanned aerial systems in the vehicle 100 shown in FIG. 1 may comprise at least one additional stand (not shown) installed on the fuselage 102 and configured for removable fitting thereon of unmanned aerial systems 200 in sequential order (i.e. by turns or one after another), wherein the main stand and the additional stand may have overall dimensions, shape, design and/or profiles that coincide with one another or are different from one another. In another embodiment of the present invention, the storage module 104 may comprise two or more stands, wherein the overall dimensions, shape, design and/or profiles of such stands may coincide with one another or be different from one another. In particular, different stands may be intended for storing merely a greater quantity of unmanned aerial systems 200 as well as for storing unmanned aerial systems 200 of different modifications and/or different overall dimensions.

As shown in FIG. 2, the storage module 104 for storing unmanned aerial systems is an open platform disposed on the fuselage 102 and configured to sequentially (i.e. by turns or one after another) accommodate thereon the unmanned aerial systems 200, as a result of which the unmanned aerial systems 200 accommodated on the platform become disposed vertically above one another to form a stack. It should be noted that the platform shown in FIG. 2 may be provided, for example, with a fastening means (not shown) for removable securement of one or more unmanned aerial systems 200 on said platform, wherein said fastening means may be implemented, for example, in the form of a mechanical fastening means, electromechanical means, electromagnetic means, magnetic means, vacuum grip, or the like.

In some non-limiting embodiments of the present invention, the unmanned aerial systems 200 may comprise similar detachable means of fastening on the housings thereof for detachable connection of the unmanned aerial systems 200 to one another. In such embodiments of the present invention, a first unmanned aerial system 200 may land on the platform so as to enable securement thereof on this platform, and a second unmanned aerial system 200 may land on the first unmanned aerial system 200 and be secured thereon, etc. so as to enable sequential connection of a plurality of such unmanned aerial systems 200 on one and the same platform. In order to release or liberate the unmanned aerial systems 200 from such platform, the unmanned aerial systems 200 may be sequentially or alternately disconnected from the platform, starting from a topmost unmanned aerial system 200, by way of withdrawal from interaction with the fastening means of the platform and performance of takeoff to a flight altitude being beyond the bounds of the platform. In one of the variations of the given embodiment of the present invention, in order to release or liberate the unmanned aerial systems 200 from such platform, the unmanned aerial systems 200 may simultaneously, in a group, take off to a flight altitude being beyond the bounds of the platform, followed by disconnection from one another in the air to obtain distinct or independent unmanned aerial systems 200.

As shown in FIGS. 3a and 3b, the storage module 104 for storing unmanned aerial systems is a storage module with an extendable platform, the storage module is disposed in the interior of the fuselage 102 and configured such that it provides for the possibility of landing of the unmanned aerial systems 200 onto said platform from the exterior side of the fuselage 102, the possibility of takeoff of the unmanned aerial systems 200 from said platform with departure beyond the bounds of the fuselage 102, as well as the possibility of accommodation of the landed unmanned aerial systems 200 in the interior of the fuselage 102 and the possibility of extraction of the previously accommodated unmanned aerial systems 200 from the fuselage 102. It should be noted that the storage module with an extendable platform in the vehicle shown in FIGS. 3*a* and 3*b* may be a compartment or a group of compartments for temporary storage of a plurality of unmanned aerial systems 200. Each such extendable platform may be utilised for landing thereonto or accommodation thereon of one unmanned aerial system 200 so as to enable subsequent accommodation thereof in the interior of the storage module 104, or may enable alternate landing and accommodation of multiple unmanned aerial systems 200 in the storage module 104. Extraction of unmanned aerial systems 200 from the storage module with an extendable platform may be performed in reverse order, in particular it may be started with extraction of the extendable platform with an unmanned aerial system 200 from the fuselage 102 and takeoff of the latter from this extracted platform.

In one of the embodiments of the present invention, the storage module 104 for storing unmanned aerial systems may be a storage module in the form of a container with an opening, the storage module being disposed in the interior of the fuselage 102 and having the size of said opening, the size enabling passage therethrough of unmanned aerial systems 200. In the given embodiment of the present invention, the unmanned aerial systems 200 may be accommodated in the storage module 104 and extracted from the storage module 104 in automatic mode using sensors, positioning system and control system and drives/engines of each unmanned aerial system 200, respectively. Accordingly, for example, the storage module 104 may be a container with an opening allowing unmanned aerial systems 200 to fly therein, followed by accommodation thereof in the interior of the container, wherein said container may be defined, for example, by the internal space of the fuselage 102. Furthermore, alternatively, the storage module 104 may be a distinct container installed in the interior of or on the fuselage 102.

In another embodiment of the present invention, the storage module 104 in the vehicle 100 may be a docking stand secured on the fuselage 102 and configured for removable fitting thereon of the unmanned aerial systems 200 to form a stack, wherein the fuselage 102 may be further provided with a robotic manipulator (not shown) under control of the control module (not shown) and configured to detachably grip one of the unmanned aerial systems 200 so as to enable fitting thereof onto the docking stand. It should be noted that in the given embodiment of the present invention, the unmanned aerial systems 200 grippable by the robotic manipulator (not shown) may be unmanned aerial systems 200 released from a docking module 104, unmanned aerial systems 200 from parking stations 400, unmanned aerial systems 200 from docking modules 104 of other vehicles 100 and/or any other unmanned aerial systems that may be directed to the vehicle 100 within the scope of the proposed technology described herein. In one of the variations of the given embodiment of the present invention, the fuselage 102 in the vehicle 100 may be further provided with a detection device (not shown) configured to detect at least one of the unmanned aerial systems 200 to be connected to the fuselage 102 in the operating area and further connected to a control module so as to enable presenting thereto data relating to detected unmanned aerial systems, wherein the control module may be further configured to actuate a robotic manipulator in response to said data relating to the detected unmanned aerial systems so as to enable sequential gripping of each of said identified unmanned aerial systems 200. It should be noted that in the given embodiment of the present invention, the detection device may be a photo camera, video camera, LIDAR, radar, IR sensor, ultrasonic sensor, RFID tag, and the like. In another variation of the given embodiment of the present invention, the detection device may be configured in the form of an image capturing device (not shown) configured to capture images in the field of view in real time so as to enable identifying in said field of view at least one of the unmanned aerial systems to be docked to the corresponding one of the tractive coupling elements 108, and presenting, to the control module, data relating to the identified unmanned aerial systems having occurred in the field of view of said image capturing device, wherein such image capturing device may be a photo camera, video camera, video recorder, video radar, and the like.

In another embodiment of the present invention, the control module (not shown) may be further configured to receive data in real time relating to the battery charge level from each of the unmanned aerial systems 200 connected to the fuselage 102 so as to enable replacement of at least one of said unmanned aerial systems 200 with at least one of the unmanned aerial systems 200 accommodated in the storage module 104 if the charge capacity of each unmanned aerial system 200 to be replaced is below a predetermined threshold value. In particular, there may be cases in which it will be found that only one unmanned aerial system 200 has a charge capacity below a predetermined threshold value, wherein the given discharged unmanned aerial system 200 may be replaced with one or more (for example, one, two, three, etc.) unmanned aerial systems 200 accommodated in the storage module 104. Furthermore, there may be cases in which it will be found that only two or more unmanned aerial systems 200 have each charge capacity below a predetermined threshold value, wherein these discharged unmanned aerial systems 200 may be replaced with one or more (for example, one, two, three, four, five, six, etc.) unmanned aerial systems 200 accommodated in the storage module 104, or each of these discharged unmanned aerial systems 200 may be replaced with one or more (for example, one, two, three, four, five, six, etc.) unmanned aerial systems 200 accommodated in the storage module 104. It should be noted that the quantity of unmanned aerial systems 200 accommodated in the storage module 104, with which quantity one such discharged unmanned aerial system 200 will be replaced, may depend, for example, on the power capacity, range, model, size, type, etc. characterizing said unmanned aerial systems 200 from the storage module 104.

In another embodiment of the present invention, the fuselage 102 in the vehicle 100 may be configured to accommodate therein useful load, wherein the floor of the fuselage 120 may be provided with at least one force sensor configured to measure the weight of useful load, and the control module (not shown) may be connected to said strain gauge in a manner to enable receipt therefrom of the result of measurement of the weight of useful load and may enable release of unmanned aerial systems 200 from the storage module 104 in a quantity depending on said measured weight of useful load and the curb weight of the vehicle 100. It should be noted that each of the weight sensors (not shown) may be any type of weight sensor, in particular a strain gauge or a force sensor configured to measure weight based on any other suitable physical principle, for example, an optical force sensor or a piezoelectric force sensor.

In some other embodiment of the present invention, the control module (not shown) may be configured to receive data relating to the change in the weight of useful load in the fuselage 102 at each of stops in accordance with a predetermined route of travel, and further configured to receive data in real time relating to battery charge from each of unmanned aerial systems 200 connected to the fuselage 102 and each of unmanned aerial systems 200 accommodated in the storage module 104, wherein the control module may be further configured to identify a geographic point or region in accordance with the route of travel in which the quantity of unmanned aerial systems 200 with a range allowing to continue the movement of the vehicle 100 by air, water and/or land (for example, to continue performing a flight) or after stopping of the vehicle 100 (for example, after landing or touchdown thereof) with said altered useful load is below a threshold value, and further configured to direct a request at least to one of the parking stations for storing unmanned aerial systems (not shown) corresponding to said identified geographic point or region to direct at least one additional aerial system (not shown) to said geographic point or region so as to enable transition of control of said additional aerial system over to the control module for interaction with the docking module 106.

In some embodiments of the present invention, the fuselage 102 in the vehicle 100 may be further provided with an aircraft engine (not shown) being under control of the control module (not shown) and installed on the fuselage 102 so as to enable movement of the vehicle 100 by air, water and/or or land (in particular, to enable flight thereof), wherein the control module may be further configured to receive, in real time, data relating to battery charge from each of the unmanned aerial systems 200 connected to the fuselage 102 and each of the unmanned aerial systems 200 accommodated in the storage module 104 and is further configured to actuate said aircraft engine while movement of the vehicle 100 in the event of identification, based on said data relating to battery charge, of a critical range for said vehicle 100, the range not allowing to continue movement of the vehicle 100 in accordance with the route of travel.

In some other embodiments of the present invention, the fuselage 102 in the vehicle 100 may be further provided with a lift rotor or propulsion unit (not shown) configured to move the vehicle 100 by air, water, and/or land while actuation thereof, and may further comprise at least one engine (not shown) being under control of the control module (not shown) and operably connected to each of said lift rotors or propulsion units so as to enable actuating same, wherein the control module may be further configured to receive, in real time, data relating to battery charge from each of the unmanned aerial systems 200 connected to the fuselage 102 and each of the unmanned aerial systems 200 accommodated in the storage module 104 and is further configured to actuate said lift rotor or propulsion unit while movement of the vehicle 100 in the event of identification, based on said data relating to battery charge, of a critical range for said vehicle 100, the range not allowing to continue movement of the vehicle 100 in accordance with the route of travel.

In some other embodiments of the present invention, the fuselage 102 in the vehicle 100 may be further provided with wheels and may comprise an engine (not shown) operably connected to the wheels so as to enable driving thereof for moving the vehicle 100, and the control module (not shown) may be further connected to said engine so as to enable actuation thereof and may be further configured to receive, in real time, data relating to battery charge from each of the unmanned aerial systems 200 connected to the fuselage 102 and each of the unmanned aerial systems 200 accommodated in the storage module 104, and to land the vehicle 100 so as to enable actuation of said engine in the event of identification, based on said data relating to battery charge, a critical range for said vehicle 100, the range not allowing the vehicle 100 to continue movement by air, water and/or land in accordance with the route of travel.

Transport System

Figure 5:
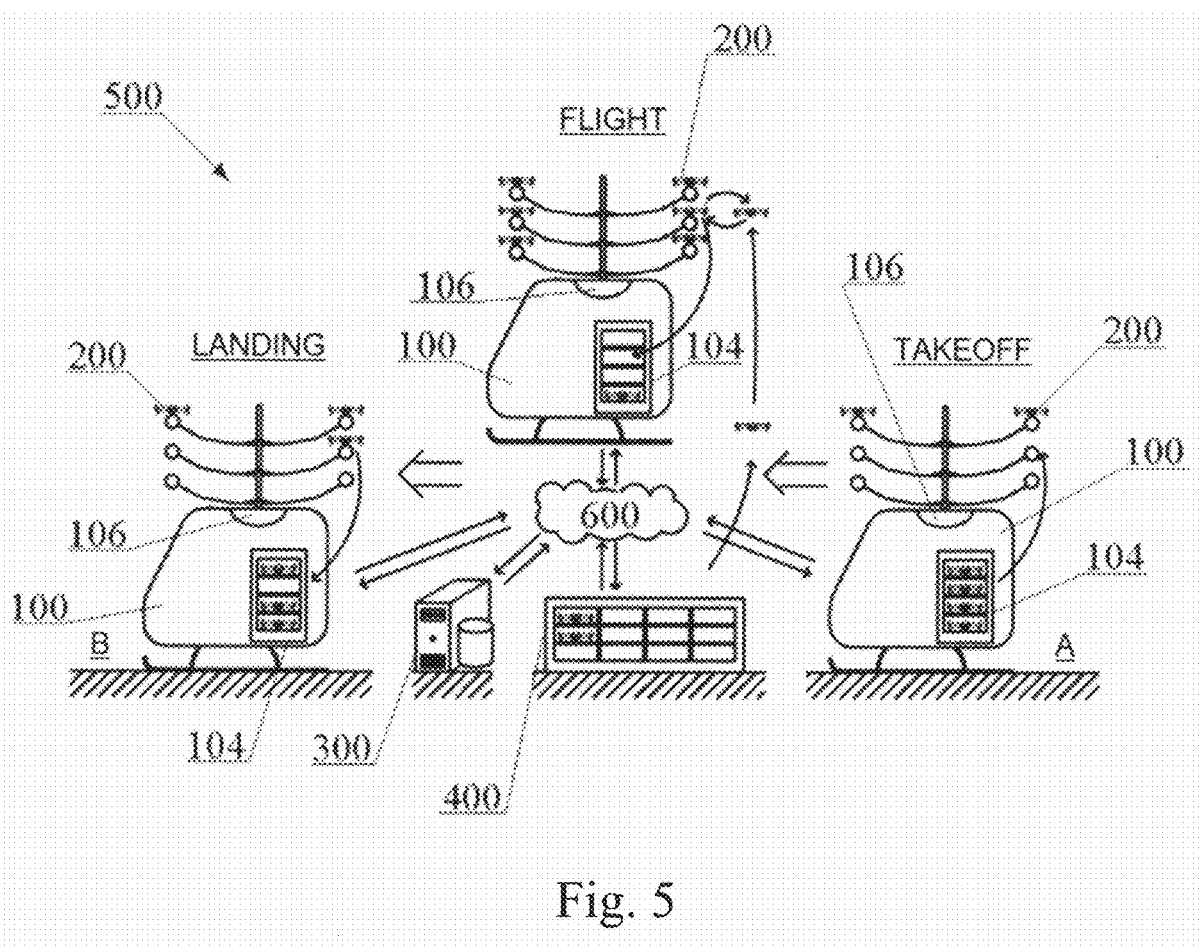
FIG. 5 is a block diagram of the transport system that comprises the vehicle according to any one of the embodiments of the present invention.

FIG. 5 schematically shows a transport system 500 which may be comprised of one or more vehicles 100 according to any one of the above embodiments, unmanned aerial systems 200 according to any one of the above embodiments, a server 300, one or more parking stations 400, and a communication network 600 to which there are communicatively coupled the vehicle 100, unmanned aerial systems 200, server 300, and parking stations 400.

The communication network 600 allows the vehicle 100, unmanned aerial systems 200, server 300 and parking stations 400 to exchange to one another the system data and/or operational data which they use to perform functions thereof described herein. The communication network 600 may be any suitable wireless communication link known in the prior art, such as a WiFi technology-based communication link, 2G, 3G, 4G or 5G technology-based communication link, LTE technology-based communication link, or the like.

In one of the embodiments of the present invention, the transport system 500 may be comprised of two or more wireless communication networks implemented each similar to the above communication network 600 for performing the exchange of data between the vehicles 100, parking stations 400, unmanned aerial systems 200 and server in real-time mode or in real time.

The server 300 being part of the transport system 500 shown in FIG. 5 is configured to receive and process data from the vehicles 100, unmanned aerial systems 200 and parking stations 400, and to generate control commands or instructions, including navigation commands, based on said received data and results of processing thereof so as to enable presenting or directing such generated control instructions to at least one of the vehicles 100, to at least one of the unmanned aerial systems 200 and/or to at least one of the parking stations 400, including in response to a request of one of said vehicles 100, unmanned aerial systems 200, and parking stations 400.

It should be noted that in some embodiments of the present invention, the data transfer protocols and/or hardware utilized to transfer data between the server 300, vehicles 100, unmanned aerial systems 200, and parking stations 400 may be at least partially different or coincide. Furthermore, data exchange may be provided using simultaneously one or more communication protocols and corresponding technical means. In particular, by way of example, data transfer may be provided using one or more communication means from the group of communication means comprising: SW band radio antennas, USW radio antennas, UHF radio antennas, an optical communication module, half-duplex/simplex satellite communication module, 2G/3G/4G/LTE/5G communication cellular module, wireless network communication module or wired network communication module. In particular, the server 300 may be coupled to the parking stations 400 via a wireless or wired data transfer network.

The server 300 in the transport system 500 is a single server which may be configured in the form of, for example, the Dell PowerEdge™ server on which there may be used the Ubuntu Server or Windows Server operating system. In some embodiments of the present invention, the server 300 may be any other suitable hardware and/or application software and/or system software, or a combination thereof. In other embodiments of the present invention, the functions of the server 300 may be shared among multiple computing devices, for example, they may be performed using multiple connected to one another servers. Furthermore, the server 300 may have access to at least one database via the communication network 600 or otherwise, or may comprise at least one local database stored on the storage device of the server 300.

In certain embodiments of the present invention, the server 300 may be configured to perform traffic management and provide for safety while movement of the vehicles 100. In particular, the server 300 may be configured to receive data relating the current or planned location of at least one vehicle 100 and to request to provide the unmanned aerial systems 200. Furthermore, the server 300 may be configured to process a request and direct at least one unmanned aerial system 200 to a predetermined location of a particular vehicle 100 from at least one parking station 400 and/or from at least one other vehicle 100 to perform connection of said directed unmanned aerial systems 200 to a particular vehicle 100 in a manner to provide for replenishment of the range for providing for further progress or movement of the vehicle 100 in accordance with the route of travel thereof.

In other embodiments of the present invention, the server 300 may be configured to receive data relating to the route of movement or travel of the vehicle 100; wherein the server 300 may be further configured to reserve the required quantity of unmanned aerial systems 200 on distinct parking stations 400 along the route of travel of the vehicle 100; in response to reaching by the vehicle 100 a geographic region corresponding to at least one parking station 400, the server 300 may be further configured to direct at least one unmanned aerial system 200 to a predetermined location of the vehicle 100 from said at least one parking station 400 in a manner to provide for connection of said directed unmanned aerial system 200 to the vehicle 100 to provide a range allowing to continue non-stop movement of the vehicle 100 in accordance with the route of travel thereof.

In other embodiments of the present invention, the server 300 may be further configured to receive data relating to the curb mass of the vehicle 100 and/or the useful load of the vehicle 100, and to calculate the required quantity of unmanned aerial systems 200, followed by direction of said calculated quantity of unmanned aerial systems 200 to a predetermined location of the vehicle 100 from at least one parking station 400 and connection thereof to this vehicle 100 to restore or replenish the range to provide for further movement of the vehicle 100 in accordance with the route of travel thereof.

The unmanned aerial systems 200 being part of the transport system 500 are intended to include both unmanned aerial systems 200 which may be accommodated in the docking modules 104 of the vehicles 100 being part of the transport system 500, and unmanned aerial systems 200 accommodated in or on the parking stations 400, and any other unmanned aerial systems 200 which may be directed to any one of the vehicles 100 for accommodation in the storage module 104 thereof or interaction with the docking module 106 thereof, wherein one skilled in the art would readily appreciate that at least a portion of the unmanned aerial systems 200 in said plurality of unmanned aerial systems 200 being part of the transport system 500 may have different types, modifications, designs, dimensions, masses, power plants and/or the like.

The parking stations 400 being part of the transport system 500 shown in FIG. 5 are intended to accommodate, store or park therein the unmanned aerial systems 200. It should be noted that in order to perform the movement, the vehicle 100 may not utilize the parking stations 400 at all, may utilize only one parking station 400 (as shown in FIG. 5), or may utilize two or more parking stations 400 which are geographically remote from one another or disposed at a distance from one another and which are present within the bounds of a region corresponding to at least one of the geographic points along the route of travel of the vehicle 100. For example, the parking stations 400 may be disposed several hundred meters away from one another or several kilometers away from one another. The geographic location of the parking stations 400 must provide for timely replacement of one or more unmanned aerial systems 200 while movement of the vehicle 100 in various directions and over various distances. For example, the parking stations 400 may be disposed every 10 km or every 1 km, and so on. One skilled in the art will appreciate that the quantity of parking stations 400 and mutual disposition thereof may differ depending on specific geographic locations. In particular, in large cities there may be a need for more parking stations 400 at shorter distances from one another, as opposed to small cities or areas between cities, as well as to other possible locations. As shown in FIG. 5, the parking station 400 is a stationary structure provided with compartments for accommodating therein the unmanned aerial systems 200. In one of the embodiments of the present invention, the parking station 400 may be implemented in the form of a stand-alone structure or may be configured in the form of a housing installed on a building, structure, or other stationary object. In another embodiment of the present invention, the parking station 400 may be implemented in the form of a special housing or structure adapted to accommodate, store or park therein one or more unmanned aerial systems 200 and installed on a movable platform, for example, in the body of a truck, on a ferry, on an airplane, aerostat or other vehicle that enables changing the geographic location of the parking station 400. In yet another embodiment of the present invention, the parking station 400 may be implemented in the form of a movable structure or a special vehicle, the body of which may be adapted to accommodate, store or park therein one or more unmanned aerial systems 200. The movable parking stations 400 may move between different geographic locations taking into account the most popular routes of movement of the vehicles 100 and optimization of possible geographic locations for replacement of the unmanned aerial systems 200 connected to one or more vehicles 100.

It should be noted that the transport system 500 may further comprise parking stations (for example, land stationary parking stations, water stationary parking stations, air stationary parking stations, land movable parking stations, water movable parking stations, air movable parking stations, and/or the like) for accommodating thereon vehicles, the parking stations providing for parking or temporary storage of at least one vehicle 100.

In some embodiments of the present invention, the parking station 400 shown in FIG. 5 may be provided with a power source (not shown) which may be one or more batteries, a generator based on an internal combustion engine, a generator based on a hydrogen engine, a solar panel and any other suitable energy source known in the prior art and provided with one or more charging devices (not shown) electrically connected each to said power source and enabling each connection thereto of at least one of the unmanned aerial systems 200 accommodated, stored or parked in the parking station 400 so as to enable recharging or charging-up of said unmanned aerial system 200. It should be noted that each of the charging devices (not shown) of the parking station 400 may be a wireless charging device, a wired charging device, or a charging dock. In one of the embodiments of the present invention of the parking station 400, at least one of the charging devices (not shown), with which the parking station 400 in the vehicle 100 may be provided, may be hydraulically connected by means of a pump connected by a hydraulic line to a reservoir or container with fuel in a manner to enable intake of that fuel from said container so as to enable supply of said intaken volume of fuel to the fuel tank of an unmanned aerial system 200, the fuel tank being hydraulically connected to the fuel-powered engine of the unmanned aerial system 200, to replenish the range thereof (in particular, thanks to at least partial replenishment of the volume of fuel in the fuel tank of the unmanned aerial system 200).

FIG. 5 also shows for illustrative purposes three essential positions that the vehicle 100 takes while movement thereof by air from a starting point of travel to a next point of travel (intermediate stop or end point) in accordance with the route of travel thereof: a takeoff position (rightmost illustration of the vehicle 100 in FIG. 5) corresponding to the presence of the vehicle 100 at a starting point of travel, a flight position (central illustration of the vehicle 100 in FIG. 5) corresponding to the presence of the vehicle 100 in flight between the points of travel, and a landing or touchdown position (leftmost illustration of the vehicle 100 in FIG. 5) corresponding to the presence of the vehicle 100 at a next point of travel which may be the end point of travel or an intermediate stop of the vehicle 100. Despite the fact that FIG. 5 illustrates the positions of the vehicle 100 while movement thereof by air (i.e. in the case of flight thereof), those skilled in the art would readily appreciate that the vehicle 100 will substantially take similar positions in the case of movement thereof by water or land as well, wherein the beginning of movement of the vehicle 100 by water or land will substantially correspond to the takeoff position shown in FIG. 5 on the right, and the completion of movement of the vehicle 100 by water or land will substantially correspond to the landing position shown in FIG. 5 on the left.

As shown in FIG. 5, the starting point of travel of the vehicle 100 in accordance with the route of travel thereof corresponds to a conditional geographic point A (geographic location or geographic region), and the next point of travel (intermediate stop or end point of travel) corresponds to a conditional geographic point B (geographic location or geographic region). The distance between the arbitrary geographic points A and B may be from several tens of meters to several kilometers, tens of kilometers, hundreds of kilometers or even thousands of kilometers. It will be evident to those skilled from the description to follow that the method of travel and the design of the vehicle 100 may contemplate a long-lasting non-stop flight, which may be achieved by means of one-time or multiple-time (two or more times) replacement of the unmanned aerial systems 200 in flight and replenishment of the range of the vehicle 100 without having to land same until reaching the destination.

Below described are the details of operation or functioning of the vehicle 100 in each of the above-described three positions illustrated in FIG. 5.

In the takeoff position, from the storage module 104 there are extracted or released the unmanned aerial systems 200 in a quantity required to provide for movement of the vehicle, in particular in accordance with a predetermined route of travel. The unmanned aerial systems 200 released from the storage module 104 automatically fly to the docking module 106 and then sequentially one by one or in groups are accommodated in the docking spot of the docking module 106, followed by coupling to the tractive coupling element 108, thus providing for connection of these unmanned aerial systems 200 to the fuselage 102.

The unmanned aerial systems 200 connected to the fuselage perform a collective takeoff under control of the control module of the vehicle 100 and lift the vehicle 100 into the air. In certain embodiments of the present invention, after or before takeoff of the vehicle 100 there may be performed bringing of the folding/extendable wing or folding/extendable wings into operational position. In other embodiments of the present invention, after or before takeoff of the vehicle 100 there may be further performed the launch of one or more aircraft engines in the vehicle 100. Following the takeoff stage, the vehicle 100 enters the flight mode.

In the flight position upon reaching, by the vehicle 100, the parking station 400 along the route of travel or reaching a threshold value of the range, from the parking station 400 there is directed at least one replacement unmanned aerial system 200 to the vehicle 100.

Next, from the fuselage 102 there is disconnected at least one unmanned aerial system 200 of the unmanned aerial systems 200 connected to the fuselage 102 by means of the docking module 106 and used to move the vehicle 100. Replacement of one or more unmanned aerial systems 200 connected to the fuselage 102 may be performed in case of exhaustion of the range (battery discharge or fuel exhaustion), as well as in case of failure of one or more of said unmanned aerial systems 200, or in a scheduled manner with the consideration of the current route of travel.

At least one replacement unmanned aerial system 200 directed from the parking station 400 to the vehicle 100 is accommodated in the docking spot of the docking module 106 and coupled to the tractive coupling element 108 in the vehicle 100. The discharged unmanned aerial system 202 disconnected from the fuselage 102 is directed to the storage module 104 of the same vehicle 100, to one of the parking stations 400 or the storage module 104 of other vehicle 100, to be subsequently recharged and reused.

Thus, in the course of flight it is possible to repeatedly replace distinct unmanned aerial systems 200 in the vehicle 100, including it is possible to sequentially replace all unmanned aerial systems 200 connected to the vehicle 100 at the takeoff step without the need for an emergency or unscheduled landing of the vehicle 100 until reaching by same the destination thereof in which there is envisaged a scheduled landing. Given the geographic distribution of the parking stations 400, the possible routes of travel and distances of travel of the vehicle 100 may be virtually unlimited.

In the case when the vehicle 100 flies across the ocean, the parking stations 400 may be disposed on water craft, ships, buoys, and the like for performance of timely replacement of the unmanned aerial systems 200 in the vehicle 100. Upon reaching the destination, the vehicle 100 enters the landing mode.

In the landing position there is performed turning off of the additional aircraft engines (if any) of the vehicle 100, there is performed the folding of the wing/wings (if any), and then there is performed the process of landing or touchdown of the vehicle 100 by means of unmanned aerial systems 200 connected to the fuselage 102 of the vehicle. Then, these unmanned aerial systems 200 are disconnected from the fuselage 102 by way of withdrawing same from interaction with the docking module 106 and automatically directed at least partially to the storage module 104 of the vehicle 100, and/or at least partially to one of the parking stations 400, and/or at least partially to the storage module 104 of other vehicle 100 for subsequent recharging and reuse of said unmanned aerial systems 200.

Following landing, the power supply unit (if any) of the vehicle 100 may be connected to an external power source to recharge the unmanned aerial systems 200 disposed in the storage module 104. The vehicle 100 may then switch back to the takeoff mode to continue movement within the bounds of the same route of travel of the vehicle 100 or to move in accordance with a new route of travel.

In one of the embodiments of the present invention, the transport system 500 may comprise the vehicle 100 according to any one of the above-described embodiments further provided with a location determination module (for example, a GPS system or any other location determination system known in the prior art) configured to determine the geographic coordinates of the vehicle 100 in real time, unmanned aerial systems 200 used by the vehicle 100, parking stations 400 (for example, ground stationary parking stations, water stationary parking stations, air stationary parking stations, ground movable parking stations, water movable parking stations, air movable parking stations and/or the like) configured to store replacement or additional unmanned aerial systems 200, and a server 300 configured to control the operation of said additional unmanned aerial systems 200 at said ground parking stations 400 and communicatively coupled to the control module of the vehicle 100 so as to enable receipt therefrom of data relating to the route of travel, the data indicating an exact or approximate route of travel of the vehicle 100. In such an embodiment of the present invention, the control module of the vehicle 100 may be further configured to direct a request to the server 300 for providing at least one replacement or additional aerial system 200 at a predetermined geographic point or region corresponding to said route of travel of the vehicle 100. Furthermore, in such embodiment of the present invention, the server 300 may be further configured to receive the coordinates of the vehicle 100 from the control module of the vehicle 100 in real time to identify at least one of said parking stations corresponding to said request so as to enable directing at least one additional aerial system 200 from said identified parking stations 400 at the moment of time when the proximity of the vehicle 100 to said geographic region corresponds to the threshold value, for the interaction of each of said additional aerial systems 200 with the docking module 106 of the vehicle 100. In one of the variations of the given embodiment of the present invention, the storage module 104 in the vehicle 100 may be provided with a charging device (for example, a device for supplying electrical energy, a device for supplying liquid or gaseous fuel, and/or the like), and the unmanned aerial systems 200 of the vehicle 100 may be configured to sequentially operably connect to one another (for example, electrically and/or by means of a fuel supply line) while being disposed in said storage module 104 so as to enable connection thereof to said charging device (not shown) for substantially simultaneous charging thereof (for example, charging or charging-up batteries in such unmanned aerial systems 200) and/or substantially simultaneous replenishing the range thereof (for example, charging batteries and/or refilling the fuel tanks with fuel in such unmanned aerial systems 200). In yet another variation of the given embodiment of the present invention, the server 300 being part of the transport system 500 may enable reservation of at least one additional aerial system at each of the parking stations 400 identified by the server 300 in response to a corresponding request from the control module of the vehicle 100 for providing at least one additional aerial system 200 for a predetermined period of time in accordance with said request. In another variation of the given embodiment of the present invention, the control module of the vehicle 100 may enable direction of at least a portion of unmanned aerial systems 200 connected to the fuselage 102, the range of which, in a predetermined geographic region which corresponds to the route of travel of the vehicle 100 and which relates to the request of the vehicle 100 for provision of at least one additional aerial system 200, is less than a threshold value, to at least one of the parking stations 400 corresponding to said geographic region. In some other variation of the given embodiment of the present invention, each of the parking stations 400 identified by the server 300 in response to a corresponding request from the control module of the vehicle 100 for provision of at least one additional aerial system 200 may be provided with charging devices (for example, a device for electrical power supply, a device for supplying liquid or gaseous fuels, and/or the like) for charging the unmanned aerial systems 200 or replenishing the range thereof, the control module of the vehicle 100 may be configured to present data relating to the directed unmanned aerial systems to the server 300, and the server 300, in turn, in response to said data of the control module of the vehicle may be further configured to take over the control of said directed unmanned aerial systems 200 so as to enable connection of each of same to one of the charging devices (not shown) on the parking station 400 corresponding to said directed unmanned aerial system 200 for recharging said taken-over unmanned aerial system 200 (for example, charging or charging-up the batteries of such unmanned aerial system 200) or replenishing the range thereof (for example, charging batteries thereof and/or refilling the fuel tanks thereof with fuel). In some other variation of the given embodiment of the present invention, the control module of the vehicle 100 may be configured to receive data relating to the change in the weight of useful load in the fuselage 102 at each of the stops in accordance with the route of travel of the vehicle 100 and may be further configured to determine the quantity of unmanned aerial systems 200 for provision of range of the vehicle 100, the range allowing to continue movement of the vehicle 100 (in particular, by air, water and/or land) from said stop to the next stop in accordance with said route of travel, taking into account said changed weight of useful load and predetermined curb weight of the vehicle 100. In other variations of the given embodiment of the present invention, the fuselage 102 in the vehicle 100 may be further provided with a detection device (for example, a photo camera, video camera, LIDAR, radar, IR sensor, ultrasonic sensor, RFID tag, and the like) communicatively coupled to the control module of the vehicle 100 and configured to detect additional aerial systems 200 in the operating area of the detection device (not shown), and the control module of the vehicle 100, in response to said readings of the detection device, may enable withdrawal, from interaction with the docking module 106, of the unmanned aerial systems 200, the range of which is below the threshold value, in a quantity corresponding to the quantity of said detected additional aerial systems 200 so as to enable accommodation thereof in the storage module 104 of the same vehicle 100, accommodation thereof in the storage module 104 of other vehicle 100 and/or direction thereof to at least one of the parking stations 400 corresponding to said geographic region. In other variations of the given embodiment of the present invention, each of the parking stations 400 may be further configured to accommodate so as to enable storage and/or charging therein of at least one vehicle 100 and to present data relating to free spots for accommodation of the vehicles 100 to the server 300 in response to a request of the server 300; the control module of the vehicle 100 may be configured to present a request to the server 300 for stopping of the vehicle 100 in the parking station 400; the server 300, in turn, in response to said request for stopping, may be further configured to direct a request to the parking stations 400 corresponding to the coordinates of the vehicle 100 for identifying at least one parking station 400 with a free spot to accommodate the vehicle 100, and present control instructions to the control module of the vehicle 100 in a manner to provide for (i) directing said vehicle 100 under control of the control module of the vehicle 100 to one of the identified free parking stations 400, or (ii) taking over the control of said vehicle 100 so as to enable direction thereof to one of the identified free parking stations 400, wherein for charging the vehicle 100 disposed in the parking station 400 there may be used a charging device for vehicles which is configured to operably connect to the power source of the vehicle 100 to replenish the range of the vehicle 100, for example, by way of replenishing the battery charge of the vehicle 100, replenishing fuel in the fuel tank of the vehicle 100, replenishing the working medium (liquid, solid or gaseous working medium) used in the generator of the vehicle 100 operating using said working medium, and/or the like. In some other variations of the given embodiment of the present invention, each of the parking stations 400 may be provided with charging devices (for example, a device for supplying electrical power, a device for supplying liquid or gaseous fuels, and/or the like) for charging the unmanned aerial systems 200 (for example, charging the batteries thereof) or replenishing the range thereof (for example, charging the batteries thereof and/or refilling the fuel tank thereof with fuel) and may be configured to present data relating to free charging devices (not shown) to the server 300 in response to a request of the server 300; the control module of the vehicle 100 may be further configured to present a request to the server 300 for recharging the unmanned aerial systems 200 or replenishing the range thereof; the server 300, in turn, in response to said request for recharging or replenishing the range, may be further configured to (1) direct a request to a free parking station 400 to identify the quantity of free charging devices (not shown) for recharging or replenishing the range of the unmanned aerial systems 200 of the vehicle 100, and (2) present control instructions to the control module of the vehicle 100 in a manner to enable (i) directing at least one of the unmanned aerial systems 200, which require recharging or replenishment of the range, of the vehicle 100 under control of the control module of the vehicle 100 to one of the identified free charging devices (not shown) while accommodation of the vehicle 100 in said free parking station 400 or (ii) taking over the control of said unmanned aerial system 200, which requires recharging or replenishment of the range, so as to enable direction thereof to one of the identified free charging devices (not shown) while accommodation of the vehicle 100 in said free parking station 400. In some other variations of the given embodiment of the present invention, each of the unmanned aerial systems 200 of the vehicle 100 may be further configured to present data relating to the range (alternatively, data relating to battery charge level or data relating to fuel capacity) to the control module of the vehicle 100 in response to the request for replenishing the range presented by the control module of the vehicle 100 to the server 300; and the control module of the vehicle 100 may be further configured to identify the quantity of discharged unmanned aerial systems 200 of the vehicle 100, the range (alternatively, battery charge level or fuel capacity) of said discharged unmanned aerial systems being less than a threshold value, based on said data relating to the range, wherein said request for replenishing the range contemplates the replenishment of the range of at least one of said discharged unmanned aerial systems 200 while accommodation of the vehicle 100 in the free parking station 400. In certain variations of the given embodiment of the present invention, each of the unmanned aerial systems 200 of the vehicle 100 may be further configured to present data relating to the range to the control module of the vehicle 100 in response to the request for replenishing the range presented by the control module of the vehicle 100 to the server 300; and the control module of the vehicle 100 may be further configured to identify the quantity of discharged unmanned aerial systems 200 of the vehicle 100, the range of which is less than a threshold value (i.e. those unmanned aerial systems 200 the battery of which is completely discharged or has an insufficient charge level that is less than a predetermined threshold value and/or which have no fuel in the fuel tank or have an insufficient fuel capacity that is less than a predetermined threshold value), based on said data relating to the range, wherein said request for replenishing the range contemplates the replenishment of the range of at least one of said discharged unmanned aerial systems 200 while accommodation of the vehicle 100 in the free parking station 400. In various other variations of the given embodiment of the present invention, the control module of the vehicle 100 may be configured to generate a request, for replenishing the range of at least one additional aerial system 200, to be presented to the server 300 in the event that the charging devices of the vehicle 100 are unable to charge at least a portion of said discharged unmanned aerial systems 200, the portion being required to continue movement of the vehicle 100 (in particular, by air, water and/or land), for a period of time corresponding to a scheduled duration of a stop of the vehicle 100 in the free parking station 400, wherein said request for replenishing the range contemplates replenishment of the range of said required portion of discharged unmanned aerial systems 200. In various other variations of the given embodiment of the present invention, the control module of the vehicle 100 may be further configured to (i) determine the quantity of lacking charged unmanned aerial systems 200 of the vehicle 400 by way of comparing a predetermined quantity of unmanned aerial systems 200 of the vehicle 100 required to continue movement of the vehicle 100 (in particular, by air, water and/or land) to the next scheduled stop of the vehicle 100 in accordance with the route of travel of the vehicle 100, to the quantity of unmanned aerial systems 200 charged at the moment of completion of said period of stop, and (ii) present a request to the server 300 for provision of additional aerial systems 200 corresponding to said determined quantity of lacking charged unmanned aerial systems 200 for at least a period of time corresponding to the movement of the vehicle 100 to said next stop.

In another embodiment of the present invention, the transport system 500 may comprise the vehicle 100 according to any one of the above-described embodiments further provided with a location determination module (for example, a GPS system or any other location determination system known in the prior art) configured to determine the geographic coordinates of the vehicle 100 in real time, unmanned aerial systems 200 used by the vehicle 100, and parking stations 400 (for example, ground stationary parking stations, water stationary parking stations, air stationary parking stations, ground movable parking stations, water movable parking stations, air movable parking stations and/or the like), each of which is configured to store and/or charge the additional unmanned aerial systems 200 and to control the operation of said additional unmanned aerial systems 200, wherein said parking stations 400 may be further communicatively coupled to the control module of the vehicle 100 so as to enable receipt therefrom of data relating to the route of travel of the vehicle, the data indicating an exact or approximate route of travel of the vehicle 100. Furthermore, in the given embodiment of the present invention, the control module of the vehicle 100 may be further configured to direct a request to at least one of the parking stations 400 for provision of at least one additional unmanned aerial system 200 in a geographic region corresponding to the route of travel of the vehicle 100, and the at least one parking station 400, in response to the request for provision of at least one additional unmanned aerial system, may enable direction of at least one additional aerial system 200 at a moment of time at which the proximity of the vehicle 100 to the geographic region corresponding to said request, in accordance with said route of travel, corresponds to a threshold value, for interaction of each of said additional aerial systems 200 with the docking module 106 of the vehicle 100.

In another embodiment of the present invention, the transport system 500 may comprise the vehicle 100 according to any one of the above embodiments, unmanned aerial systems 200 used by the vehicle 100, and parking stations 400 (for example, ground stationary parking stations, water stationary parking stations, air stationary parking stations, ground movable parking stations, water movable parking stations, air movable parking stations and/or the like) which may be configured to store and/or charge additional unmanned aerial systems 200, and a server 300 configured to control the operation of said additional unmanned aerial systems 200 on said parking stations 400 and communicatively coupled to the control module of the vehicle 100. Furthermore, in the given embodiment of the present invention, the control module of the vehicle 100 may be further configured to direct a request to the server 300 for provision of at least one additional aerial system 200, and the server 300 in turn may be further configured to identify at least one of the parking stations 400 corresponding to said request for provision of at least one additional aerial system so as to enable direction of at least one additional aerial system 200 from said identified parking stations 400 at a moment of time at which the proximity of the vehicle 100 to said identified parking stations 400 corresponds to a threshold value, for interaction of each of said additional aerial systems 200 with the docking module 106 of the vehicle 100.

In yet another embodiment of the present invention, the transport system 500 may comprise the vehicle 100 according to any one of the above embodiments, unmanned aerial systems 200 used by the vehicle 100, and parking stations 400 (for example, ground stationary parking stations, water stationary parking stations, air stationary parking stations, ground movable parking stations, water movable parking stations, air movable parking stations and/or the like) each of which may be configured to store and/or charge additional unmanned aerial systems 200 and to control the operation of said additional unmanned aerial systems 200, wherein said parking stations 400 may be further communicatively coupled to the control module of the vehicle 100. Furthermore, in the given embodiment of the present invention, the control module of the vehicle 100 may be further configured to direct a request to at least one of the parking stations 400 for provision of at least one additional unmanned aerial system 200, and said at least one parking station 400, in response to said request, may further enable direction of said at least one additional aerial system 200 at a moment of time at which the proximity of the vehicle 100 to that parking station 400 corresponds a threshold value, for interaction of each of said additional aerial systems 200 with the docking module 106 of the vehicle 100.

According to one of the embodiments of the present invention, the transport system 500 may comprise the vehicles 100 according to any one of the above embodiments, each further provided with a location determination module (for example, a GPS system or any other location determination system known in the prior art) configured to determine the geographic coordinates of said vehicle 100 in real time, as well as groups of unmanned aerial systems 200, the groups are used each by one of said vehicles 100, and a server 300 communicatively coupled to the control module of the vehicle 100 of each of said vehicles 100 so as to enable receipt therefrom of data relating to the route of travel of the vehicle, the data indicating an exact or approximate route of travel of the vehicle 100, and receipt therefrom the coordinates of the vehicle 100 in real time. Furthermore, in the given embodiment of the present invention, each of the unmanned aerial systems 200 in each of the vehicles 100 may be further configured to present data relating to the range (alternatively, data relating to battery charge level or data relating to fuel capacity) to the control module of the vehicle 100 in response to a request of the control module of the vehicle 100, the request corresponding to said unmanned aerial system 200, and the control module in each of said vehicles 100 may be further configured to (1) determine the quantity of free charging spots in the storage module 104 of said vehicle 100, in which free charging spots there is enabled replenishment of the range of the unmanned aerial systems 200, so as to enable presenting data relating to the free charging spots of the storage module 104 to the server 300, (2) identify the quantity of discharged unmanned aerial systems 200 of said vehicle 200, the range (alternatively, battery charge level or fuel capacity) of said discharged unmanned aerial systems is less than a threshold value, based on said data relating to the range, and (3) present a request to the server 300 for provision of additional unmanned aerial systems 200 in a quantity corresponding to at least a portion of said identified quantity of discharged unmanned aerial systems 200 of the vehicle 100. Furthermore, in the given embodiment of the present invention, the server 300, in response to said request for provision of additional aerial systems 200, may be further configured to (1-1) identify other vehicle 100 of said vehicles 100, the location of which other vehicle corresponds to the coordinates of said vehicle 100 and in the storage module 104 of which other vehicle the quantity of free charging spots corresponds to the quantity of discharged unmanned aerial systems 200 of said vehicle 100, or (1-2) identify at least two other vehicles 100 of said vehicles 100, the location of each of which two other vehicles corresponds to the coordinates of said vehicle 100 and in the storage modules 104 of said two other vehicles the quantity of free charging spots corresponds to the quantity of discharged unmanned aerial systems 200 of said vehicle 100, and (2) further configured to present control instructions to the control module of said vehicle 100 so as to enable (i) directing said discharged unmanned aerial systems 200 under control of the control module of said vehicle 100 to said free charging spots of each identified other vehicle 100, or (ii) taking over the control of said discharged unmanned aerial systems 200 so as to enable direction of same to said free charging spots of each identified other vehicle 100. In one of the variations of the given embodiment of the present invention, each of the charging spots of the storage module 104 in each of the vehicles 100 being part of the transport system 500 may be provided with a charging device (for example, a device for supplying electrical power, a device for supplying liquid or gaseous fuels, and/or the like) for recharging (for example, charging a battery) and/or replenishing the range (for example, charging a battery and/or refilling the fuel tank with fuel) of the unmanned aerial system 200, and each of the discharged unmanned aerial systems 200 may be configured to connect to the charging device (not shown) while being disposed on a free charging spot so as to enable replenishment of the range thereof and to enable return to said vehicle 100 in a charged state under control of the control module of said vehicle 100 or under control of the server 200. In another variation of the given embodiment of the present invention, each other vehicle 100 identified by the server 300 in response to a request for provision of an additional aerial systems 200 may further comply with a condition according to which at the time of completion of charging of the corresponding discharged unmanned aerial systems 200, said other vehicle 100 in accordance with the route of travel thereof may be present in the region of location of the vehicle 100 to which said charged unmanned aerial systems 200 must return, or may be the least remote from that unmanned aerial system 200 (i.e. may be present at the minimum allowable distance from same). In yet another variation of the given embodiment of the present invention, the control module of the vehicle 100 may be further configured to present control commands to the returned unmanned aerial systems 200 so as to enable interaction of at least a portion of same with the docking module 106 of the vehicle 100, accommodation of at least a portion of same in the storage module 104 of the vehicle 100 and/or replacement of at least a portion of the unmanned aerial systems 200 connected to the fuselage 102 of the vehicle 100. In another variation of the given embodiment of the present invention, the control module of the vehicle 100 may be further configured to present control commands to the returned unmanned aerial systems 200 so as to enable interaction of at least a portion of same with the docking module 106 of the vehicle 100, accommodation of at least a portion of same in the storage module 104 of the vehicle 100 and/or replacement of at least a portion of the unmanned aerial systems 200 connected to the fuselage 102 of the vehicle 100.

According to another embodiment of the present invention, the transport system 500 may comprise the vehicles 100 according to any one of the above embodiments, each further provided with a location determination module (for example, a GPS system or any other location determination system known in the prior art) configured to determine the geographic coordinates of said vehicle 100 in real time, as well as groups of unmanned aerial systems 200, the groups are used each by one of said vehicles 100, and a server 300 communicatively coupled to the control module of each of said vehicles 100 in a manner to enable receipt of data therefrom relating to the route of travel of the vehicle, the data indicating an exact or approximate route of travel of the vehicle 100, coordinates of the vehicle 100 in real time and data relating to the quantity of idle unmanned aerial systems 200 of the vehicle 100 in the storage module 104, which idle unmanned aerial systems will not be required by said vehicle 100 while movement in accordance with the route of travel thereof. Furthermore, in the given embodiment of the present invention, each of the unmanned aerial systems 200 in each of the vehicles 100 being part of the transport system 500 may be further configured to present data relating to the range to the control module of the vehicle 100 in response to a request of the control module of the vehicle 100, the request corresponding to said unmanned aerial system 200. Furthermore, in the given embodiment of the present invention, the control module in each of the vehicles 100 being part of the transport system 500 may be further configured to (1) identify the quantity of lacking charged unmanned aerial systems 200 of the group of unmanned aerial systems of the vehicle 100, the group corresponding to said vehicle 100, for providing for a range for said vehicle 100, the range allowing to continue movement of said vehicle 100 (in particular, by air, water and/or land) to the next stop in accordance with the route of travel of the vehicle 100, based on the data relating to the range, the data corresponding to said vehicle 100, and data relating to the target quantity of charged unmanned aerial systems 200 which allows moving said vehicle 100 between stops in accordance with the route of travel thereof, (2) identify the presence of free docking spots in the docking module 106 of said vehicle 100, in which docking spots there is provided a possibility of connection of the unmanned aerial systems 200 to the fuselage 102, in a quantity corresponding to said identified quantity of lacking charged unmanned aerial systems 200 so as to enable presenting data relating to free docking spots of the docking module 106 to the server 300, and (3) present to the server 300 a request for provision of additional unmanned aerial systems 200 in a quantity corresponding to at least a portion of said identified quantity of lacking charged unmanned aerial systems 200/Furthermore, in the given embodiment of the present invention, the server 300, in response to a request for provision of additional aerial systems 300, the request presented to the server 300 by means of the control module of the vehicle 100, may be further configured to (1-1) identify other vehicle 100 from the vehicles 100 in the transport system 500, the location of which other vehicle corresponds to the coordinates of said vehicle 100 and the quantity of idle unmanned aerial systems 200 of which other vehicle corresponds to said quantity of lacking charged unmanned aerial systems 200, or (1-2) identify at least two other vehicles 100 of the vehicles being part of the transport system 500, the location of each of which two other vehicles corresponds to the coordinates of the vehicle 100 and the total quantity of idle unmanned aerial systems 200 of which two other vehicles corresponds to the quantity of lacking charged unmanned aerial systems 200, and may be further configured to (2) present control instructions to the control module of each installed other vehicle 200 so as to enable (i) direction of each of the idle unmanned aerial systems 200 under control of the control module of said other vehicle 100 to one of said free docking spots in the docking module 106, or (ii) taking-over of the control of the idle unmanned aerial systems 200 so as to enable direction of each of same to one of said free docking spots in the docking module 106. In one of the variations of the given embodiment of the present invention, in the event that the quantity of free docking spots in the docking module 106 of the vehicle 100 does not correspond to the quantity of lacking charged unmanned aerial system 200, then the control module of said vehicle 100 may be further configured to direct control instructions to the unmanned aerial systems 200 connected to the fuselage, the unmanned aerial systems corresponding in quantity to the lacking quantity of free docking spots and having the smallest range (alternatively, the battery charge level or fuel capacity) so as to enable accommodation thereof in the storage module 104 of said vehicle 100.

Method of Moving a Vehicle

FIG. 6 is a block diagram illustrating the main operations of the method 700 of moving the vehicle 100, wherein the method 700 of moving a vehicle shown in FIG. 6 may be performed using the vehicle 100 implemented in accordance with any one of the embodiments of the present invention described herein, or the transport system 500 implemented in accordance with any one of the embodiments of the present invention described herein, depending on a specific embodiment of the given method 700. In particular, the method 700 of moving the vehicle 100 as shown in FIG. 6 includes three main operations or the following three main steps 710, 720 and 730, wherein the step 710 is a step of presenting control commands to the unmanned aerial systems 200; the step 720 is a step of, in response to said control commands, directing said unmanned aerial systems 200 to the docking module 106 of the vehicle 100 so as to provide for interaction therewith for connection of said directed unmanned aerial systems 200 to the fuselage 102 of the vehicle 100; and the step 730 is a step of actuating, by means of the control module of the vehicle 100, said connected unmanned aerial systems 200 so as to move the vehicle 100 (in particular, by air, water, and/or land). It should be noted that the above operations 710, 720, and 730 of the method 700 may be performed for starting or beginning of movement of the vehicle 100 (in particular, by air, water, and/or land), including for beginning of movement of the vehicle 100 (for example, for takeoff thereof) after stopping thereof (for example, after landing or touchdown) and/or may be performed one or more times (i.e. the entire method 700 may be sequentially performed one or more times) in the course of movement of the vehicle 100 (in particular, by air, water and/or land).

In one of the embodiments of the method 700 for moving the vehicle 100 as shown in FIG. 6, it may comprise a further step of preliminarily, i.e. prior to performing the above step 710, moving that vehicle 100 to the parking station 400 or other vehicle 100, wherein the control commands are presented to the unmanned aerial systems 200 accommodated in said parking station 400 or storage module 104 of said other vehicle 100, respectively.

In another embodiment, in the method 700 of moving the vehicle 100 as shown in FIG. 6, while performing the above step 710, control commands are presented to the unmanned aerial systems 200 accommodated in the storage module 104 of the same vehicle 100 and/or the unmanned aerial systems 200 accommodated in at least one parking station 400, and/or the unmanned aerial systems 200 accommodated in the storage module 104 of at least one other vehicle 100.

Furthermore, the method 700 of moving the vehicle 100 as shown in FIG. 6 may comprise the following additional operations or steps of: (i) further receiving, by means of the control module of the vehicle 100, data relating to the range (alternatively, data relating to battery charge level or data relating to fuel capacity) from each of the unmanned aerial systems 200 moving the vehicle 100 (in particular, by air, water and/or land) in real time; (ii) identifying, by means of the control module of the vehicle 100, a discharged unmanned aerial system 200 whose range is less than a threshold value in said unmanned aerial systems 200 based on said data relating to the range while movement of the vehicle 100 (including while movement of the vehicle 100 in accordance with the route of travel of the vehicle 100); (iii) directing a charged unmanned aerial system 200 to the docking module 106 of the vehicle 100 for replacing said discharged unmanned aerial system 200; (iv) presenting, by means of the control module of the vehicle 100, control commands to said discharged unmanned aerial system 200 so as to withdraw same from interaction with the docking module 106 of the vehicle 100 for undocking from the fuselage 102 of the vehicle 100 and (v) presenting, by means of the control module of the vehicle 100, control commands to said charged unmanned aerial system 200 so as to provide for interaction with said docking module 106 of the vehicle 100 for connecting said charged unmanned aerial system 200 to the fuselage 102 of the vehicle 100.

The method 700 of moving the vehicle 100 as shown in FIG. 6 may comprise another additional operation or another additional step of directing the undocked unmanned aerial system 200 to the storage module 104 of the given vehicle 100, parking station 400 for storing unmanned aerial systems 200, or storage module 104 of other vehicle 100 so as to replenish the range of said unmanned aerial system 200.

In one embodiment, in the method 700 of moving the vehicle 100, as shown in FIG. 6, a charged unmanned aerial system 200 directed to the docking module 106 of the given vehicle 100 is released from the storage module 104 of the vehicle 100 or a parking station 400 for storing unmanned aerial systems 200 or the storage module 104 of other vehicle 100.

In another embodiment, in the method 700 of moving the vehicle 100, as shown in FIG. 6, for stopping (alternatively for landing) of the vehicle 100 there is changed, by means of the control module of the vehicle 100, the operating mode of the unmanned aerial systems 200 moving said vehicle 100 (in particular, by air, water and/or land) in a manner to turn off, by means of the control module of the vehicle 100, said unmanned aerial systems 200 after stopping (alternatively after landing) of the vehicle 100.

In yet another embodiment, in the method 700 of moving the vehicle 100, as shown in FIG. 6, while stopping (alternatively, while landing) of the vehicle 100, the unmanned aerial systems 200 moving said vehicle 100 (in particular by air, water and/or land) are directed, by means of the control module of the vehicle 100, at least partially to the storage module 104 of said vehicle 100, and/or at least partially to one or more parking stations 400 for storing unmanned aerial systems 200 corresponding to the stopping spot or region (alternatively, the landing region or spot) of the vehicle 100, and/or at least partially to the storage modules 104 of one or more other vehicles 100 corresponding to the stopping region (alternatively, the landing region or spot) of the vehicle 100 in manner to provide for replenishment of the range of the corresponding unmanned aerial systems 200, followed by formation of a corresponding plurality of recharged unmanned aerial systems 200.

In another embodiment, the method 700 of moving the vehicle 100 as shown in FIG. 6 comprises (i) communicating to the control module of the vehicle 100 the route of travel of the vehicle 100, the curb weight of the vehicle 100, and the weight of useful load of the vehicle 100; (ii) determining, by means of the control module of the vehicle 100, a geographic region in accordance with the route of travel of the vehicle 100 in which geographic region the range of the vehicle 100, the range being provided by the unmanned aerial systems 200 of the vehicle 100, corresponds to a threshold level, based on said data communicated to the control module; and (iii) presenting, by means of the control module of the vehicle 100, a request to the server 300 for reservation of additional or replacement unmanned aerial systems 200 for said vehicle 100 in one or more parking stations 400 for storing unmanned aerial systems 200 corresponding to said geographic region and/or storage modules 104 of one or more other vehicles 100 corresponding to said geographic region in a quantity that provides for the range of the vehicle 100, the range allowing the vehicle 100 to at least partially complete or extend the route of travel thereof.

In some other embodiment, the method 700 of moving the vehicle 100 as shown in FIG. 6 comprises (i) communicating to the control module of the vehicle 100 the route of travel of the vehicle 100 with the coordinates of stops, the curb weight of the vehicle 100, and the weight of useful load of the vehicle 100 at each section of the route of travel between two consecutive stops; (ii) determining, by means of the control module of the vehicle 100, a geographic region at least at one of the sections of the route of travel in which geographic region the range of the vehicle 100, the range being provided by the unmanned aerial systems 200 of the vehicle 100, corresponds to a threshold level, based on said data communicated to the control module; and (iii) presenting, by means of the control module of the vehicle 100, a request to the server 300 for reservation of additional or replacement unmanned aerial systems 200 for said vehicle 100 in one or more parking stations 400 for storing unmanned aerial systems 200 corresponding to said geographic region and/or storage modules 104 of one or more other vehicles 100 corresponding to said geographic region in a quantity that provides for the range of the vehicle 100, the range allowing the vehicle 100 to at least partially complete said section of the route of travel thereof.

In some other embodiment, the method 700 of moving the vehicle 100 as shown in FIG. 6 comprises (i) communicating to the control module of the vehicle 100 the route of travel of the vehicle 100 with the coordinates of stops, the curb weight of the vehicle 100, and the weight of useful load of the vehicle 100 at each section of the route of travel between two consecutive stops; (ii) identifying, by means of the control module of the vehicle 100, at least one of the sections of the route of travel of the vehicle 100, at which section the quantity of unmanned aerial systems 200 of the vehicle 100 exceeds the estimated quantity required for completion by the vehicle 100 of said section of the route of travel in a manner to provide for presenting to the server 300 the data relating to the quantity of idle unmanned aerial systems 200 at said section of the route of travel of the vehicle 100; and (iii) in response to the control instructions of the server 300, directing at least a portion of said idle unmanned aerial systems 200 to one or more parking stations 400 for storing the unmanned aerial systems 200 corresponding to said section of the route of travel and/or to the docking modules 106 of one or more other vehicles 100 corresponding to said section of the route of travel of the vehicle 100.

The provided illustrative embodiments of the present invention, examples and description serve only to facilitate understanding of the principles of the claimed invention and are not limiting. Other possible embodiments of the present invention, or modifications or improvements to the above embodiments of the present invention will suggest themselves to one skilled in the art after reading the above description. The scope of the present invention is limited only by the appended claims.

What is claimed is:
1. An air vehicle, comprising:
   a fuselage provided with one or more storage modules, wherein unmanned aerial systems are accommodated at least in one of the storage modules, and wherein the fuselage is further provided with one or more docking modules, each being designed to releasably engage at least with one of-said the unmanned aerial systems accommodated in the at least one storage module so as to enable simultaneous connection of two or more unmanned aerial systems to the fuselage in an airspace for moving said air vehicle in the airspace by means of the connected unmanned aerial systems; and a control module configured to provide control commands to at least one of the unmanned aerial systems accommodated in the at least one storage module so as to enable release of at least one unmanned aerial system from the storage module to the airspace for providing releasable engagement of the released unmanned aerial system with one of said docking modules; in the airspace, wherein the control module is further configured to receive data on a power reserve in a real time from each of the unmanned aerial systems connected to the fuselage so as to enable replacement of at least one of the connected unmanned aerial systems with at least one another unmanned aerial system accommodated in the storage module during the movement of the air vehicle in the airspace when a power reserve of said at least one unmanned aerial system to be replaced corresponds to a predetermined threshold value.

2. The air vehicle according to claim 1, wherein the control module is further configured to provide the control commands to the at least one of the unmanned aerial systems when connected to the fuselage so as to enable accommodation thereof in the storage module.

3. The air vehicle according to claim 1, wherein the control module is further configured to provide the control commands to the at least one of the unmanned aerial systems in the storage module so as to enable the release thereof from the storage module for providing the releasable engagement with the docking module during the movement of the air vehicle in the airspace.

4. The air vehicle according to claim 2, wherein the control module is communicatively coupled to an external control source and is further configured to receive control instructions from the external control source for providing the received control commands to unmanned aerial systems.

5. The air vehicle according to claim 2, wherein the fuselage is further provided with measurement sensors for measuring flight parameters of the air vehicle, and the control module is communicatively coupled to said measurement sensors, and the external control source so as to enable the providing of said flight parameters of the air vehicle to the external control source and further configured to receive, from the external control source, control instructions in response to said flight parameters of the air vehicle so as to provide said control commands to unmanned aerial systems.

6. The air vehicle according to claim 2, wherein the fuselage is further provided with sensors for measuring parameters of a fuselage state of the air vehicle, and the control module is communicatively coupled to said sensors and the external control source so as to provide said parameters of the fuselage state to the external control source and is further configured to receive control instructions from the external control source in response to said parameters of the fuselage state for generating said control commands based on the received control instructions.

7. The air vehicle according to claim 3, wherein the fuselage is configured to accommodate a payload therein and is provided with at least one weight sensor configured to measure a weight of the-useful load payload, and the control module is connected to said at least one weight sensor so as to receive a measured weight of payload therefrom and enables the release of unmanned aerial systems from the storage module in a quantity depending on said measured weight of the payload and on a curb weight of the air vehicle.

8. The air vehicle according to claim 7, wherein the fuselage is provided with two or more of the docking module disposed at a distance from one another and is provided with two or more weight sensors, and the control module is configured to identify distribution of the payload in the fuselage based on the readings of said weight sensors and is further configured to provide control instructions to said released unmanned aerial systems for engaging with said two or more of the docking modules, depending on the identified distribution of the payload in the fuselage.

9. The air vehicle according to claim 1, wherein the fuselage is designed to accommodate therein a pilot and comprises elements of control of the air vehicle that enable the pilot to input at least one of said control commands for unmanned aerial systems and that are communicatively coupled to the control module so as to enable providing of said input control command to the control module of the air vehicle.

10. The air vehicle according to claim 1, wherein the fuselage is further provided with at least one power source, and the storage module is further provided with at least one charging device electrically connected to said power source and enabling connection, to said power source, of at least one of the unmanned aerial systems accommodated in the storage module so as to enable replenishment of the range of said unmanned aerial system.

11. The air vehicle according to claim 10, wherein each of said charging devices is a wireless charging device, a wired charging device or a charging dock.

12. The air vehicle according to claim 10, wherein said at least one power source comprises at least one of a battery, a generator based on an internal combustion engine, a generator based on a hydrogen engine and a solar panel.

13. The air vehicle according to claim 1, wherein at least one of said docking modules is a docking structure provided with at least one tractive coupling element configured each to detachably couple to at least one of the unmanned aerial systems or to grip at least one of the unmanned aerial systems.

14. The air vehicle according to claim 13, wherein the docking structure comprises landing platforms, each of said tractive coupling elements is installed on one of said landing platforms, and the control module is further configured to control the operation of each of said tractive coupling elements so as to enable actuation thereof while accommodation of the unmanned aerial system on the landing platform corresponding to said tractive coupling element or in the docking region corresponding to said landing platform.

15. The air vehicle according to claim 14, wherein the fuselage is further provided with a robotic manipulator being under control of the control module and configured to grip at least one of the released unmanned aerial systems so as to enable accommodation of each of said gripped unmanned aerial systems on one of said landing platforms.

16. The air vehicle according to claim 15, wherein the fuselage is further provided with an image capturing device configured to capture images in a field of view in real time so as to enable identifying at least one of the unmanned aerial systems in said field of view and further connected to the control module so as to provide thereto data relating to identified unmanned aerial systems, and the control module is further configured to actuate a robotic manipulator in response to said data relating to the identified unmanned aerial systems so as to enable gripping of at least one of said identified unmanned aerial systems.

17. The air vehicle according to claim 1, wherein at least one of said docking modules is an extendable coupling structure provided with tractive coupling elements, configured each to detachably couple to at least one of the released unmanned aerial systems, and configured to at least partially extend from the fuselage so as to enable release of the tractive coupling elements, depending on a degree of extension, wherein the control module is further configured to control the operation of the extendable coupling structure so as to enable adjustment of the degree of extension thereof.

18. The air vehicle according to claim 17, wherein said coupling structure is further designed to at least partially extend after being fully extended so as to enable removal of the released tractive coupling elements from one another to a distance depending on a degree of deployment, wherein the control module is further configured to adjust the degree of deployment of the coupling structure.

19. The air vehicle according to claim 17, wherein said coupling structure is further designed to at least partially expand after being fully extended so as to enable removal of the released tractive coupling elements from one another to a distance depending on a degree of expansion, wherein the control module is further configured to adjust the degree of expansion of the coupling structure.

20. The air vehicle according to claim 1, wherein at least one of said docking modules is at least partially integrated into the fuselage and comprises each at least one tractive coupling element configured each to extend from the fuselage so as to enable detachable coupling at least to one of the unmanned aerial systems, and the control module is further configured to control the extension of said tractive coupling elements in each of said docking modules.

21. The air vehicle according to claim 20, wherein the fuselage is further provided with a detection device configured to detect at least one of the unmanned aerial systems in the operating area of the detection device and further connected to the control module so as to provide thereto data relating to the detected unmanned aerial systems, and the control module further enables actuation of at least one of the extendable tractive coupling elements in response to said data relating to detected unmanned aerial systems in a manner to provide for extension of said actuated tractive coupling element from the fuselage.

22. The air vehicle according to claim 1, wherein at least one of said docking modules is at least partially integrated into the fuselage and comprises each at least one tractive coupling element configured each to detachably couple at least to one of the unmanned aerial systems so as to provide for drawing-out of said tractive coupling element from the fuselage.

23. The air vehicle according to claim 1, wherein at least one of said storage modules is a docking stand secured to the fuselage and configured for a removable fitting thereon of the unmanned aerial systems to form a stack.

24. The air vehicle according to claim 23, wherein the fuselage is further provided with a robotic manipulator being under control of the control module and configured to detachably grip one of the unmanned aerial systems so as to enable fitting thereof onto the docking stand.

25. The air vehicle according to claim 24, wherein the fuselage is further provided with a detection device configured to detect at least one of the released unmanned aerial systems in the operating area of the detection device and further connected to the control module in a manner to provide thereto data relating to the detected unmanned aerial systems, and the control module is further configured to actuate a robotic manipulator in response to said data relating to the detected unmanned aerial systems so as to enable sequential gripping of each of said detected unmanned aerial systems.

26. The air vehicle according to claim 1, wherein at least one of said docking modules is a grip being under control of the control module, the fuselage is further provided with an image capturing device configured to capture images in a field of view in real time so as to enable identifying at least one of the released unmanned aerial systems in said field of view and further connected to the control module so as to provide thereto data relating to identified unmanned aerial systems, and the control module is further configured to actuate the grip in response to said data relating to identified unmanned aerial systems so as to enable a detachable grip of said identified unmanned aerial system.

27. The air vehicle according to claim 1, wherein the fuselage is further provided with one or more wings and/or further comprises at least one aircraft engine being under control of the control module and installed on the fuselage so as to enable the movement of the air vehicle in the airspace.

28. The air vehicle according to claim 27, wherein the control module is further configured to receive, in real time, data relating to the range from each of the unmanned aerial systems connected to the fuselage and each of the unmanned aerial systems accommodated in the storage module and further configured to actuate said aircraft engine while movement of the air vehicle in the airspace in the event of identification of a critical range for said vehicle, the range not allowing to continue movement of the air vehicle in the airspace in accordance with the route of travel, based on said data relating to the range.

29. The air vehicle according to claim 1, wherein the fuselage is further provided with at least one lift rotor or propulsion unit configured to move the air vehicle in the airspace while actuation thereof, and further comprises at least one engine being under control of the control module and operably connected to each of said lift rotors or propulsion units so as to provide for actuation thereof.

30. The air vehicle according to claim 29, wherein the control module is further configured to receive, in real time, data relating to the range from each of the unmanned aerial systems connected to the fuselage and each of the unmanned aerial systems accommodated in the storage module and is further configured to actuate said lift rotor or propulsion unit while movement of the air vehicle in the airspace in the event of identification of a critical range for said vehicle, the range not allowing to continue movement of the air vehicle in the airspace in accordance with the route of travel, based on said data relating to the range.

31. The air vehicle according to claim 1, wherein the fuselage is provided with wheels and comprises an engine operably connected to the wheels so as to drive the wheels for moving the air vehicle, and the control module is connected to said engine so as to actuate the engine.

32. The air vehicle according to claim 31, wherein the control module is further configured to receive, in real time, data relating to the range from each of the unmanned aerial systems connected to the fuselage and each of the unmanned aerial systems accommodated in the storage module and further configured to land the air vehicle so as to enable actuation of said engine in the event of identification of a critical range for the air vehicle, the range not allowing to continue movement of the air vehicle in the airspace in accordance with the route of travel, based on said data relating to the range.

33. The air vehicle according to claim 1, wherein the control module is configured to receive data relating to a change in the weight of a payload in the fuselage at each of a plurality of stops in accordance with a predetermined route of travel and further configured to receive, in real time, data relating to the range from each of the unmanned aerial systems connected to the fuselage and each of the unmanned aerial systems accommodated in the storage module, wherein the control module is further configured to identify a geographic region in accordance with the route of travel, in which region the number of unmanned aerial systems with a range allowing to continue movement of the air vehicle in the airspace with said changed payload is below a threshold value, and further configured to direct a request at least to one of a plurality of parking stations for storing unmanned aerial systems corresponding to said identified geographic region to direct at least one additional unmanned aerial system to said geographic region so as to enable transition of control of said additional unmanned aerial system over to the control module for engaging with the docking module.

34. A transport system, comprising:
  the vehicle according to claim 1 further provided with a location determination module configured to determine the geographic coordinates of the vehicle in real time;
  unmanned aerial systems used by said vehicle;
  parking stations configured to store additional unmanned aerial systems; and
  a server configured to control the operation of said additional unmanned aerial systems on said parking stations and communicatively coupled to the control module of the vehicle so as to enable receipt of data therefrom relating to the route of travel of the vehicle;
  wherein the control module is further configured to direct a request to the server for provision of at least one additional aerial system in a predetermined geographic region corresponding to said route of travel; and
  the server is further configured to receive the coordinates of the vehicle from the control module of the vehicle in real time to identify at least one of said parking stations corresponding to said request so as to enable direction of at least one additional aerial system from said identified parking stations at the moment of time when the proximity of the vehicle to said geographic region corresponds to a threshold value, for the interaction of each of said additional aerial systems with the docking module of the vehicle.

35. The transport system according to claim 34, wherein the storage module is provided with a charging device, and said unmanned aerial systems of the vehicle are configured to serially or parallelly electrically connect to one another while being accommodated in said storage module so as to enable connection thereof to said charging device for simultaneous replenishment of the range thereof.

36. The transport system according to claim 34, wherein at least one of said unmanned aerial systems of the vehicle is provided with a tractive coupling element configured to detachably interact with the docking module.

37. The transport system according to claim 34, wherein at least two of said unmanned aerial systems of the vehicle are configured to mechanically connect to one another to form an aggregate unmanned aerial system configured to detachably interact with at least one of the docking modules.

38. The transport system according to claim 37, wherein said mutually connected unmanned aerial systems are configured to mechanically connect to one another in a horizontal plane and/or a vertical plane.

39. The transport system according to claim 37, wherein said mutually connected unmanned aerial systems are configured to mechanically connect to one another in response to control commands from the control module of the vehicle or the server.

40. The transport system according to claim 34, wherein the server enables reservation of said at least one additional aerial system on each of said parking stations for a predetermined period of time in accordance with said request.

41. The transport system according to claim 34, wherein the control module enables direction of at least a portion of the unmanned aerial systems connected to the fuselage, the range of which unmanned aerial systems in said geographic region is less than a threshold value, at least to one of the parking stations corresponding to said geographic region.

42. The transport system according to claim 40, wherein each of said parking stations is provided with charging devices for replenishing the range of unmanned aerial systems, the control module is configured to present data relating to directed unmanned aerial systems to the server, and the server in response to said data of the control module is further configured to take over the control of said directed unmanned aerial systems so as to enable connection of each of same to one of the charging devices on the parking station corresponding to said directed unmanned aerial system for replenishing the range of said taken-over unmanned aerial system.

43. The transport system according to claim 34, wherein the control module is configured to receive data relating to a change in the weight of useful load in the fuselage at each of the stops in accordance with the route of travel and further configured to determine the quantity of unmanned aerial systems for provision of the range of the vehicle, the range allowing to continue movement of the vehicle from said stop to the next stop in accordance with said route of travel, taking into account said changed weight of useful load and predetermined curb weight of the vehicle.

44. The transport system according to claim 34, wherein the fuselage of the vehicle is further provided with a detection device communicatively coupled to the control module and configured to detect said additional aerial systems in the operating area of the detection device, and the control module, in response to said readings of the detection device, enables withdrawal, from interaction with the docking module, of the unmanned aerial systems, the range of which is below a threshold value, in a quantity corresponding to the quantity of said detected additional aerial systems so as to enable accommodation thereof in the storage module and/or direction thereof to at least one of the parking stations corresponding to said geographic region.

45. The transport system according to claim 34, wherein each of said parking stations is further configured to accommodate so as to enable storage and/or charging therein of at least one vehicle and to present data relating to free spots for accommodation of the vehicles to said server in response to a request of the server; the control module is configured to present a request to the server for stopping of the vehicle in the parking station; the server, in response to said request for stopping, is further configured to:

direct a request to the parking stations corresponding to the location region of the vehicle for identifying at least one parking station with a free spot for accommodation of the vehicle; and present control instructions to the control module so as to enable:

directing said vehicle under control of the control module to one of the identified free parking stations; or taking over the control of said vehicle so as to enable direction thereof to one of the identified free parking stations.

46. The transport system according to claim 45, wherein each of said parking stations is provided with charging devices for replenishment of the range of unmanned aerial systems and is configured to present data relating free charging devices to said server in response to a request of the server;

the control module is further configured to present a request to the server for replenishment of the range of unmanned aerial systems; and the server, in response to said request for replenishment of the range, is further configured to:

direct a request to said free parking station for identification of the number of free charging devices for replenishment of the range of unmanned aerial systems of the vehicle; and present control instructions to the control module so as to:

enable directing at least one of the unmanned aerial systems, which require recharging or replenishment of the range, of the vehicle under control of the control module to one of the identified free charging devices while accommodation of the vehicle in said free parking station; or enable taking over the control of said unmanned aerial system, which requires replenishment of the range, so as to enable direction thereof to one of the identified free charging devices while accommodation of the vehicle in said free parking station.

47. The transport system according to claim 46, wherein each of the unmanned aerial systems of the vehicle is further configured to present data relating to the range to the control module in response to a request of the control module;

the control module is further configured to identify the quantity of discharged unmanned aerial systems of the vehicle, the range of which discharged unmanned aerial systems is less than a threshold value, based on said data relating to the range; and wherein said request for replenishing the range contemplates the replenishment of the range of at least one of said discharged unmanned aerial systems while accommodation of the vehicle in said free parking station.

48. The transport system according to claim 47, wherein the control module is configured to generate said request for replenishment of the range in the event that the charging devices of the vehicle are unable to replenish the range of at least a portion of said discharged unmanned aerial systems, the portion being required to continue movement of the vehicle, for a period of time corresponding to a scheduled duration of a stop of the vehicle in said free parking station, wherein said request for replenishment of the range contemplates replenishment of the range of said required portion of discharged unmanned aerial systems.

49. The transport system of claim 48, wherein the control module is further configured to:

determine the quantity of lacking charged unmanned aerial systems of the vehicle by way of comparing a predetermined quantity of unmanned aerial systems of the vehicle, the quantity being required to continue movement of the vehicle to the next scheduled stop of the vehicle in accordance with the route of travel, to the quantity of unmanned aerial systems charged at the moment of completion of said period of a stop; and present a request to the server for provision of additional aerial systems corresponding to said determined quantity of lacking charged unmanned aerial systems for at least a period of time corresponding to the movement of the vehicle to said next stop.

50. A system, comprising:

the vehicles according to claim 1 further provided each with a location determination module configured to determine the geographic coordinates of said vehicle in real time;

groups of unmanned aerial systems used each by one of said vehicles; and a server communicatively coupled to the control module of each of said vehicles so as to enable receipt of data therefrom relating to the route of travel of the vehicle and to enable receipt therefrom of coordinates of the vehicle in real time;

wherein each of the unmanned aerial systems in each of said vehicles is further configured to present data relating to the range to the control module in response to a request of the control module, the request corresponding to said unmanned aerial system;

wherein the control module in each of said vehicles is further configured to:

determine the quantity of free charging spots in the storage module of said vehicle, in which free charging spots there is enabled replenishment of the range of the unmanned aerial systems, so as to enable presenting data relating to the free charging spots of the storage module to the server;

identify the quantity of discharged unmanned aerial systems of said vehicle, the range of which discharged unmanned aerial systems is less than a threshold value, based on said data relating to the range; and present a request to the server for provision of additional unmanned aerial systems in a quantity corresponding to at least a portion of said identified quantity of discharged unmanned aerial systems; and the server in response to said request for provision of additional aerial systems is further configured to:

identify other vehicle of said vehicles, the location of which other vehicle corresponds to the coordinates of said vehicle and in the storage module of which other vehicle the quantity of free charging spots corresponds at least partially to the quantity of discharged unmanned aerial systems of said vehicle; or identify at least two other vehicles of said vehicles, the location of each of which two other vehicles corresponds to the coordinates of said vehicle and in the storage modules of which two other vehicles the quantity of free charging spots corresponds to the quantity of discharged unmanned aerial systems of said vehicle; and further configured to present control instructions to the control module of said vehicle so as to enable:

directing said discharged unmanned aerial systems under control of the control module of said vehicle to said free charging spots of each identified other vehicle; or taking-over the control of said discharged unmanned aerial systems so as to enable directing same to said free charging spots of each identified other vehicle.

51. The transport system according to claim 50, wherein each of the charging spots of the storage module in each of said vehicles is provided with a charging device for replenishment of the range of an unmanned aerial system, and each of said discharged unmanned aerial systems is configured to connect to the charging device while being disposed on a free charging spot so as to enable replenishment of the range thereof and to enable return to said vehicle in a charged state under control of the control module of said vehicle or under control of the server.

52. The transport system according to claim 50, wherein each other vehicle identified by the server in response to a request for provision of additional aerial systems further complies with a condition according to which at the time of completion of replenishment of the range of the corresponding discharged unmanned aerial systems, said other vehicle in accordance with the route of travel thereof is present in the region of location of the vehicle to which said charged unmanned aerial systems must return.

53. The transport system according to claim 52, wherein the control module is further configured to present control commands to said returned unmanned aerial systems so as to enable interaction of at least a portion of same with the docking module of the vehicle, accommodation of at least a portion of same in the storage module of the vehicle and/or replacement of at least a portion of the unmanned aerial systems connected to the fuselage of the vehicle.

54. A transport system, comprising:

the vehicles according to claim 1 further provided each with a location determination module configured to determine the geographic coordinates of said vehicle in real time;

groups of unmanned aerial systems used each by one of said vehicles;

a server communicatively coupled to the control module of each of said vehicles in a manner to enable receipt of data therefrom relating to the route of travel of the vehicle, coordinates of the vehicle in real time and data relating to the quantity of idle unmanned aerial systems of the vehicle in the storage module, which idle unmanned aerial systems will not be required by said vehicle while movement in accordance with the route of travel thereof, wherein:

each of unmanned aerial systems in each of said vehicles is further configured to present data relating to the range to the control module in real time;

the control module in each of said vehicles is further configured to:

identify the quantity of lacking charged unmanned aerial systems of the group of unmanned aerial systems of the vehicle, the group corresponding to said vehicle, for providing for a range for said vehicle, the range allowing to continue movement of said vehicle to the next stop in accordance with the route of travel of the vehicle, based on data relating to the range, the data corresponding to said vehicle, and data relating to the target quantity of charged unmanned aerial systems which allows moving said vehicle between stops in accordance with the route of travel thereof;

identify the presence of free docking spots in the docking module of said vehicle, in which docking spots there is enabled the connection of the unmanned aerial systems to the fuselage, in a quantity corresponding to said identified quantity of lacking charged unmanned aerial systems so as to enable presenting data relating to free docking spots of the docking module to the server; and present to the server a request for provision of additional unmanned aerial systems in a quantity corresponding to at least a portion of said identified quantity of lacking charged unmanned aerial systems; and the server in response to said request for provision of additional aerial systems is further configured to:

identify other vehicle of said vehicles, the location of which other vehicle corresponds to the coordinates of said vehicle and the quantity of idle unmanned aerial systems of which other vehicle corresponds to said quantity of lacking charged unmanned aerial systems; or identify at least two other vehicles of said vehicles, the location of each of which two other vehicles corresponds to the coordinates of said vehicle and the total quantity of idle unmanned aerial systems of which two other vehicles corresponds to said quantity of lacking charged unmanned aerial systems;

and further configured to present control instructions to the control module of each identified other vehicle so as to enable:

directing each of the idle unmanned aerial systems under control of the control module of said other vehicle to one of said free docking spots in the docking module; or taking-over the control of the idle unmanned aerial systems so as to enable directing each of same to one of said free docking spots in the docking module.

55. The transport system according to claim 54, wherein, in the event that the quantity of free docking spots in the docking module of the vehicle does not correspond to the quantity of lacking charged unmanned aerial systems, then the control module of said vehicle is further configured to direct control instructions to the released unmanned aerial systems corresponding in quantity to the lacking quantity of free docking spots and having the smallest range so as to enable accommodation thereof in the storage module of said vehicle.

56. A transport system, comprising:

the vehicle according to claim 1 further provided with a location determination module configured to determine the geographic coordinates of the vehicle in real time;

unmanned aerial systems used by said vehicle; and parking stations, each of which parking stations is configured to store and/or charge additional unmanned aerial systems and to control the operation of said additional unmanned aerial systems, said parking stations being further configured to communicate with the control module of the vehicle so as to enable receipt therefrom of data relating to the route of travel of the vehicle;

wherein the control module is further configured to direct a request to at least one of said parking stations for provision of at least one additional unmanned aerial system in a geographic region corresponding to said route of travel; and said at least one parking station in response to said request enables direction of said at least one additional aerial system at a moment of time at which the proximity of the vehicle to said geographic region in accordance with said route of travel corresponds a threshold value, for interaction of each of said additional aerial systems with the docking module of the vehicle.

57. A transport system comprising:

the vehicle according to claim 1;

unmanned aerial systems used by said vehicle;

parking stations configured to store and/or charge additional unmanned aerial systems; and a server configured to control the operation of said additional unmanned aerial systems on said parking stations and communicatively coupled to the control module of the vehicle;

wherein the control module is further configured to direct a request to the server for provision of at least one additional aerial system; and the server is further configured to identify at least one of said parking stations corresponding to said request so as to enable direction of at least one additional aerial system from said identified parking stations at a moment of time at which the proximity of the vehicle to said identified parking stations corresponds to a threshold value, for interaction of each of said additional aerial systems with the docking module of the vehicle.

58. A transport system, comprising:

the vehicle according to claim 1, unmanned aerial systems used by said vehicle; and parking stations, each of which parking stations is configured to store and/or charge additional unmanned aerial systems and to control the operation of said additional unmanned aerial systems, said parking stations being further configured to communicate with the control module of the vehicle;

wherein the control module is further configured to direct a request to at least one of said parking stations for provision of at least one additional unmanned aerial system; and said at least one parking station in response to said request further enables direction of said at least one additional aerial system at a moment of time at which the proximity of the vehicle to that parking station corresponds to a threshold value, for interaction of each of said additional aerial systems with the docking module of the vehicle.

59. A method of moving the vehicle according to claim 1, comprising the following steps of:

presenting control commands to unmanned aerial systems;

in response to said control commands, directing said unmanned aerial systems to the docking module of the vehicle so as to provide for interaction therewith for connection of said directed unmanned aerial systems to the fuselage of the vehicle;

actuating, by means of the control module of the vehicle, said connected unmanned aerial systems so as to provide for movement of the vehicle;

receiving, by means of the control module, data relating to the range from each of the unmanned aerial systems moving the vehicle in real time;

identifying, by means of the control module, a discharged unmanned aerial system whose range is less than a threshold value in said unmanned aerial systems based on said data relating to the range while movement of the vehicle;

directing a charged unmanned aerial system to the docking module of the vehicle for replacing said discharged unmanned aerial system;

presenting, by means of the control module, control commands to said discharged unmanned aerial system so as to withdraw same from interaction with the docking module of the vehicle for undocking from the fuselage of the vehicle; and presenting, by means of the control module, control commands to said charged unmanned aerial system so as to provide for interaction with said docking module of the vehicle for connecting said charged unmanned aerial system to the fuselage of the vehicle.

60. The method according to claim 59, further comprising directing said undocked unmanned aerial system to the storage module of the given vehicle, or the parking station, or the storage module of other vehicle so as to provide for replenishment of the range of said unmanned aerial system.

61. The method according to claim 59, further comprising releasing said charged unmanned aerial system to be directed to the storage module of the given vehicle from the storage module of the vehicle and/or the parking station, and/or the storage module of other vehicle.

62. The method according to claim 59, further comprising altering, in order to stop the vehicle, the operating mode of the unmanned aerial systems moving said vehicle so as to provide for turning-off, by means of the control module, of said unmanned aerial systems after stopping of the vehicle.

63. The method according to claim 59, wherein, while stopping of the vehicle, the unmanned aerial systems moving said vehicle are directed, by means of the control module, at least partially to the storage module of said vehicle, and/or at least partially to one or more parking stations corresponding to the stop region of the vehicle, and/or at least partially to the storage modules of one or more other vehicles corresponding to the stop region of the vehicle so as to provide for replenishment of the range of the corresponding unmanned aerial systems, followed by formation of a corresponding plurality of recharged unmanned aerial systems.

64. The method of claim 63, wherein said recharged unmanned aerial systems are directed back to the docking module of the vehicle so as to enable them to enter into interaction therewith for docking to the fuselage of the vehicle.

65. The method according to claim 59, further comprising:

communicating to the control module of the vehicle the route of travel of the vehicle, the curb weight of the vehicle, and the weight of useful load of the vehicle;

determining, by means of the control module, a geographic region in accordance with the route of travel in which geographic region the range of the vehicle, the range being provided by the unmanned aerial systems of the vehicle, corresponds to a threshold level, based on said data communicated to the control module; and presenting, by means of the control module, a request to the server for reservation of additional or replacement unmanned aerial systems for said vehicle in one or more parking stations corresponding to said geographic region and/or storage modules of one or more other vehicles corresponding to said geographic region in a quantity that provides for the range of the vehicle, the range allowing the vehicle to at least partially complete or extend the route of travel.

66. The method according to claim 59, further comprising:

communicating to the control module of the vehicle the route of travel of the vehicle with the coordinates of stops, the curb weight of the vehicle, and the weight of useful load of the vehicle at each section of the route of travel between two consecutive stops;

determining, by means of the control module, a geographic region at least at one of the sections of the route of travel in which geographic region the range of the vehicle, the range being provided by the unmanned aerial systems of the vehicle, corresponds to a threshold level, based on said data communicated to the control module; and presenting, by means of the control module, a request to the server for reservation of additional or replacement unmanned aerial systems for said vehicle in one or more parking stations corresponding to said geographic region and/or storage modules of one or more other vehicles corresponding to said geographic region in a quantity that provides for the range of the vehicle, the range allowing the vehicle to at least partially complete said section of the route of travel.

67. The method according to claim 59, further comprising:

communicating to the control module of the vehicle the route of travel of the vehicle with the coordinates of stops, the curb weight of the vehicle, and the weight of useful load of the vehicle at each section of the route of travel between two consecutive stops;

identifying, by means of the control module, at least one of the sections of the route of travel, at which section the quantity of unmanned aerial systems of the vehicle exceeds the estimated quantity required for completion by the vehicle of said section of the route of travel, so as to provide for presenting to the server the data relating to the quantity of idle unmanned aerial systems at said section of the route of travel of the vehicle; and in response to the control instructions of the server, directing at least a portion of said idle unmanned aerial systems to one or more parking stations corresponding to said section of the route of travel and/or to the docking modules of one or more other vehicles corresponding to said section of the route of travel.

68. The method according to claim 59, further comprising a step of preliminarily moving said vehicle to the parking station or other vehicle, wherein the control commands are presented to the unmanned aerial systems accommodated in said parking station or storage module of said other vehicle, respectively.

69. The method according to claim 59, further comprising a step of presenting control commands to unmanned aerial systems accommodated in the storage module of the same vehicle and/or unmanned aerial systems accommodated at least on one parking station and/or unmanned aerial systems accommodated in the storage module of at least one other vehicle.

* * * * *